(12) United States Patent
Chen et al.

(10) Patent No.: US 11,124,292 B2
(45) Date of Patent: Sep. 21, 2021

(54) SYSTEMS AND METHODS OF AIRCRAFT WALKING SYSTEMS

(71) Applicant: SZ DJI TECHNOLOGY CO., LTD., Shenzhen (CN)

(72) Inventors: Hanping Chen, Shenzhen (CN); Xiangyu Chen, Shenzhen (CN); Mingxi Wang, Shenzhen (CN); Qi Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 354 days.

(21) Appl. No.: 16/226,140

(22) Filed: Dec. 19, 2018

(65) Prior Publication Data

US 2019/0127052 A1 May 2, 2019

Related U.S. Application Data

(63) Continuation of application No. PCT/CN2016/086791, filed on Jun. 22, 2016.

(51) Int. Cl.
*B64C 25/10* (2006.01)
*B64C 39/02* (2006.01)
(Continued)

(52) U.S. Cl.
CPC .............. *B64C 25/10* (2013.01); *B64C 25/12* (2013.01); *B64C 25/24* (2013.01); *B64C 25/34* (2013.01);
(Continued)

(58) Field of Classification Search
CPC ......... B64C 25/10; B64C 25/24; B64C 25/12; B64C 25/34; B64C 37/00; B64C 25/36;
(Continued)

(56) References Cited

U.S. PATENT DOCUMENTS

2010/0288050 A1 11/2010 Nelson et al.
2016/0377424 A1* 12/2016 Clark .................... B64C 39/024
356/600
(Continued)

FOREIGN PATENT DOCUMENTS

CN 101491898 A 7/2009
CN 102412530 B 4/2012
(Continued)

OTHER PUBLICATIONS

The World Intellectual Property Organization (WIPO) International Search Report and Written Opinion for PCT/CN2016/086791 dated Mar. 23, 2017 9 Pages.

*Primary Examiner* — Valentina Xavier

(74) *Attorney, Agent, or Firm* — Anova Law Group, PLLC

(57) ABSTRACT

An unmanned aerial vehicle (UAV) includes a central body and a plurality of landing gears that are extendable from and movable relative to the central body. The plurality of landing gears are configured to transform between a flight configuration and a surface configuration. In the flight configuration, the landing gears are extending laterally away from the central body and not in contact with a surface below the central body. In the surface configuration, the landing gears are extending towards the surface below the central body. When the landing gears are in the surface configuration, the landing gears are configured to support a weight of the central body on the surface and transport the UAV over the surface by moving one or more of the landing gears relative to the surface.

17 Claims, 31 Drawing Sheets

(51) Int. Cl.
  *B64C 25/24* (2006.01)
  *B64C 25/12* (2006.01)
  *B64C 25/34* (2006.01)
  *B64C 37/00* (2006.01)
  *B64C 25/36* (2006.01)
  *B64C 27/08* (2006.01)
  *B64C 25/00* (2006.01)

(52) U.S. Cl.
  CPC .............. *B64C 25/36* (2013.01); *B64C 27/08* (2013.01); *B64C 37/00* (2013.01); *B64C 39/024* (2013.01); *B64C 2025/008* (2013.01); *B64C 2201/024* (2013.01); *B64C 2201/027* (2013.01); *B64C 2201/042* (2013.01); *B64C 2201/088* (2013.01); *B64C 2201/108* (2013.01); *B64C 2201/127* (2013.01)

(58) Field of Classification Search
  CPC . B64C 27/08; B64C 39/024; B64C 2201/027; B64C 2025/008; B64C 2201/108; B64C 2201/127; B64C 2201/024; B64C 2201/088; B64C 2201/042
  See application file for complete search history.

(56) References Cited

U.S. PATENT DOCUMENTS

| | | | |
|---|---|---|---|
| 2017/0305537 A1* | 10/2017 | Smith | .................. B64C 39/024 |
| 2018/0127092 A1* | 5/2018 | del Castillo | ............ B64C 11/28 |
| 2018/0312023 A1* | 11/2018 | Braithwaite | .......... B29C 64/209 |

FOREIGN PATENT DOCUMENTS

| | | |
|---|---|---|
| CN | 204355274 U | 5/2015 |
| CN | 104853988 A | 8/2015 |
| CN | 204623827 U | 9/2015 |
| CN | 105109675 A | 12/2015 |
| CN | 204916166 U | 12/2015 |
| CN | 105383652 A | 3/2016 |
| CN | 105539818 A | 5/2016 |
| CN | 205311895 U | 6/2016 |
| GB | 2483881 A | 3/2012 |

* cited by examiner

SYSTEMS AND METHODS OF AIRCRAFT WALKING SYSTEMS

CROSS-REFERENCE TO RELATED APPLICATION

This application is a continuation of International Application No. PCT/CN2016/086791, filed on Jun. 22, 2016, the entire contents of which are incorporated herein by reference.

BACKGROUND OF THE DISCLOSURE

Aerial vehicles such as unmanned aerial vehicles (UAVs) can be used for performing surveillance, reconnaissance, and exploration tasks for military and civilian applications. Such vehicles may carry a payload configured to perform a specific function. However, certain functions that are performed by an aerial vehicle may be limited by the mobility of a vehicle that requires flight. In particular, various desired functions may be limited to conditions that are not ideal for flying the aerial vehicle.

SUMMARY OF THE DISCLOSURE

It may be desirable to provide systems, devices, and methods for providing walking systems and methods for aerial vehicles, such as unmanned aerial vehicles (UAVs). The walking systems may incorporate landing gear and/or transformative arms of the aerial vehicle. The landing gear and/or transformative arms may transform between a flight configuration and a surface configuration. In particular, when the landing gear and/or transformative arms are in the surface configuration, the landing gear and/or transformative arms are configured to (a) support a weight of the central body of the UAV on the surface, and (b) transport the UAV over the surface by moving one or more landing gears relative to the surface.

It may be desirable for aerial vehicles that are able to access remote locations to have walking systems so as to allow the aerial vehicles to transgress the terrain of the remote locations. In examples, these augmented aerial vehicles may be used to aid in earthquake relief, mine pit surveys, and other potentially hazardous areas that are difficult or inaccessible but for air accessibility. Additionally, once these augmented aerial vehicles are able to access these locations, it may be beneficial for the augmented aerial vehicles to have additional mobile capabilities. For example, the augmented aerial vehicles may be used to deliver supplies to, or provide video images of, areas that may be otherwise inaccessible.

In one aspect, the present disclosure provides an unmanned aerial vehicle (UAV). The UAV comprises a central body and a plurality of landing gears that are extendable from and movable relative to the central body. Additionally, the plurality of landing gears are configured to transform between (1) a flight configuration wherein the landing gears are extending laterally away from the central body and not in contact with a surface below the central body, and (2) a surface configuration wherein the landing gears are extending towards the surface below the central body. When the landing gears are in the surface configuration, the landing gears are configured to (a) support a weight of the central body on the surface, and (b) transport the UAV over the surface by moving one or more landing gears relative to the surface.

In another related but separate aspect of the present disclosure, a method for transformation of an unmanned aerial vehicle (UAV) is provided. The method comprises providing a UAV having a central body and a plurality of landing gears that are extendable from and movable relative to the central body. Additionally, the plurality of landing gears in the provided UAV are configured to transform between (1) a flight configuration wherein the landing gears are extending laterally away from the central body and not in contact with a surface below the central body, and (2) a surface configuration wherein the landing gears are extending towards a surface below the central body. When the landing gears are in the surface configuration, the landing gears are configured to (a) support a weight of the central body on the surface, and (b) transport the UAV over the surface by moving one or more landing gears relative to the surface. The method also comprises operating the UAV such that the UAV adopts the flight configuration or the surface configuration.

Another aspect of the present disclosure provides a method of assembling an unmanned aerial vehicle (UAV) having a central body and a plurality of extendable landing gears. The method comprises attaching to the central body a plurality of landing gears that are extendable from and movable relative to the central body when attached to the central body. The plurality of landing gears are configured to transform between (1) a flight configuration wherein the landing gears are extending laterally away from the central body and not in contact with a surface below the central body, and (2) a surface configuration wherein the landing gears are extending towards a surface below the central body. When the landing gears are in the surface configuration, the landing gears are configured to (a) support a weight of the central body on the surface, and (b) transport the UAV over the surface by moving one or more landing gears relative to the surface, thereby assembling the UAV.

In an additional aspect of the present disclosure, a kit is provided. The kit comprises a plurality of landing gears that are configured to be attached to a central body of an unmanned aerial vehicle (UAV). The plurality of landing gears are extendable from and movable relative to the central body when attached to the central body. The kit also comprises instructions for assembling the UAV, such that when the UAV is assembled according to the instructions, the assembled UAV is characterized in that the plurality of landing gears are configured to transform between (1) a flight configuration wherein the landing gears are extending laterally away from the central body and not in contact with a surface below the central body, and (2) a surface configuration wherein the landing gears are extending towards a surface below the central body. When the landing gears are in the surface configuration, the landing gears are configured to (a) support a weight of the central body on the surface, and (b) transport the UAV over the surface by moving one or more landing gears relative to the surface.

In some embodiments, when the UAV is in the flight configuration, flight of the UAV is effected via one or more propulsion units on the UAV. In some embodiments, the one or more propulsion units are supported on the landing gear. In some embodiments, each landing gear has a proximal end closer to the central body and a distal end further away from the central body and wherein the one or more propulsion unit supported on each landing gear is located at the distal end of each landing gear. In further embodiments, the propulsion unit supported on each landing gear is located at a predetermined distance from the central body. In some embodiments, the UAV further comprises a plurality of arms extending away from the central body, wherein the one or more propulsion units are supported on the arms. In some embodiments, each arm has a proximal end closer to the central body and a distal end further away from the central body and wherein the propulsion units are supported on the distal ends of the arms.

In some embodiments, each of the plurality of landing gears comprises a plurality of portions operably coupled together by one or more joints that allow the portions to be movable with respect to each other. In some embodiments, each of the plurality of landing gears is operably coupled to the central body by a joint that allows each landing gear to be extendable from and movable relative to the central body. In some embodiments, the plurality of landing gears are further configured to transform between (a transforming configuration wherein (i) a first set of landing gears from the plurality of landing gears are extending laterally away from the central body and (ii) a second set of landing gears from the plurality of landing gears are extending towards a surface below the central body, and (2) the flight configuration wherein both the first set and the second set of landing gears are extending laterally away from the central body. In some embodiments, when the landing gears are in the transforming configuration, the second set of landing gears are configured to (a) support a weight of the central body on the surface, and (b) transport the UAV over the surface by moving one or more landing gears from the second set of landing gears relative to the surface. In further embodiments, each landing gear from the first set of landing gears supports a propulsion unit to effect flight of the UAV. In some embodiments, each landing gear from the second set of landing gears supports a propulsion unit to effect flight of the UAV. In some embodiments, each landing gear from the first and second sets of landing gears supports a propulsion unit to effect flight of the UAV.

In a further aspect, the present disclosure provides an unmanned aerial vehicle (UAV). The UAV comprises a central body and a plurality of transformable arms that are extendable from and movable relative to the central body. Additionally, the plurality of transformable arms are configured to transform between (1) a flight configuration wherein the transformable arms are extending laterally away from the central body of the UAV to effect flight of the UAV via a propulsion unit supported on each transformable arm, and (2) a surface configuration wherein the transformable arms are extending towards a surface below the central body of the UAV. When the transformable arms are in the surface configuration, the transformable arms are configured to (a) support a weight of the central body on the surface, and (b) transport the UAV over the surface by moving one or more transformable arms relative to the surface.

In another related but separate aspect of the present disclosure, a method for transformation of an unmanned aerial vehicle (UAV) is provided. The method comprises providing a UAV having a central body and a plurality of transformable arms that are extendable from and movable relative to the central body. Additionally, the plurality of transformable arms in the provided UAV are configured to transform between (1) a flight configuration wherein the transformable arms are extending laterally away from the central body of the UAV to effect flight of the UAV via a propulsion unit supported on each transformable arm, and (2) a surface configuration wherein the transformable arms are extending towards a surface below the central body of the UAV. When the transformable arms are in the surface configuration, the transformable arms are configured to (a) support a weight of the central body on the surface, and (b) transport the UAV over the surface by moving one or more transformable arms relative to the surface. The method also comprises operating the UAV such that the UAV adopts the flight configuration or the surface configuration.

Another aspect of the present disclosure provides a method of assembling an unmanned aerial vehicle (UAV) having a central body and a plurality of transformable arms. The method comprises attaching to the central body a plurality of transformable arms that are extendable from and movable relative to the central body when attached to the central body. The plurality of transformable arms are configured to transform between (1) a flight configuration wherein the transformable arms are extending laterally away from the central body of the UAV to effect flight of the UAV via a propulsion unit supported on each transformable arm, and (2) a surface configuration wherein the transformable arms are extending towards a surface below the central body. When the transformable arms are in the surface configuration, the transformable arms are configured to (a) support a weight of the central body on the surface, and (b) transport the UAV over the surface by moving one or more transformable arms relative to the surface, thereby assembling the UAV.

In an additional aspect of the present disclosure, a kit is provided. The kit comprises a plurality of transformable arms that are configured to be attached to a central body of an unmanned aerial vehicle (UAV). The plurality of transformable arms are extendable from and movable relative to the central body when attached to the central body. The kit also comprises instructions for assembling the UAV, such that when the UAV is assembled according to the instructions, the assembled UAV is characterized in that the plurality of transformable arms are configured to transform between (1) a flight configuration wherein the transformable arms are extending laterally away from the central body of the UAV to effect flight of the UAV via a propulsion unit supported on each transformable arm, and (2) a surface configuration wherein the transformable arms are extending towards a surface below the central body. When the transformable arms are in the surface configuration, the transformable arms are configured to (a) support a weight of the central body on the surface, and (b) transport the UAV over the surface by moving one or more transformable arm relative to the surface.

In some embodiments, each of the plurality of transformable arms comprises a plurality of portions operably coupled together by one or more joints that allow the portions to be movable with respect to each other. In some embodiments, each of the plurality of transformable arms is operably coupled to the central body by a joint that allows each transformable arm to be extendable from and movable relative to the central body. In some embodiments, the propulsion unit supported on each transformable arm is located away from a distal end of each transformable arm. In some embodiments, the propulsion unit supported on each transformable arm is located at a predetermined distance from the distal end of each transformable arm.

In some embodiments, the plurality of transformable arms are further configured to transform between (1) a transforming configuration wherein (i) a first set of transformable arms from the plurality of transformable arms are extending laterally away from the central body and (ii) a second set of transformable arms from the plurality of transformable arms are extending towards a surface below the central body, and (2) the flight configuration wherein both the first set and the second set of transformable arms are extending laterally away from the central body to effect flight of the UAV via a propulsion unit supported on each transformable arm from the first and second sets of transformable arms. In some embodiments, when the transformable arms are in the transforming configuration, the second set of transformable arms are configured to (a) support a weight of the central body on the surface, and (b) transport the UAV over the surface by moving one or more transformable arms from the second set of transformable arms relative to the surface.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE EMBODIMENTS

Figure 1:
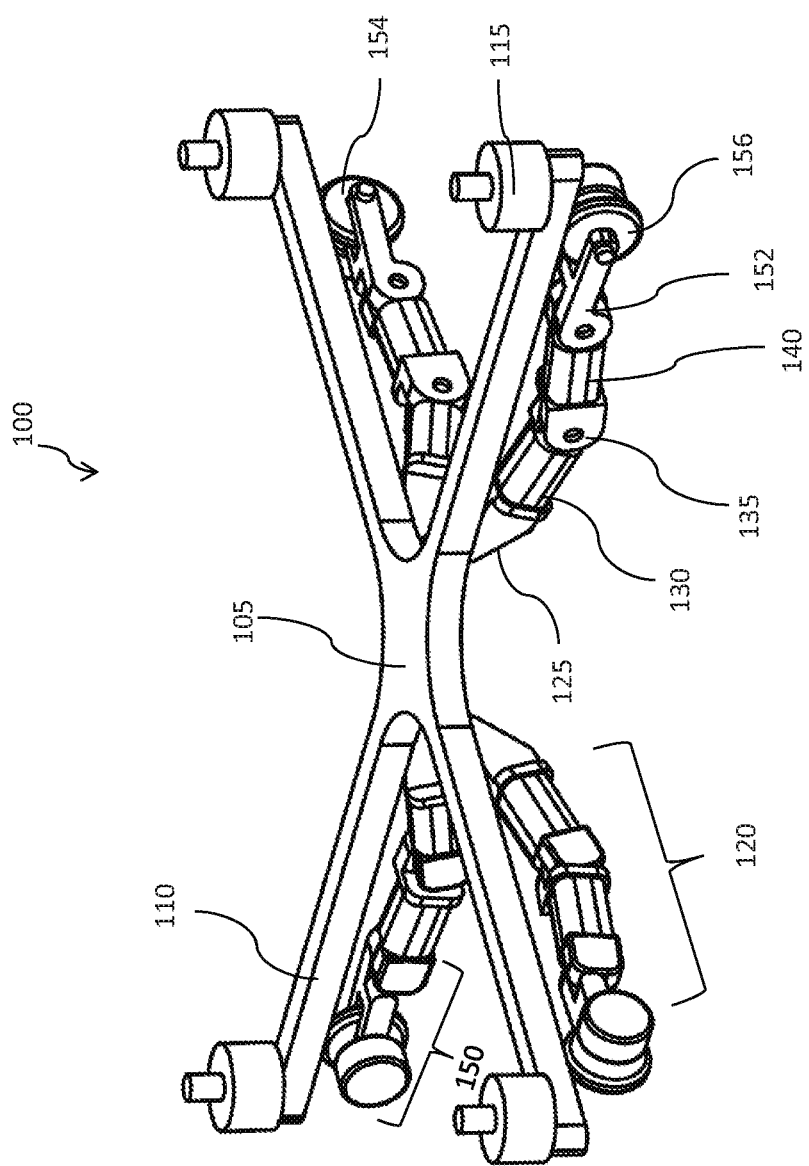
FIG. 1 provides a perspective view of an aerial vehicle having a walking system comprising landing gear in a flight configuration, in accordance with embodiments.

The systems, devices, and methods of the present disclosure provide for walking systems for aerial vehicles. There are many areas that may be generally inaccessible to support efforts where the deployment of aerial vehicles may be useful. Examples of these areas include earthquake relief, high-altitude locations, and remote areas that are beyond readily accessible roads. However, while aerial vehicles may be used to access these types of areas, mobile vehicles that use aerial components may be limited in their land- or water-based navigation of remote areas. For example, the use of aerial components to access locations may require the use of moving propellers which may be damaged as the mobile vehicle navigates an internal portion of a building or cave. Further, the use of propellers may be dangerous to individuals that are being helped, such as earthquake victims, thereby limiting the proximity within which the mobile vehicle may approach the earthquake victim. When the aerial components of the mobile vehicle are not in motion, however, the mobile vehicle may more readily approach objects and individual that may otherwise be harmed by moving propellers.

Accordingly, in some examples, mobile vehicles having aerial components as well as a walking system may utilize the aerial components to access a remote area, and then may utilize the walking system to navigate land- or water-based areas when the aerial components are no longer in motion. In this way, walking systems may be used to access land- and water-based areas of interest, such as internal portions of an earthquake-relief site, internal areas of caves, and other terrains.

In one aspect, the present disclosure provides an unmanned aerial vehicle (UAV). The UAV comprises a central body and a plurality of landing gears that are extendable from and movable relative to the central body. Additionally, the plurality of landing gears are configured to transform between (1) a flight configuration wherein the landing gears are extending laterally away from the central body and not in contact with a surface below the central body, and (2) a surface configuration wherein the landing gears are extending towards the surface below the central body. When the landing gears are in the surface configuration, the landing gears are configured to (a) support a weight of the central body on the surface, and (b) transport the UAV over the surface by moving one or more landing gears relative to the surface.

In another related but separate aspect of the present disclosure, a method for transformation of an unmanned aerial vehicle (UAV) is provided. The method comprises providing a UAV having a central body and a plurality of landing gears that are extendable from and movable relative to the central body. Additionally, the plurality of landing gears in the provided UAV are configured to transform between (1) a flight configuration wherein the landing gears are extending laterally away from the central body and not in contact with a surface below the central body, and (2) a surface configuration wherein the landing gears are extending towards a surface below the central body. When the landing gears are in the surface configuration, the landing gears are configured to (a) support a weight of the central body on the surface, and (b) transport the UAV over the surface by moving one or more landing gears relative to the surface. The method also comprises operating the UAV such that the UAV adopts the flight configuration or the surface configuration.

Another aspect of the present disclosure provides a method of assembling an unmanned aerial vehicle (UAV) having a central body and a plurality of extendable landing gears. The method comprises attaching to the central body a plurality of landing gears that are extendable from and movable relative to the central body when attached to the central body. The plurality of landing gears are configured to transform between (1) a flight configuration wherein the landing gears are extending laterally away from the central body and not in contact with a surface below the central body, and (2) a surface configuration wherein the landing gears are extending towards a surface below the central body. When the landing gears are in the surface configuration, the landing gears are configured to (a) support a weight of the central body on the surface, and (b) transport the UAV over the surface by moving one or more landing gears relative to the surface, thereby assembling the UAV.

In an additional aspect of the present disclosure, a kit is provided. The kit comprises a plurality of landing gears that are configured to be attached to a central body of an unmanned aerial vehicle (UAV). The plurality of landing gears are extendable from and movable relative to the central body when attached to the central body. The kit also comprises instructions for assembling the UAV, such that when the UAV is assembled according to the instructions, the assembled UAV is characterized in that the plurality of landing gears are configured to transform between (1) a flight configuration wherein the landing gears are extending laterally away from the central body and not in contact with a surface below the central body, and (2) a surface configuration wherein the landing gears are extending towards a surface below the central body. When the landing gears are in the surface configuration, the landing gears are configured to (a) support a weight of the central body on the surface, and (b) transport the UAV over the surface by moving one or more landing gears relative to the surface.

In a further aspect, the present disclosure provides an unmanned aerial vehicle (UAV). The UAV comprises a central body and a plurality of transformable arms that are extendable from and movable relative to the central body. Additionally, the plurality of transformable arms are configured to transform between (1) a flight configuration wherein the transformable arms are extending laterally away from the central body of the UAV to effect flight of the UAV via a propulsion unit supported on each transformable arm, and (2) a surface configuration wherein the transformable arms are extending towards a surface below the central body of the UAV. When the transformable arms are in the surface configuration, the transformable arms are configured to (a) support a weight of the central body on the surface, and (b) transport the UAV over the surface by moving one or more transformable arms relative to the surface.

In another related but separate aspect of the present disclosure, a method for transformation of an unmanned aerial vehicle (UAV) is provided. The method comprises providing a UAV having a central body and a plurality of transformable arms that are extendable from and movable relative to the central body. Additionally, the plurality of transformable arms in the provided UAV are configured to transform between (1) a flight configuration wherein the transformable arms are extending laterally away from the central body of the UAV to effect flight of the UAV via a propulsion unit supported on each transformable arm, and (2) a surface configuration wherein the transformable arms are extending towards a surface below the central body of the UAV. When the transformable arms are in the surface configuration, the transformable arms are configured to (a) support a weight of the central body on the surface, and (b) transport the UAV over the surface by moving one or more transformable arms relative to the surface. The method also comprises operating the UAV such that the UAV adopts the flight configuration or the surface configuration.

Another aspect of the present disclosure provides a method of assembling an unmanned aerial vehicle (UAV) having a central body and a plurality of transformable arms. The method comprises attaching to the central body a plurality of transformable arms that are extendable from and movable relative to the central body when attached to the central body. The plurality of transformable arms are configured to transform between (1) a flight configuration wherein the transformable arms are extending laterally away from the central body of the UAV to effect flight of the UAV via a propulsion unit supported on each transformable arm, and (2) a surface configuration wherein the transformable arms are extending towards a surface below the central body. When the transformable arms are in the surface configuration, the transformable arms are configured to (a) support a weight of the central body on the surface, and (b) transport the UAV over the surface by moving one or more transformable arms relative to the surface, thereby assembling the UAV.

In an additional aspect of the present disclosure, a kit is provided. The kit comprises a plurality of transformable arms that are configured to be attached to a central body of an unmanned aerial vehicle (UAV). The plurality of transformable arms are extendable from and movable relative to the central body when attached to the central body. The kit also comprises instructions for assembling the UAV, such that when the UAV is assembled according to the instructions, the assembled UAV is characterized in that the plurality of transformable arms are configured to transform between (1) a flight configuration wherein the transformable arms are extending laterally away from the central body of the UAV to effect flight of the UAV via a propulsion unit supported on each transformable arm, and (2) a surface configuration wherein the transformable arms are extending towards a surface below the central body. When the transformable arms are in the surface configuration, the transformable arms are configured to (a) support a weight of the central body on the surface, and (b) transport the UAV over the surface by moving one or more transformable arm relative to the surface.

FIG. 1 provides a perspective view of an aerial vehicle having a walking system comprising landing gear in a flight configuration, in accordance with embodiments. In particular, FIG. 1 illustrates an unmanned aerial vehicle (UAV) 100 having a plurality of arms 110 that extend from a central body 105 of the UAV 100. Each arm 110 of the plurality of arms supports a propulsion unit 115. In examples, the arms 110 may be composed of carbon fiber. In examples, arms 110 may be composed of material, plastic, metal, or any other available composite metal. As seen in FIG. 1, each of the arms 110 in FIG. 1 are non-transformable. In examples, arms 110 may be in a fixed configuration. In some embodiments, as described in FIGS. 24-29 below, one or more arms may be transformable.

As seen in FIG. 1, landing gear 120 is positioned beneath each arm 110. Landing gear 120 may be configured to transform between a flight configuration and a surface configuration. When landing gear 120 is in a flight configuration, the landing gears may extend laterally away from the central body of the UAV. When landing gear 120 is in the surface configuration, the landing gears may extend towards a surface below the central body of the UAV. Additionally, when the landing gears are in the surface configuration, the landing gears are configured to support a weight of the central body of the UAV on the surface and transport the UAV over the surface by moving one or more landing gears relative to the surface. In examples, landing gears may be configured to bear load that includes the UAV as well as an additional payload that is coupled to the UAV. Optionally, landing gear 120 may include a first portion, a second portion, and a joint that connects the first portion and the second portion.

The UAV 100 may include one or more arms 110 that extend from a central body 105 of the UAV 100. The UAV 100 may include one or more landing gear 120 that extend from the central body 105 of the UAV 100. A center of gravity of the UAV may be within the UAV body, above a UAV body, or below a UAV body. A center of gravity of the UAV may pass through an axis extending vertically through the UAV body. The UAV body may support one or more arms 110 of the UAV. The UAV body may support one or more landing gear 120 of the UAV. The UAV body may bear weight of the one or more arms. The UAV body may bear weight of the one or more landing gear. The UAV body may directly contact one or more arms. The UAV body may directly contact one or more landing gear. The UAV body may be integrally formed with one or more arms or components of one or more arms. The UAV body may be integrally formed with one or more landing gear or components of one or more landing gear. The UAV may connect to the one or more arms via one or more intermediary pieces. The UAV may connect to the one or more landing gear via one or more intermediary pieces.

The arms may optionally extend radially from a central body 105. The arms may be arranged symmetrically about a plane intersecting the central body of the UAV. Alternatively, the arms may be arranged symmetrically in a radial fashion. The arms may be evenly spaced apart. For instance, if N arms are provided for the UAV, the number of degrees between each arm may be 360/N. Alternatively, the arms need not be evenly spaced apart. In some instances, none of the arms are parallel to one another. Alternatively, arms may be arranged so that two or more, three or more, or four or more of the arms may be substantially parallel to one another. All of the arms may be coplanar. Alternatively, one or more types of arms may be coplanar. In some embodiments, two or more of the arms may not be coplanar.

One or more of the arms may support one or more propulsion units 115 that may affect flight of the UAV. In some embodiments, each arm may support one or more propulsion units. Alternatively, one or more of the arms may not support a propulsion unit. In some instances, each arm may support one or more, two or more, three or more, four or more, five or more, or ten or more propulsion units. Each arm may support the same number of propulsion units. Alternatively, different arms may support different numbers of propulsion units.

Propulsion units may be configured to generate lift for the UAV. A propulsion unit may include a rotor assembly. A rotor assembly may include one or more rotor blades that may rotate to generate lift for the UAV. In some instances, a plurality of rotor blades may be provided for a propulsion unit. The plurality of rotor blades may or may not be movable relative to one another. The rotor assembly may include an actuator driving rotation of the rotor blades. The actuator may be coupled to the one or more rotor blades with aid of a shaft. Rotation of the actuator may cause rotation of the shaft, which may in turn cause rotation of the rotor blades. Any description of a shaft may also apply to multiple shafts that may be driven by the same actuator. The actuator may be driven by electrical energy, magnetic energy, thermal energy, mechanical energy, hydraulic pressure, or pneumatic pressure. The actuator may be a motor. In some embodiments, examples of the actuator may include self-commutated or externally commutated motors. Motors may include mechanical-commutator motors, electronic-commutator motors, synchronous machines, and/or asynchronous machines. Electric motors may include AC or DC motors. Some examples of motors may include direct-drive motors, step-less motors, or servomotors. The motors may be configured to rotate in a single direction, or may be capable of reversing direction. The rotor blades of each of the propulsion units of the UAV may turn, such that a first subset of the propulsion units have rotor blades rotating in a first direction and a second subset of the propulsion units have rotor blades rotating in a second direction, as described in greater detail elsewhere herein. Alternatively, the rotor blades may rotate in the same direction. Propulsion units may or may not include a protective covering that may be provided around at least a portion of the rotor blades.

In some embodiments, propulsion units may be located at or near a distal end of the arms. In some embodiments, arms may be coupled to a central body at a proximal end, and may have a distal end extending away from the central body. One or more of the propulsion units supported by the arm may be supported at a location along a length of the arm within 50%, 40%, 30%, 25%, 20%, 15%, 10%, 5%, 3%, or 1% of the distal end of the arm. In some embodiments, all of the propulsion units supported by the arm may be supported at a location along a length of the arm within 50%, 40%, 30%, 25%, 20%, 15%, 10%, 5%, 3%, or 1% of the distal end of the arm. One or more, or all, of the propulsion units supported by the arm may within 30 cm, 20 cm, 15 cm, 10 cm, 7 cm, 5 cm, 4 cm, 3 cm, 2 cm, 1 cm, 5 mm, or 1 mm of the distal end of the arm. Optionally, one or more of the arms may have a distal portion that extends at least 50 cm, 40 cm, 30 cm, 20 cm, 15 cm, 10 cm, 7 cm, 5 cm, 4 cm, 3 cm, 2 cm, or 1 cm, beyond a length of the arm supported by the one or more propulsion units. Optionally, each arm may have propulsion units located within the same percentage or distance relative to the distal end of the arm. Alternatively, different arms may have propulsion units located at different percentages or distances relative to the distal end of the arm.

The propulsion units may be substantially located on an upper surface of the arms. The upper surface of the arms may be a surface of the arm opposing a lower surface of the arms, wherein the lower surface of the arms are facing a direction of gravity. The upper surface of the arms may be facing away from the direction of gravity. Alternatively, the propulsion units may be substantially located on a lower surface of the arms, on both the upper and lower surface of the arms, within an arm, or any combination thereof. In one example, one or more rotor blades of a propulsion unit may be located above an upper surface of an arm. Alternatively, one or more rotor blades of a propulsion unit may be located below a lower surface of the arm. In some instances, at least one rotor blade of a propulsion unit may be located above an upper surface of an arm while at least one rotor blade of the propulsion unit may be located below a lower surface of the arm. In some instances, an actuator of a propulsion unit may be located above an upper surface of an arm, below a lower surface of an arm, or within an arm. For instance, an actuator may be at least partially located within a cavity of the arm. The actuator may or may not partially extend above an upper surface of an arm and/or below a lower surface of the arm.

The propulsion units supported by the one or more arms may have the same configurations and/or dimensions. Alternatively, they may have different configurations and/or dimensions. In some instances, some of the propulsion units may have larger rotor blades than other propulsion units. The rotor blades may have the same shape or different shapes. The rotor blades of the propulsion units may rotate at the same rate, or may rotate at differing rates.

The UAV 100 may include landing gear 120. The UAV may have any number of landing gear. For instance, the UAV may have one or more, two or more, three or more, four or more, five or more, six or more, seven or more, eight or more, ten or more, twelve or more, fifteen or more, twenty or more, thirty or more, forty or more, or fifty or more landing gear. The landing gear may optionally be coupled to a central body 105. The landing gear may be arranged symmetrically about a plane intersecting the central body of the UAV. Alternatively, the landing gear may be arranged symmetrically in a radial fashion. The landing gear may be evenly spaced apart. For instance, if N landing gear are provided for the UAV, the number of degrees between each landing gear may be 360/N. Alternatively, the landing gear need not be evenly spaced apart. In some instances, none of the landing gear are parallel to one another. Alternatively, landing gear may be arranged so that two or more, three or more, or four or more of the landing gear may be substantially parallel to one another. All of the landing gear may be coplanar. Alternatively, one or more types of landing gear may be coplanar. In some embodiments, two or more of the landing gear may not be coplanar.

One or more landing gears 120 may be configured to bear the weight of the UAV when the UAV is landed on a surface. The landing gear may be configured to contact an underlying surface when the UAV is not in flight. Additionally, landing gear 120 may be configured to transport the UAV over the surface by moving one or more landing gears relative to the surface. Optionally, the landing gear may include multiple portions connected in a serial matter. The serially connected portions may allow the end effector (e.g., wheel 154) of the landing gear multiple degrees-of-freedom (DOFs). In examples, the landing gear may comprise a first portion 130 and a second portion 140 which may be movable relative to each other. The first portion may be a section of the landing gear proximal to a UAV body. The second portion may be a section of the landing gear distal to the UAV body. The first portion may be closer to the central body than the second portion.

The first portion may or may not directly contact the UAV body. The first portion may be integrally formed with the UAV body. In examples, the first portion may be affixed or attached to the UAV body. In examples, the first portion may be coupled to the UAV. The first portion may or may not be removable relative to the UAV body. The first portion may or may not be releasably coupled to the UAV body. The first portion may have a fixed position (e.g., orientation, spatial location) relative to the UAV body. Alternatively, the first portion may be movable relative to the UAV body. In some embodiments, the first portion may be allowed to rotate and/or translate relative to the UAV body through a joint. The joint may be spherical, revolute, or prismatic. The first portion may be coupled to the UAV body via an active joint that is actuated by a motor. Alternatively, the first portion may be coupled to the UAV via a passive joint without actuators.

The second portion may not directly contact the UAV body. The weight of the second portion may be borne by the first portion. The first portion may support the second portion. The second portion may or may not be removable relative to the first portion. The second portion may have a variable position (e.g., orientation, spatial location) relative to the UAV body. For instance, an orientation of the second portion may change relative to the UAV body. The second portion may have a variable position relative to the first section. For instance, an orientation of the second portion may change relative to an orientation of the first section. Any orientation of the second portion may change (e.g., relative to an inertial reference frame, the UAV body, the first section) by any number of degrees, such as at least 1 degree, 3 degrees, 5 degrees, 10 degrees, 15 degrees, 20 degrees, 30 degrees, 45 degrees, 60 degrees, 75 degrees, 85 degrees, 90 degrees, 95 degrees, 105 degrees, 120 degrees, 135 degrees, 150 degrees, or 165 degrees. The change in orientation of the second portion may be less than any of the values described or may fall within a range between any two of the values described. The change in orientation may be about a vertical angle. The change in orientation may include a vertical component. The change in orientation may include a component that is in a direction parallel to the direction of gravity. The change in orientation may be unlimited. Alternatively, one or more limiting structures may limit the change in orientation (e.g., in an upwards direction and/or a downwards direction).

Landing gear 120 may be attached to central body 105 of the UAV 100. In some examples, landing gear 120 is attached to central body 105 via a connector 125. In examples, connector 125 may be a foot stand base. Additionally, as seen in FIG. 1, landing gear 120 may comprise a first portion 130, a joint 135, and a second portion 140. In examples, first portion 130 may comprise a large-torque worm wheel and worm motor; joint 135 may comprise a worm wheel and worm motor connecting base; and second portion 140 may comprise a small-torque worm wheel and worm motor, respectively. Additionally, landing gear components 120 may comprise a base portion 150. Base portion 150 may comprise an omnidirectional wheel supporting base 152, a lightweight omnidirectional wheel 154, and a direct current (DC) gear motor 156.

As seen in FIG. 1, one end of connector 125 is fixed under central body 105. In particular, one end of connector 125 is fixed under an arm 110 that extends from central body 105. While one end of connector 125 is fixed under central body 105, another end of connector 125 may be connected to first portion 130. As seen in FIG. 1, connector 125 is a stressed base point of UAV 100.

As seen in FIG. 1, first portion 130 is connected to connector 125 as well as to joint 135. A joint 135 may be provided between the first portion 130 and the second portion 140. The joint may permit the first portion and/or the second portion to move relative to one another. The joint may allow the first portion and the second portion to be operably coupled to one another while the first and second portion may move relative to one another. In examples, the joint may allow the first portion and the second portion to be operably coupled to one another while the first and second portion may rotate relative to one another. The joint may allow the first portion to directly contact the second portion. Alternatively, the joint may include one or more intermediary pieces that may connect the first portion and the second portion. The joint may provide one or more pivots that may allow a second portion to move relative to a first portion about an axis of rotation. In some instances, the second portion may move relative to the first portion about a single axis of rotation, two axes of rotation, or three axes of rotation. The joint may or may not include a limiting structure that may limit a degree of rotation in a single direction or multiple directions.

First portion 130 may be a large-torque worm wheel and worm motor that is fixed to connector 125 with the output axis of first portion 130 connected to joint 135, as illustrated in FIG. 1. Joint 135, as seen in FIG. 1, is a worm motor connecting base. Accordingly, the large-torque worm wheel and worm motor of first portion 130 first with the worm motor connecting base of joint 135 to form a degree of freedom of a single supporting landing gear 120.

Additionally, joint 135 is used to connect second portion 140 and the output axis of first portion 130. As seen in FIG. 1, second portion 140 is a small-torque worm wheel and worm motor. As such, the worm motor connecting base of joint 135 is used to connect the small-torque worm wheel and worm motor of second portion 140 and the output axis of the large-torque worm wheel and worm motor of first portion 130. In examples, joint 135 may remain still relative to the small-torque worm wheel and worm motor of second portion 140.

Second portion 140 may provide an additional degree of freedom of the landing gear 120. In particular, as seen in FIG. 1, the output axis of small-torque worm wheel and worm motor of second portion 140 may be fixed to the omnidirectional wheel supporting base 152 of base portion 150. As such, the output axis of small-torque worm wheel and worm motor of second portion 140 may be used to drive the omnidirectional wheel supporting base 152 of base portion 150 so as to pivot the base portion 150 around the output axis of second portion 140.

Omnidirectional wheel supporting base 152 of base portion 150 may be used to support a wheel, such as lightweight omnidirectional wheel 154. The omnidirectional wheel supporting base 152 of base portion 150 may also be used to fix a gear motor, such as direct current gear motor 156. Additionally, wheel 154 may be configured to move through a bearing. In examples, DC gear motor 156 may actuate a wheel 154 to rotate. In particular, DC gear motor 156 may drive a wheel 154 to rotate, such as through a bearing. Further, DC gear motor 156 may lock the rotation of wheel 154 by a circuit such that the wheel 154 remains locked in some working environments. Any suitable actuator may be selected based on bearing load and the dynamic requirements of landing gears of the UAV.

Wheel 154 is an end actuating element of walking system of UAV 100. Additionally, wheel 154 may be used for omnidirectional rotation on the ground. Further, wheel 154 may be auto-locked by DC gear motor 156 so as to become a ground stationary-supporting point of a landing gear 120.

As seen in FIG. 1, UAV 100 comprises four identical landing gears 120. In particular, each landing gear 120 neighbors two other landing gear 120 at 90-degree angles with respect to each other. Additionally, each landing gear 120 as seen in FIG. 1 is positioned below a corresponding arm 110 that extends from central body 105.

The arms 110 of the UAV may have a different length than the landing gear 120 of the UAV. The arms may be shorter than the landing gear of the UAV. The arms may alternatively be longer than the landing gear of the UAV, or may be the same length as the landing gear of the UAV. In some instances, a first portion 130 of a landing gear may have a same length or different length than the arm. The first portion of the landing gear may be longer or shorter than the arm. Optionally, a second portion 140 of a landing gear may have a same length or different length than the arm. The second portion of the landing gear may be longer or shorter than the arm.

The arms may have the same cross-sectional shape or dimension (e.g., length, width, diagonal, diameter) as the landing gear of the UAV. Alternatively, the arms may have a different cross-sectional shape and/or dimension relative to the landing gear of the UAV. In one example, the arms may have a larger cross-sectional dimension than the landing gear of the UAV. In another example, the arms may have a smaller cross-sectional dimension than the landing gear of the UAV. Examples of cross-sectional shapes of the arms and/or landing gear may include circles, ellipses, ovals, squares, rectangles, trapezoids, parallelograms, pentagons, hexagons, octagons, crescents, "I" shapes, "H" shapes, "X" shapes, "T" shapes, "Y" shapes, "D" shapes, or any other regular or irregular polygonal shape. The arms may be hollow or solid. In some instances, the arms may form a substantially tubular shape. In some embodiments, the dimension or shape of the arms may be determined based on the dynamic and static stress applied to a critical region of the arms.

The configuration of first portion 130 with respect to second 140 may allow landing gears 120 to move freely in a vertical plane. Additionally, wheel 154 of base portion 150 as connected to second portion 140 may allow landing gear to move along quickly across a smooth terrain. Further, when a terrain is bumpy, the landing gear may be able to walk by locking wheel 154 through the use of DC gear motor 156 and then using first portion 130 and second portion 140 to move landing gears 120 along a terrain.

The UAV body may be formed from a solid piece. Alternatively, the UAV body may be hollow or may include one or more cavities therein. The UAV body may have ay shape. The UAV may have a substantially disc-like shape in some embodiments.

The UAV body may include a housing that may partially or completely enclose one or more components therein. The components may be structural or functional components. The components may include one or more electrical components. Examples of components may include, but are not limited to, a flight controller, one or more processors, one or more memory storage units, a communication unit, a display, a navigation unit, one or more sensors, a power supply and/or control unit, one or more electronic speed control (ESC) modules, one or more inertial measurement units (IMU) or any other components. Examples of sensors on a UAV (which may be within the housing, outside the housing, embedded in the housing, or any combination thereof) may include one or more of the following: one or more sensors can comprise one or more of: a global positioning system (GPS) sensor, a vision sensor, a temperature sensor, a lidar sensor, an ultrasonic sensor, a barometer, or an altimeter. Any sensor suitable for collecting environmental information can be used, including location sensors (e.g., GPS sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors.

Similarly, any of the components described may be disposed on, within, or embedded in an arm of the UAV. The arms may optionally include one or more cavities that may house one or more of the components (e.g., electrical components). In one example, the arms may or may not have inertial sensors that may provide information about a position (e.g., orientation, spatial location) or movement of the arms. The various components described may be distributed on a body of the UAV, the arms of the UAV, or any combination thereof.

The position of landing gears 120 with respect to a base central body 105 may differ based on whether the UAV 100 is in flight. For example, when the UAV is in flight, landing gear 120 of the UAV 100 that is attached to and/or integrated within the UAV 100 may be in a retracted position. In particular, landing gear 120 may be in a retracted position so as to have landing gear 120 positioned directly beneath arms 110 of a central body 105. This is illustrated in FIGS. 1-3.

As discussed above, FIG. 1 provides a perspective view of an aerial vehicle having a walking system comprising landing gear in a flight configuration, in accordance with embodiments. Additionally, FIGS. 2 and 3 provide a bottom view and an overhead view of an aerial vehicle having a walking system in a flight configuration, respectively, in accordance with embodiments. FIGS. 2 and 3 illustrate central body 105, arms 110, propulsion unit 115, and landing gears 120, where landing gears 120 comprise first portion 130, second portion 140, and DC gear motor 156. As seen in FIGS. 1-3, when an aerial vehicle is in flight, landing gears 120 of UAV 100 may be retracted in a horizontal direction. In particular, the lightweight omnidirectional wheel 154 is retracted under the propulsion unit 115 at the end of arm 110 that extends from base unit 105. Additionally, when landing gears 120 is in a locked position, first portion 130, second portion 140, and DC gear motor 156 may each be in a locked state. Accordingly, when first portion 130, second portion 140, and DC gear motor 156 are in a locked state, the UAV 100 may have little to no shaking and/or wagging while the aerial vehicle is in flight.

Figure 2:
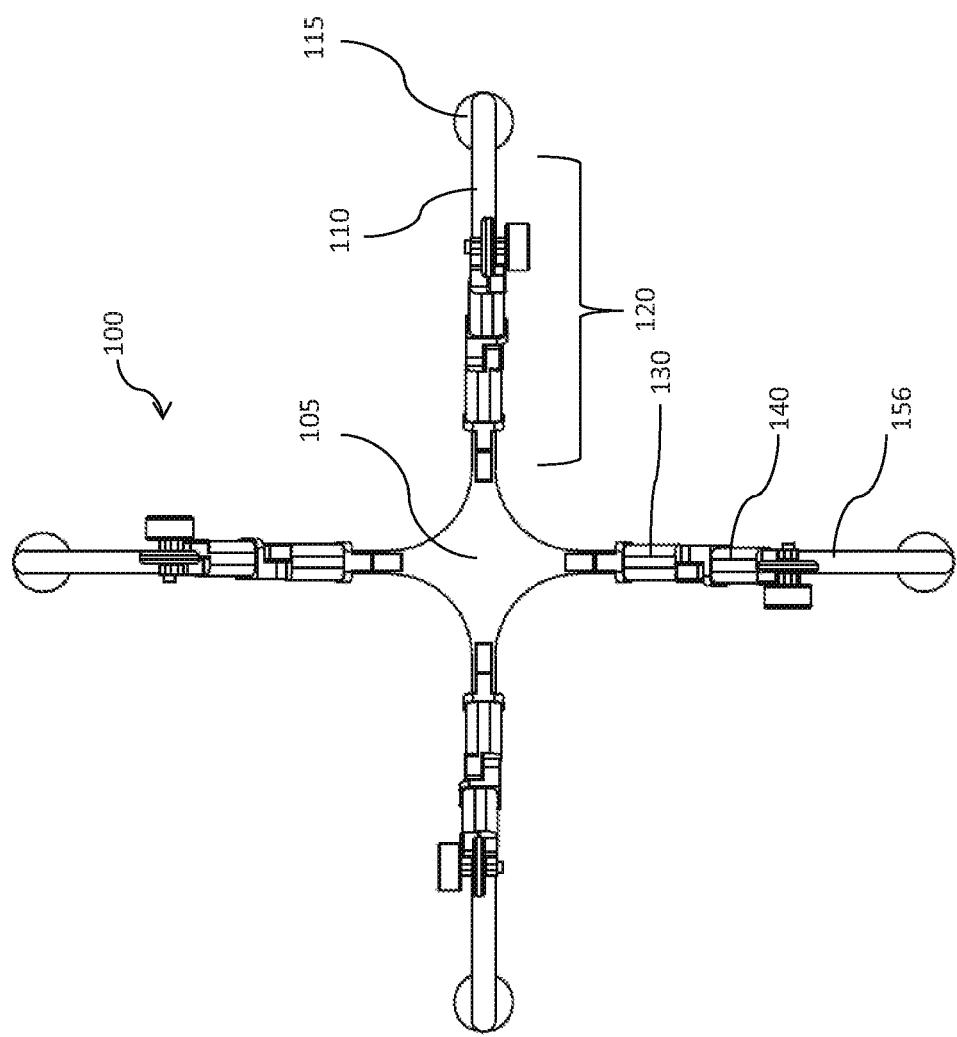
FIG. 2 provides a bottom view of an aerial vehicle having a walking system in a flight configuration, in accordance with embodiments.
Figure 3:
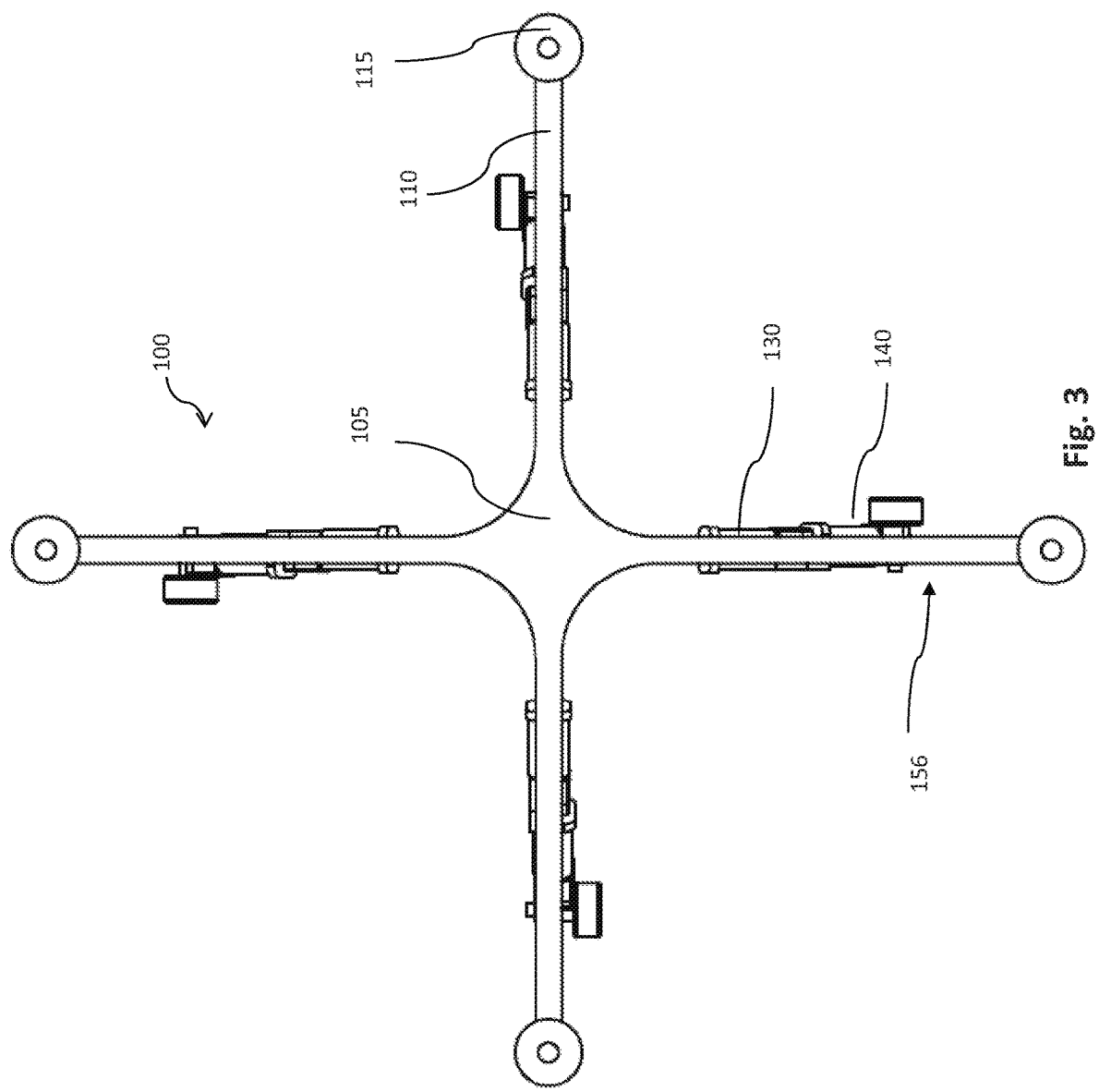
FIG. 3 provides an overhead view of an aerial vehicle having a walking system in a flight configuration, in accordance with embodiments.

FIGS. 2 and 3 also illustrate an alignment of landing gears 120 with arms 110. In particular, as seen in FIGS. 2 and 3, portions of landing gears 120 may have a width that is as narrow as or narrower than a width of a corresponding arm 110. In examples, arms 110 may have a width that is less 2 cm, 2 cm, 3 cm, 4 cm, 5 cm, 6 cm, 7 cm, 8 cm, 9 cm, 10 cm, or more than 10 cm. In additional examples, landing gears 120 may have a width that is less 2 cm, 2 cm, 3 cm, 4 cm, 5 cm, 6 cm, 7 cm, 8 cm, 9 cm, 10 cm, or more than 10 cm. In further examples, landing gears 120 may have a width that is equal or lesser than arms 110. In other examples, portions of landing gears 120 may have a width that is equal or less than portions of arms 110. Additionally, while wheel 154 is shown as extending beyond a width of arm 110, additional embodiments may be provided for pivoting wheel 154 so as to be stored directly beneath arm 110 while a UAV 100 is in a flying mode.

Figure 4:
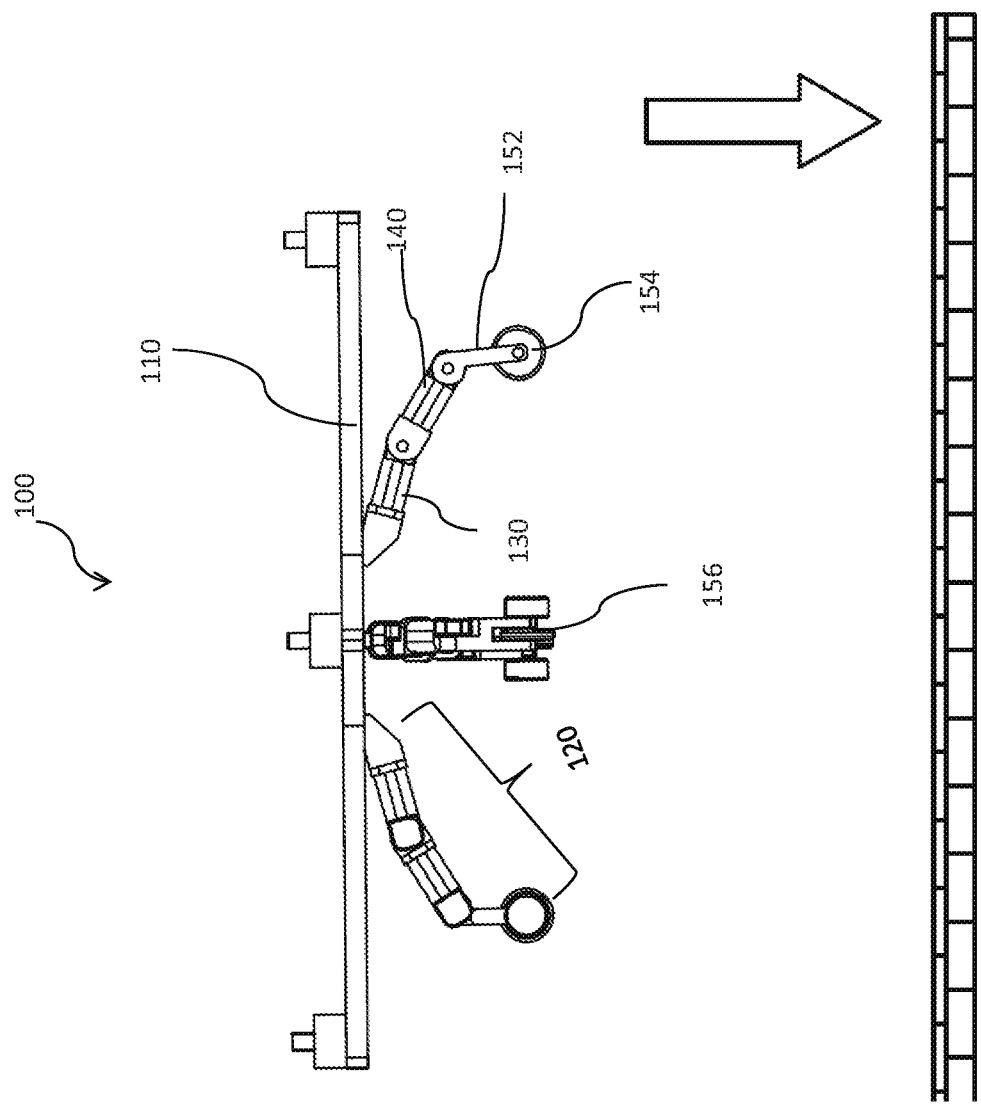
FIG. 4 provides an illustration of an aerial vehicle having a walking system in a landing configuration, in accordance with embodiments.

As discussed above, landing gears 120 may be stored in a horizontal position when a UAV 100 is in flying mode. However, when the aerial vehicle is landing, landing gears 120 may begin to descend even though the aerial vehicle is still in flight. This is shown in FIG. 4, which illustrates landing gears 120 that are in a landing configuration. In particular, FIG. 4 provides an illustration of an aerial vehicle having a walking system in a landing configuration, in accordance with embodiments.

As seen in FIG. 4, when the aerial vehicle is landing, the UAV 100 may have landing gears 120 that are bending downward so as to form an attitude of a foot stand base. As or before the aerial vehicle is landing, the first portion 130 and second portion 140 of landing gears may rotate clockwise so as to cause the omnidirectional wheel supporting base 152 of base portion 150 to be in a vertical state. Further, DC gear motors 156 of base portion 150 may lock a wheel 154 of base portion into a locked state until the aerial vehicle completes a landing sequence on the ground.

The landing configuration of FIG. 4 illustrates positions of landing gears 120 when the aerial vehicle is preparing to land on a smooth surface. Accordingly, the landing gears 120 of the UAV 100 are aligned at the same vertical height. In some examples, the landing gears 120 may be in a locked position when landing on a smooth surface. In other examples, landing gears 120 may not be locked in position, but rather, may have some shock support for landing. Having some flexibility in landing allows the landing gears 120 to spread the force that occurs during landing over an increased distance. For example, in some examples, landing gears 120 may bend slightly as the UAV connects with the ground so as to reduce stress on the landing gears 120 and/or the UAV 100.

In additional examples, the landing configuration of a UAV may be tailored to the particular terrain associated with a landing spot. In some examples, the landing configuration of a UAV may automatically adapt to the particular terrain associated with a landing spot. This may be beneficial when the UAV 100 is landing in an area with rough terrain. For example, in some examples, the terrain may be jagged such that a landing position of the aerial vehicle may require two landing gears 120 to be at a slightly higher elevation than two other landing gears 120. In order to accommodate the rocky terrain, the landing gears may be pre-positioned in a particular configuration using first portion 130 and second portion 140 of the particular landing gears 120. In further examples, the landing gears 120 may be bendable during landing such that one or more landing gears 120 that impact a surface prior to other landing gears 120 may bend so as to accommodate a difference in elevations.

Once a UAV 100 has landed on the ground, the walking system of the UAV 100 may be used to traverse a distance over the ground. The walking system of the UAV may be used to move the UAV in a number of different directions, such as front, back, left, right, diagonal, and/or in a curved direction. As UAV 100 has omnidirectional wheel 154, the direction of the movement of each wheel, and therefore the UAV, may be in any direction. The precise turning of the omnidirectional wheel 154 may be of less than 1°, 1°, 2°, 3°, 4°, 5°, 10°, 20°, 30°, 40°, 45°, 50°, 60°, 70°, 80°, 90°, 180°, 270°, 360°, or more than 360°.

Figure 5:
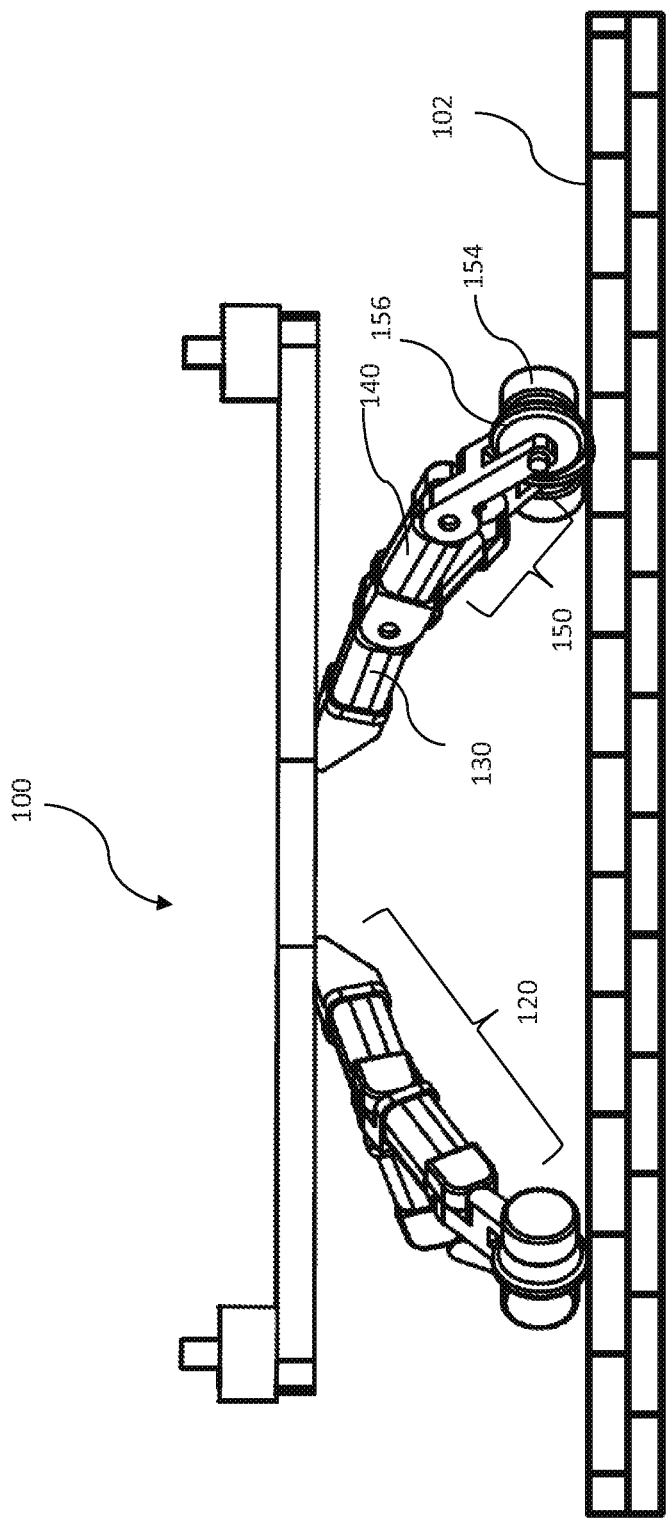
FIG. 5 provides an illustration of an aerial vehicle having a walking system in a surface configuration, in accordance with embodiments.
Figure 6:
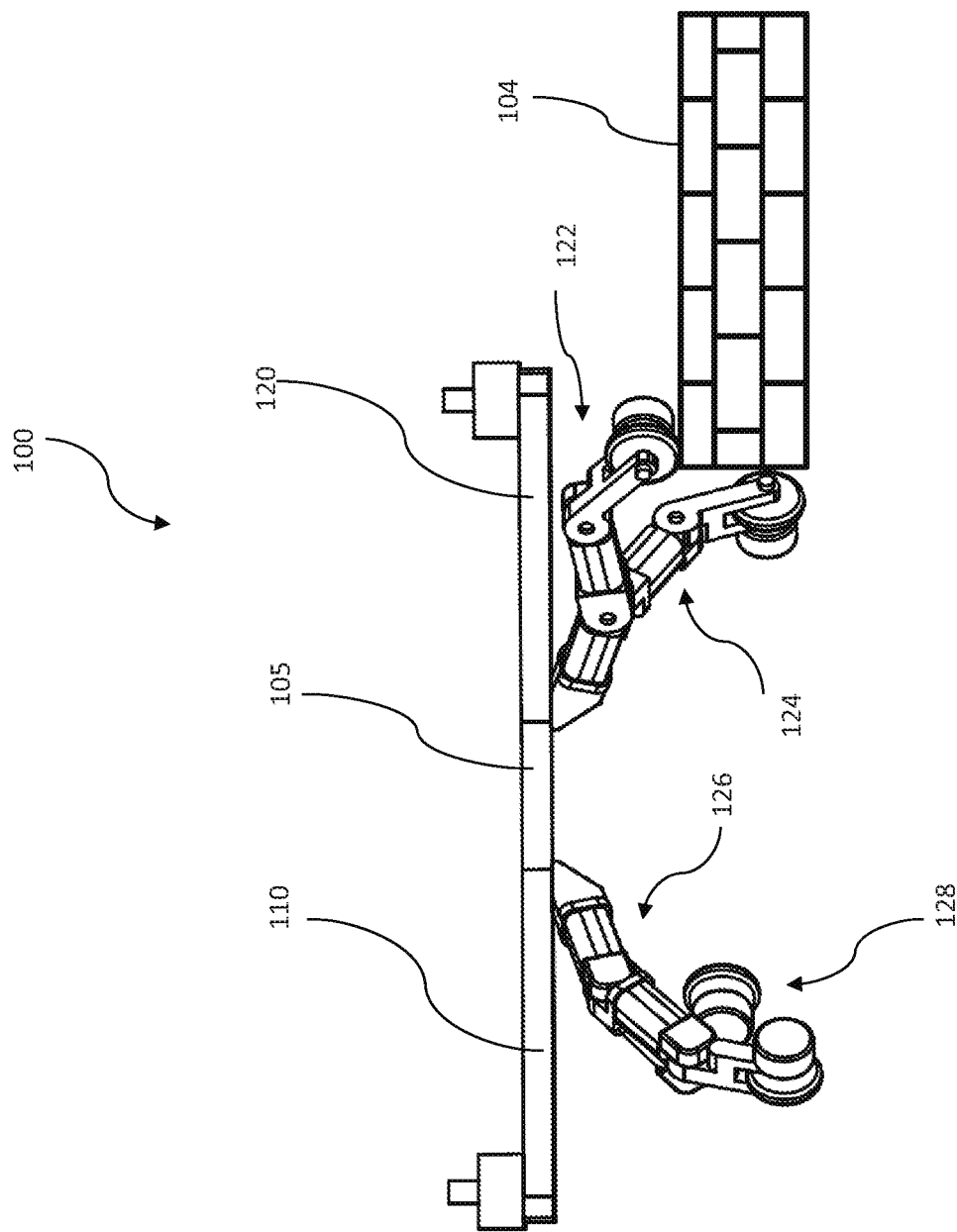
FIG. 6 provides an illustration of an aerial vehicle having a walking system in a first position as it transverses stepped terrain, in accordance with embodiments.
Figure 7:
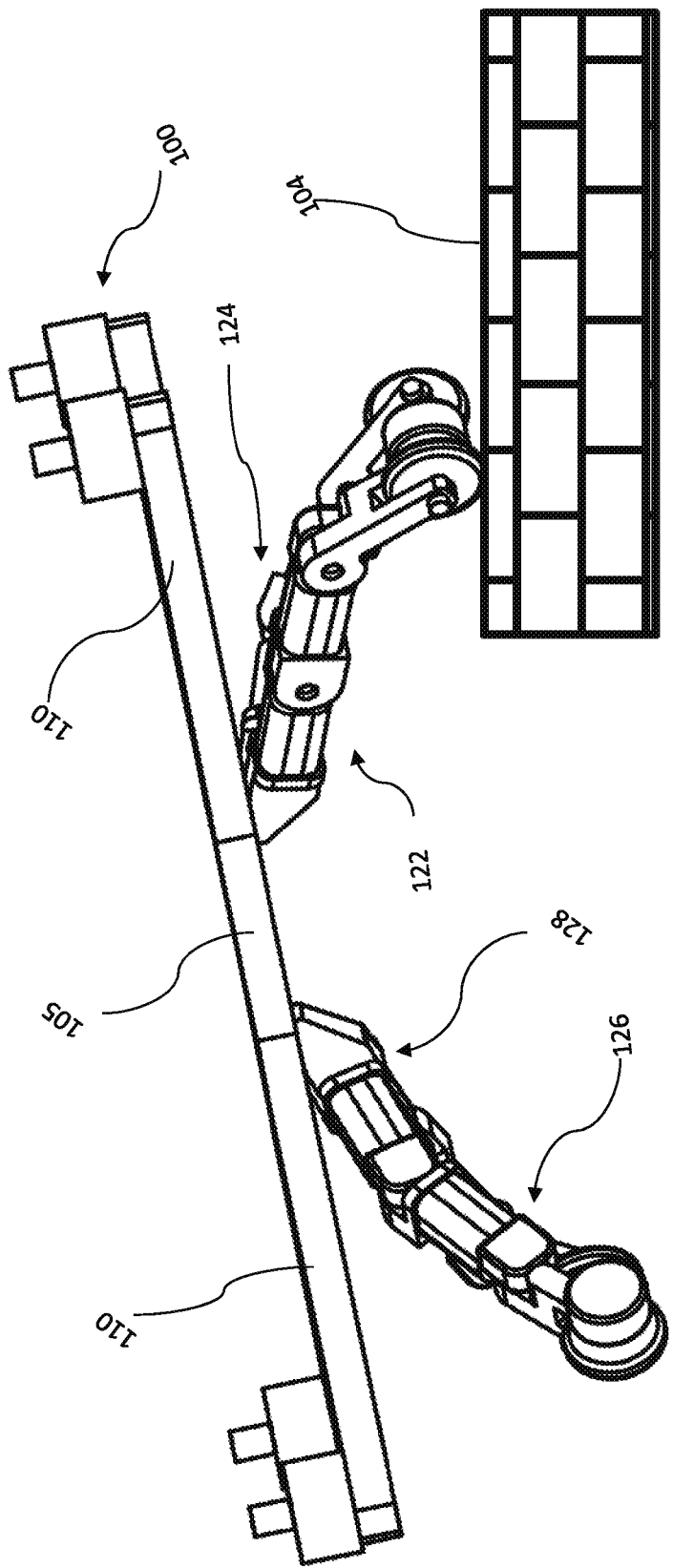
FIG. 7 provides an illustration of an aerial vehicle having a walking system in a second position as it transverses stepped terrain, in accordance with embodiments.

The terrain that the UAV 100 traverses may differ based on a location of the landing site. In some examples, the terrain may be smooth, rocky, icy, bumpy, sloped, stepped, or another type of terrain. In particular, in some examples, an individual landing gear 120 of the one or more landing gears 120 of the walking system of the UAV 100 may be configured to transport an aerial vehicle, such as a UAV, over a plurality of types of terrain selected from the group consisting of smooth terrain, sloped terrain, slippery terrain, rocky terrain, and icy terrain. Further, in examples, an individual landing gear 120 of the one or more landing gears 120 may be configured to transport the UAV over a plurality of types of terrain by way of walking, sliding, suction, climbing, jumping and/or running. As seen in FIGS. 5-7, a UAV 100 may be used to traverse smooth terrain and stepped terrain, as well as additional terrains further described herein.

As mentioned above, the walking system of UAV 100 may be used to traverse a smooth terrain using wheels such as omnidirectional wheels 154 as provided in FIG. 1. Accordingly, FIG. 5 provides an illustration of an aerial vehicle having a walking system in a surface configuration, in accordance with embodiments.

When the UAV 100 is traversing smooth terrain, the UAV 100 may utilize wheels 154 that are part of landing gears 120 so as to slide across the smooth terrain 102. In particular, when the UAV 100 is traversing smooth terrain, a DC gear motor 156 that is part of base portion 150 of landing gear 120 may unlock wheel 154 so that wheel 154 may move freely. Additionally, in examples, wheel 154 may be an omnidirectional wheel so that wheel 154 may move freely across the smooth terrain. In further examples, wheel 154 may be within a wheel cover that limits the directionality of movement of wheel 154.

In some examples, wheel 154 may have a brake component (not shown) that may be used to slow down wheel 154, and in turn, slow down the UAV 100. The brake component may be an automatic brake that slows or maintains speed for wheel 154 if and when wheel 154 exceeds a threshold speed. In other examples, DC gear motor 156 may be used to speed up and/or slow down wheel 154.

In additional examples, if the smooth terrain begins to slope, a central body 105 of the UAV 100 may maintain an appropriate height by correspondingly controlling, such as adjusting, the three motors that are associated with each landing gear 120. In particular, each landing gear 120 has a motor associated with first portion 130, second portion 140, and base portion 150. Accordingly, as a UAV 100 traverses a sloped terrain, one or more DC gear motors 156 associated with each of the four landing gears 120 illustrated in FIG. 5 may synchronize their rotation at a certain speed and/or with a certain direction so as to move the UAV 100 forward. In some examples, one or more DC gear motors 156 may be controlled according to specific kinematics of the landing gears to move the UAV 100 in a different pattern of movement. For example, when a UAV 100 initiates a curving movement, one or more of the landing gears of a UAV may move at different speeds than other landing gears of the UAV. By using DC gear motors 156 associated with landing gears 120, UAV 100 may be directed to slide laterally, curve, and/or spin as it traverses the smooth terrain.

While FIG. 5 illustrates how a UAV 100 may traverse a smooth terrain, aerial vehicles that are used to access remote areas such as caves and earthquake relief sites may encounter non-smooth terrain, such as rough and/or stepped terrain. As such, it is beneficial for a UAV 100 to be able to traverse other types of terrain beyond smooth terrain. Accordingly, FIGS. 6 and 7 provide illustration of two positions of a UAV 100 as it traverses a stepped terrain 104.

In particular, FIG. 6 provides an illustration of an aerial vehicle having a walking system in a first position as it transverses stepped terrain 104, in accordance with embodiments. As seen in FIG. 6, a first landing gear 122 has bent upward so as to rest wheel 154 on top of the stepped terrain. First landing gear 122 is bent upwards towards an arm 110 of central body 105 of UAV 100. In particular, landing gear 122 is reconfigured by using at least the large-torque worm motor that is associated with first portion of landing gear 122. In particular, the large-torque worm motor of the first portion 130 of landing gear 122 may be used to raise the second portion 140 of landing gear 122 high enough such that wheel 154 as connected to the small-torque worm motor through omnidirectional wheel base 152 is able to be raised high enough to rest on the step of stepped terrain 104. In some examples, the small-torque worm motor of second portion 140 may be used to raise wheel 154 by raising omnidirectional wheel base 152 connected to second portion 140.

As seen in FIG. 6, however, landing gear 122 does not pass the plane as established by central body 105. This is because, as seen in FIGS. 2 and 3 for example, landing gear 122 is positioned directly below an arm 110 of central body 105. As the step of the stepped terrain 104 is below the plane of the central body 105, landing gear 122 may rest wheel 154 upon the step without altering a position of central body 105. As such, central body 105 as seen in FIG. 6 is level.

Additionally as seen in FIG. 6, landing gears 124, 126, and 128 are not positioned on the stepped terrain 104. Rather, landing gears 124, 126, and 128 are positioned on a portion of smooth terrain, and as such, are able to slide towards stepped terrain 104 even as landing gear 122 is raised in anticipation of climbing the step of stepped terrain 104. In this way, different landing gears 120 may be in different terrain modes at different times.

In examples, the movement of a particular landing gear 120 may be governed by a mode of movement. In particular, and as seen in FIG. 6, one or more landing gears 120 may be in a climbing mode while other landing gears 120 may be in a sliding mode. The particular mode of movement that governs individual landing gears 120 may be determined based on the terrain that each individual landing gear 120 is contacting in a particular situation. In some examples, the landing gears 120 may preemptively switch modes of movement when a new terrain is anticipated. For example, if a UAV 100 is about to traverse a downhill slope, the landing gears 120 of the UAV may preemptively move a majority of landing gears 120 and/or all available landing gears 120 into a breaking mode so as to use each braking component of the landing gears 120 in a uniform manner across the sloped terrain. In this way, landing gears may also be used collectively so as to efficiently navigate different terrains.

FIG. 7 provides an illustration of an aerial vehicle having a walking system in a second position as it transverses stepped terrain, in accordance with embodiments. As seen in FIG. 7, a first landing gear 122 and second landing gear 124 are now bent upward so as to rest their wheels 154 on top of the stepped terrain. Additionally, while first landing gear 122 and second landing gear 124 are both bent upwards towards arms 110 of central body 105 of UAV 100, the angle of the bending is less steep as the UAV is beginning to climb up the step of stepped terrain 104. In particular, first landing gear 122 and second landing gear 124 reconfigured by using at least the large-torque worm motor that is associated with first portions of first landing gear 122 and second landing gear 124, respectively, but at a lesser angle than see in FIG. 6. Similar to FIG. 6, however, the large-torque worm motor of the first portions 130 of landing gears 122 and 124 may be used to raise the second portions 140 of landing gears 122 and 124 high enough such that wheels 154 as connected to the small-torque worm motors through omnidirectional wheel bases 152 are able to be raised high enough to rest on the step of stepped terrain 104. In some examples, the small-torque worm motor of second portions 140 may be used to raise wheels 154 by raising omnidirectional wheel bases 152 connected to second portions 140. The angle required for resting wheel bases 152 is less, however, since the raising of a forward portion of UAV 100 lessens the need for landing gears 122 and 124 to make the entire vertical traversal on their own.

Similar to FIG. 6, however, landing gears 122 and 124 as seen in FIG. 7 do not pass the plane as established by central body 105. Because of this, the central body 105 of UAV 100 angles upward if and when a vertical traversal would exceed the height between central body 105 and an extension of landing gears 120. While the step of the stepped terrain 104 is below the plane of the central body 105, such that landing gears 122 and 124 would be able to rest wheels 154 upon the step without altering a position of central body 105, the stepped configuration of FIG. 7 illustrates central body 105 aiding in the climbing process by tilting upwards, thereby reducing the need for landing gears 122 and 124 to traverse the vertical height using only the three motors associated with first portion 130, second portion 140, and base portion 150. As such, central body 105 as seen in FIG. 7 is tilted.

Additionally, as seen in FIG. 7, landing gears 126 and 128 are not positioned on the stepped terrain 104. Rather, landing gears 126 and 128 are positioned on a portion of smooth terrain, and as such, are able to slide towards stepped terrain 104 even as landing gears 122 and 124 are raised in climbing the step of stepped terrain 104. In this way, different landing gears 120 may be in different terrain modes at different times. In particular, landing gears 126, 128 may be in a sliding mode as landing gears 122, 124 are in a climbing mode.

As seen in FIGS. 1-7, landing gears 120 of a UAV 100 may be positioned directly beneath an arm 110 that is an extension of central body 105. However, as seen in FIGS. 6 and 7, when landing gears 120 are positioned directly beneath arms 110, the bend of the landing gears 120 may be limited by a plane of the central body 105. Accordingly, when landing gears 120 are positioned directly beneath arms 110, the mobility of the UAV 100 may be limited.

Figure 8:
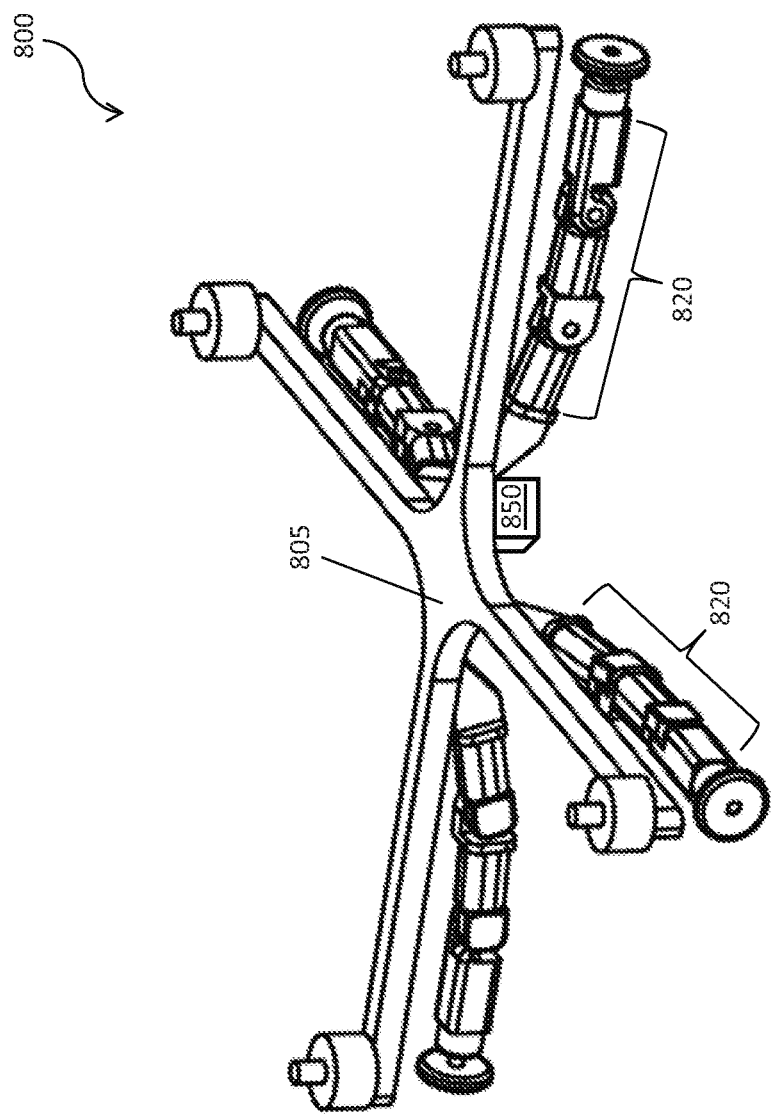
FIG. 8 provides an illustration of an unmanned aerial vehicle (UAV) having a payload below the central body of the UAV, in accordance with embodiments.

In additional embodiments, the UAV may provide a payload. FIG. 8 provides an illustration of an unmanned aerial vehicle (UAV) 800 having a payload 850 below the central body 805 of the UAV, in accordance with embodiments. In examples, payload 850 may be coupled to central body 805. In examples, payload 850 may be integrally coupled to central body 805. In examples, payload 850 may be removably coupled to central body 805. Additionally, FIG. 9 provides an illustration of an unmanned aerial vehicle (UAV) 900 having payload 950 attached to the central body 905 of the UAV via a carrier 945, in accordance with embodiments.

Figure 9:
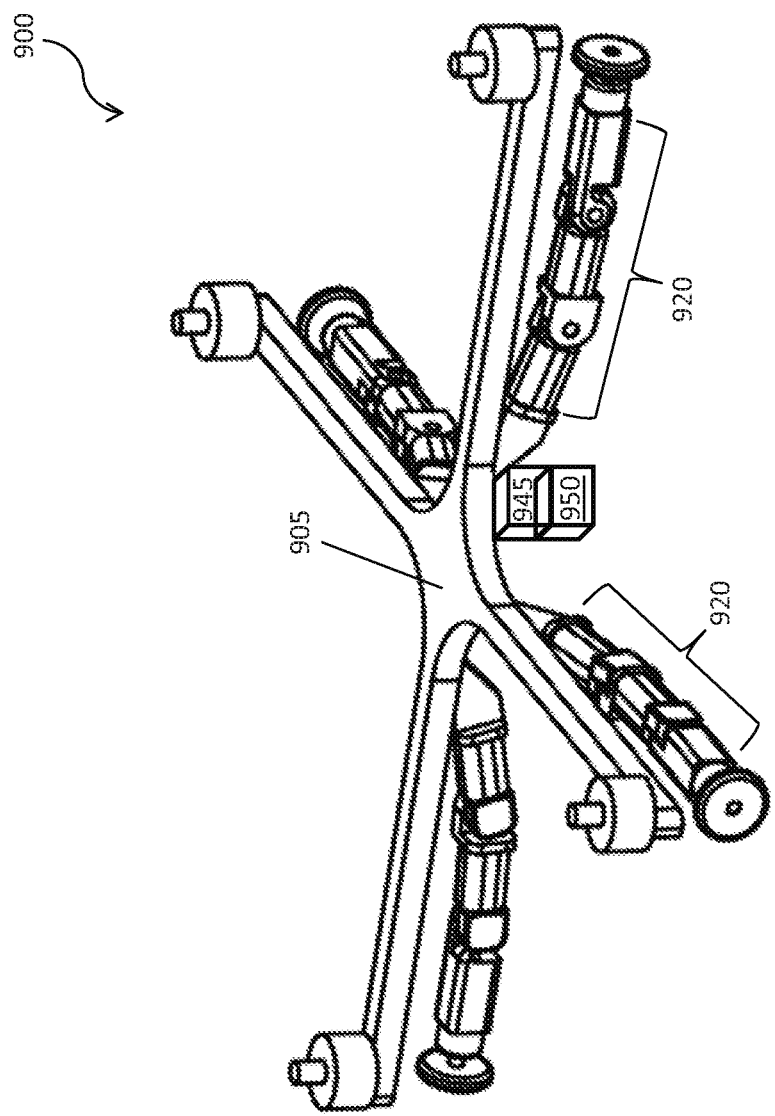
FIG. 9 provides an illustration of an unmanned aerial vehicle (UAV) having payload attached to the central body of the UAV via a carrier, in accordance with embodiments.

As seen in FIGS. 8 and 9, UAV 800, 900 may carry a payload 850, 950, respectively. Additionally, FIG. 9 provides a carrier 945 that attaches payload 950 to the central body 905 of UAV 900. The payload may include a device capable of sensing the environment about the movable object, a device capable of emitting a signal into the environment, and/or a device capable of interacting with the environment.

One or more sensors may be provided as a payload, and may be capable of sensing the environment. An example of a sensor may be a camera. Any other sensors, such as those described elsewhere herein may be provided as a payload.

In one example, the payload may be a camera. Any description herein of a camera may apply to any type of image capture device, and vice versa. A camera may be a physical imaging device. An imaging device can be configured to detect electromagnetic radiation (e.g., visible, infrared, and/or ultraviolet light) and generate image data based on the detected electromagnetic radiation. An imaging device may include an image sensor, such as a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc.). The camera may capture color images, greyscale image, infrared images, and the like.

The camera may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution.

The camera may capture a sequence of images at a specific capture rate. In some embodiments, the sequence of images may be captured standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The camera may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

One or more cameras supported by the UAV may have one or more of the same parameters, characteristics or features. In some instances, all of the cameras supported by the UAV may have the same characteristics or features. Alternatively, one or more of the cameras supported by the UAV may have different characteristics or features. In some instances, each of the cameras supported by the UAV may have different characteristics or features.

The one or more cameras may be supported by a UAV body. The one or more cameras may be supported on a central body of the UAV. The one or more cameras may or may not be supported on one or more arms of the UAV. The one or more cameras may be supported by a housing of the UAV. The one or more cameras may be attached to an external surface of the housing the UAV. The one or more cameras may be embedded within an external surface of the housing of the UAV. The one or more cameras may have an optical element, such as a lens, that may be exposed to an environment exterior to the UAV. The optical element may optionally be protected from an environment exterior to the UAV with aid of a cover. The cover may be transparent. The cover may or may not include an optical filter.

Any number of cameras may be provided. For instance, there may be 1 or more, 2 or more, 3 or more, 4 or more, 5 or more cameras supported by the UAV.

The payload may include one or more devices capable of emitting a signal into an environment. For instance, the payload may include an emitter along an electromagnetic spectrum (e.g., visible light emitter, ultraviolet emitter, infrared emitter). The payload may include a laser or any other type of electromagnetic emitter. The payload may emit one or more vibrations, such as ultrasonic signals. The payload may emit audible sounds (e.g., from a speaker). The payload may emit wireless signals, such as radio signals or other types of signals.

The payload may be capable of interacting with the environment. For instance, the payload may include a robotic arm. The payload may include an item for delivery, such as a liquid, gas, and/or solid component. For example, the payload may include pesticides, water, fertilizer, fire-repellant materials, food, packages, or any other item.

The payload may be stationary relative to a UAV body. The payload may be configured so that it does not move relative to the UAV body during operation of the UAV (e.g., flight of the UAV). The payload may be configured so that it does not move relative to the UAV body during operation of the payload (e.g., capturing images by a camera). The payload may be affixed relative to the UAV body.

The payload may be movable relative to a UAV body. The payload may be configured so that it is capable of movement relative to the UAV body during operation of the UAV (e.g., flight of the UAV). The payload may be configured so that the payload is capable of movement relative to the UAV body during operation of the payload (e.g., capturing images by a camera). The payload may be supported with aid of one or more carriers or components that may enable the payload to move relative to the UAV body. For instance, a payload may translate along one, two or three directions relative to the UAV body, or rotate about one, two, or three axes relative to the UAV body. The carrier may permit a change in orientation of the payload relative to the UAV body. The payload may be supported by a carrier having a gimbaled frame assembly. Any characteristics described elsewhere herein for a payload and a carrier may be applied. The payload may be moved relative to the UAV body with aid of one or more actuators.

The payload may be supported by the UAV body. The payload may be supported by one or more arms of the UAV. The payload may be beneath the UAV body. The payload may be supported beneath a central body, above a central body, or on a side of a central body.

A payload may have a functional space. The payload can be configured to perform a function or operation. The function or operation of the payload may require a certain amount of functional space. The functional space can be, for example, a space occupied, affected, manipulated, or otherwise used by the payload during its operation. In some instances, however, the functional space may be obstructed by a portion of the transformable aerial vehicle. Any obstruction of a functional space may interfere with the operation of the payload. In one example, a functional space of the payload may include a sensing field of a payload. For example, when a payload is a camera, the functional space of the camera may be a field of view of the camera.

Landing gear 820, 920 of FIGS. 8 and 9, respectively, may be configured so that while in a flight configuration, the landing gear does not interfere with the functional space of the payload. In a landing configuration and/or surface configuration, the landing gear may interfere with the functional space of the payload. Thus, the functional space of the payload may be increased when the UAV is in flight and may be decreased when the UAV is landed and/or walking. The functional space of the payload may be increased when one or more landing gear are in a flight configuration and may be decreased when the one or more landing gear are in a landing configuration and/or walking configuration.

For example, the payload may be a camera. The camera may have a field of view that is unobstructed by the landing gears of the UAV when the UAV is in flight. The camera may have a field of view that is obstructed by one or more landing gears of the UAV when the UAV is landed. The camera may have a field of view that is unobstructed when the UAV the one or more landing gear are in a flight configuration. The camera may have a field of view that is obstructed by a portion of the one or more landing gear when the one or more landing gear are in a landing configuration and/or a surface configuration. The field of view may be unobstructed for a 360 degree panoramic view around the camera when the UAV is in flight. The camera may rotate to capture a 360 panoramic view (e.g., about a yaw axis). The camera may be permitted to rotate at least 360 degrees, at least 720 degrees, or even more.

Decreased functional space (e.g., obstruction to a potential field of view of a camera) that may occur during landing and/or walking may be acceptable since the UAV is on the ground, while allowing the UAV to have increased functional space (e.g., a potential 360 degree panoramic view) while the UAV is flying around.

Flight of the UAV may be controlled with aid of a remote terminal. A user may interact with the remote terminal to control flight of the UAV. The remote terminal may initiate flight of the UAV, walking of the UAV, and/or landing of the UAV. The remote terminal may or may not directly control transformation of one or more landing gears of the UAV. In some instances, the transformation of the one or more landing gears may occur automatically in response to a sensed condition, or a command to walk or land or take-off. The remote terminal may initiate one or more predetermined flight sequence or a type of flight mode. The UAV may be capable of autonomous, semi-autonomous, or direct manual controlled flight.

Operation of one or more components of the UAV may be controlled with aid of a remote terminal. The remote terminal controlling operation of the one or more components of the UAV may be the same as a remote terminal controlling flight of the UAV, or may be a different device from the remote terminal controlling flight of the UAV. The remote terminal may control operation of a payload, such as a camera. The remote terminal may control positioning of the payload. The remote terminal may control operation of a carrier that supports the payload, which may affect positioning of the payload. The remote terminal may affect operation of one or more sensors carried by the UAV.

In some examples, however, the landing gears may be movable with respect to the central body of a UAV and/or movable with respect to each other. In particular, the landing gears may be connected to a base unit using a track along which connectors that connect leg components to the base unit may move. Embodiments of this example of the disclosure are discussed further below.

Figure 10:
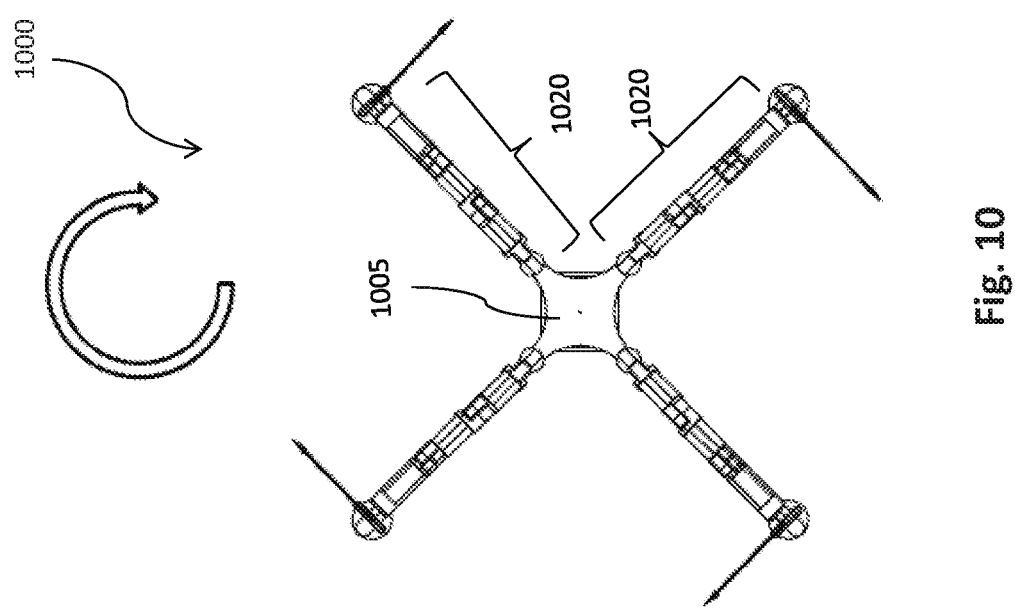
FIG. 10 provides an illustration of clockwise leg movement of the landing gears, in accordance with embodiments.

In some examples, landing gear 1020 of a walking system of a UAV 1000 may move clockwise with respect to a central body 1005, a surface, and/or with respect to one another. Accordingly, FIG. 10 provides an illustration of clockwise leg movement of the landing gears, in accordance with embodiments. In additional examples, landing gears 1020 of a UAV 1000 may move counter-clockwise with respect to a central body 1005 and/or with respect to one another.

Figure 11:
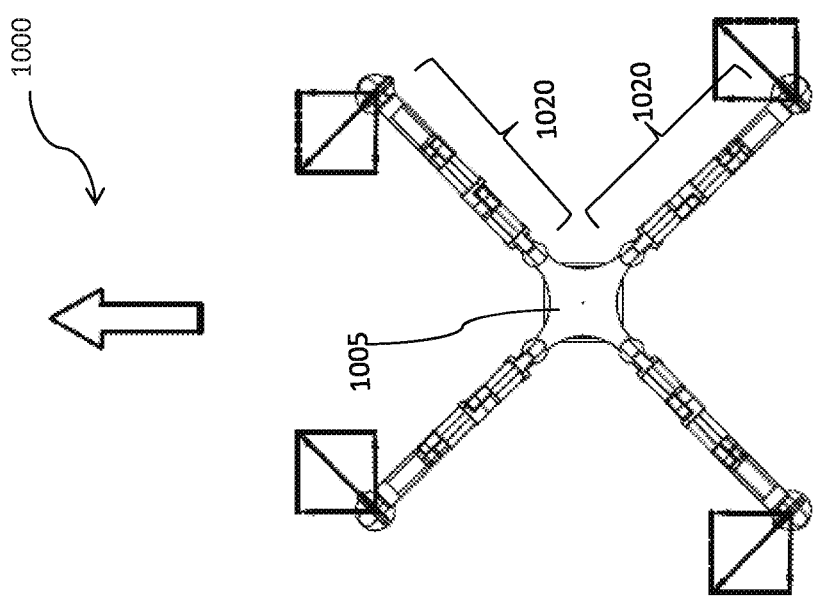
FIG. 11 provides an illustration of vertical leg movement of the landing gears, in accordance with embodiments.

In additional examples, landing gears 1020 may move forward with respect to the UAV 1000. In particular, when a UAV 1000 is traversing rocky terrain, it may be beneficial to move landing gears 1020 towards a front portion of the UAV 1000 so as to provide more power when climbing the rocky terrain. Accordingly, FIG. 11 provides an illustration of vertical leg movement of the landing gears, in accordance with embodiments.

Figure 12:
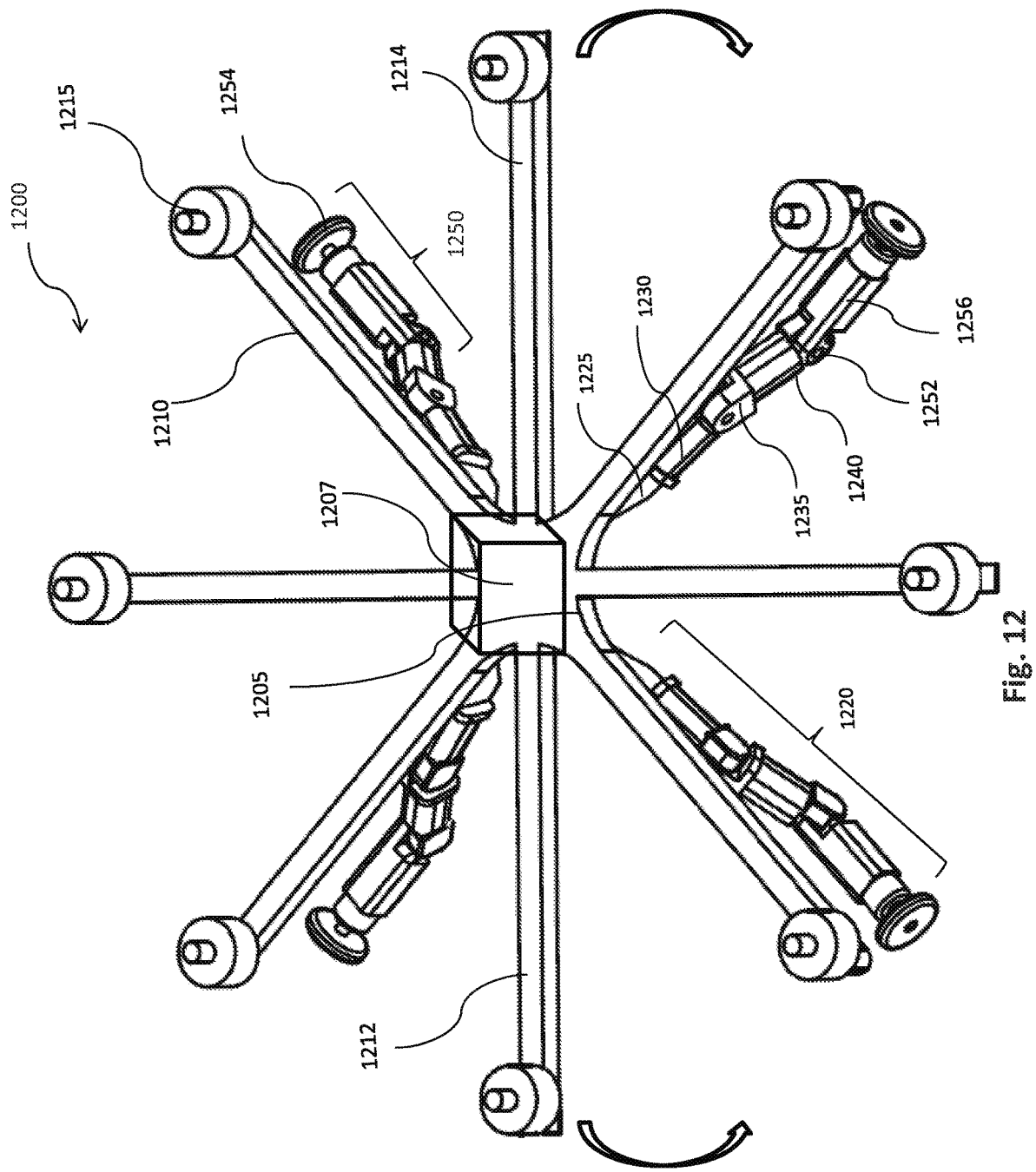
FIG. 12 provides an illustration of an eight-arm, four-legged aerial vehicle having a walking system comprising four landing gears and eight non-transformable arms, in accordance with embodiments.

FIG. 12 provides an illustration of an eight-arm, four-landing gear aerial vehicle having a walking system comprising four landing gears and eight non-transformable arms, in accordance with embodiments. In particular, FIG. 12 illustrates a central body 1205. As seen in FIG. 12, base unit 1205 is integrated within a main frame of an aerial vehicle. In particular, central body 1205 as shown comprises eight arms 1210 that are configured to support propulsion units. In some examples, arms 1210 may be composed of carbon fiber. Additionally, each of arms 1210 may be configured to support a propulsion unit of a UAV. In examples, a plurality of arms 1210 may be configured to support a plurality of propulsion units of a UAV. Additionally, each of the propulsion units may provide flight power to the UAV. Also, as seen in FIG. 12, each of arms 1210 may support a propulsion unit 1215.

UAV 1200 also comprises landing gears 1220. Landing gears 1220 are attached to central body 1205 via a connector 1225. In examples, landing gears 1220 may be coupled to central body 1205. In some examples, landing gears 1220 may be releasably coupled to central body 1205. In some examples, landing gears 1220 may be integrally coupled to central body 1205. In examples, connector 1225 may be a foot stand base. In some examples, connector 1225 may be attached directly to central body 1205. In some examples, connector 1225 may be attached to a movement track (not shown) which, in turn, may be attached directly to base unit 1205. In additional examples, connectors 1225 that are attached to a movable track (not shown) may be movable with respect to central body 1205. In examples, landing gears 1220 may be movable along movable track (not shown) using controller 1207. Controller 1207 may be configured to control the motion and position of the landing gears. In examples, controller 1207 may include one or more processors. The one or more processors can be programmable, such as a PC, microcomputer, microcontroller, DSP, ASICs, PLC, among others. The one or more processors can be located on a carrier platform. In some examples, the one or more processors can be operatively coupled to the carrier platform. In some examples, controller 1207 may be a servo mechanism. For example, connectors 1225 may be able to be translated along the movable track (not shown) to different areas of central body 1205. In this way, connectors 1225 as well as landing gears 1220 may be translatable with respect to central body 1205. In additional examples, landing gears 1220 may be rotatable with respect to central body 1005.

Additionally, as seen in FIG. 12, landing gears 1220 may comprise a first portion 1230, a joint 1235, and a second portion 1240. As seen in FIG. 12, first portion 1230 and second portion 1240 are approximately the same length. In some examples, first portion 1230 and second portion 1240 may be different lengths. In some examples, first portion 1230 may be less than 50 mm, 50 mm, 100 mm, 150 mm, 200 mm, 250 mm, 300 mm, 350 mm, 400 mm, 5 cm, 6 cm, 7 cm, 8 cm, 9 cm, 10 cm, 11 cm, 12 cm, 13 cm, 14 cm, 15 cm, 20 cm, 25 cm, 30 cm, 35 cm, 40 cm, 45 cm, 50 cm, or more than 50 cm. Similarly, in some examples, second portion 1240 may be less than 50 mm, 50 mm, 100 mm, 150 mm, 200 mm, 250 mm, 300 mm, 350 mm, 400 mm, 5 cm, 6 cm, 7 cm, 8 cm, 9 cm, 10 cm, 11 cm, 12 cm, 13 cm, 14 cm, 15 cm, 20 cm, 25 cm, 30 cm, 35 cm, 40 cm, 45 cm, 50 cm, or more than 50 cm. In some examples, first portion 1230 and second portion 1240 may be the same length. In some examples, first portion 1230 may multiple lengths of second portion 1240. In some examples, second portion 1240 may be multiple lengths of first portion 1230.

In examples, first portion 1230 may comprise a large-torque worm wheel and worm motor. In other examples, first portion 1230 may comprise a different type of motor and/or gear mechanism. In examples, first portion 1230 may comprise a direct-current motor, a cylindrical gear, a bevel gear, or a non-circular gear. In additional examples, joint 1235 may comprise a worm wheel and worm motor connecting base. In other examples, joint 1235 may comprise other joint mechanisms. In further examples, second portion 1240 may comprise a small-torque worm wheel and worm motor. In other examples, second portion 1240 may comprise a different type of motor and/or gear mechanism.

In examples, first portion 1230 may include a transmission mechanism and a motor. In the illustrated embodiment, the transmission mechanism includes a large-torque worm wheel and a worm coaxially connected to a driving shaft of the motor. The motor may be a DC brushless motor. In other embodiments, the motor may be a DC brush motor, asynchronous motor, synchronous motor. In examples, the transmission mechanism may include a pair of cylindrical gears, a pair of bevel gears, or a pair of non-circular gears, belt and pulley, chain and wheel. In addition, the joint and the second portion can be similar as the first portion. In examples, the joint and/or the second portion may comprise a large-torque worm wheel and worm motor.

Additionally, landing gears 1220 may comprise a base portion 1250. In examples, a base portion 1250 may be wheel-based, as illustrated in FIG. 12. Accordingly, base portion 1250 may comprise an omnidirectional wheel supporting base 1252, a lightweight omnidirectional wheel 1254, and a direct current (DC) gear motor 1256. In other examples, a base portion may comprise alternative components. In some examples, a base portion may comprise a footed component with traction. For example, a footed component with traction may be used for a walking system when a UAV may travel across icy terrain conditions. In further examples, a base component may comprise a rubber-soled component. In examples, a rubber-soled component may be used when the walking system of the UAV is traversing watery and/or slippery terrains.

As seen in FIG. 12, one end of connector 1225 is fixed under central body 1205. In particular, one end of connector 1225 is fixed under an arm 1210 that extends from central body 1205. While one end of connector 1225 is fixed under central body 1205, another end of connector 1225 may be connected to first portion 1230. As seen in FIG. 12, connector 1225 is a stressed base point of UAV 1200.

First portion 1230 is connected to connector 1225 as well as to joint 1235. In particular, first portion 1230 is a large-torque worm wheel and worm motor that is fixed to connector 1225 with the output axis of first portion 1230 connected to joint 1235. Joint 1235, as seen in FIG. 12, is a worm motor connecting base. Accordingly, the large-torque worm wheel and worm motor of first portion 1230 first with the worm motor connecting base of joint 1235 to form a degree of freedom of a single supporting landing gear 1220.

Additionally, joint 1235 is used to connect second portion 1240 and the output axis of first portion 1230. As seen in FIG. 12, second portion 1240 is a small-torque worm wheel and worm motor. As such, the worm motor connecting base of joint 1235 is used to connect the small-torque worm wheel and worm motor of second portion 1240 and the output axis of the large-torque worm wheel and worm motor of first portion 1230. In examples, joint 1235 may remain still relative to the small-torque worm wheel and worm motor of second portion 1240.

Second portion 1240 may provide an additional degree of freedom of the landing gear 1220. In particular, as seen in FIG. 12, the output axis of small-torque worm wheel and worm motor of second portion 1240 may be fixed to the omnidirectional wheel supporting base 1252 of base portion 1250. As such, the output axis of small-torque worm wheel and worm motor of second portion 1240 may be used to drive the omnidirectional wheel supporting base 1252 of base portion 1250 so as to pivot the base portion 1250 around the output axis of second portion 1240.

Omnidirectional wheel supporting base 1252 of base portion 1250 may be used to support a wheel, such as lightweight omnidirectional wheel 1254. The omnidirectional wheel supporting base 1252 of base portion 1250 may also be used to fix a gear motor, such as direct current gear motor 1256. Additionally, wheel 1254 may be configured to move through a bearing. In particular, DC gear motor 1256 may drive a wheel 1254 to rotate, such as through a bearing. Further, DC gear motor 1256 may lock the rotation of wheel 1254 by a circuit such that the wheel 1254 remains locked in some working environments.

Wheel 1254 is an end actuating element of the walking system of UAV 1200. Additionally, wheel 1254 may be used for omnidirectional rotation on the ground. Further, wheel 1254 may be auto-locked by DC gear motor 1256 so as to become a ground stationary-supporting point of a landing gear 1220.

As seen in FIG. 12, UAV 1200 comprises four identical landing gears 1220. In particular, as seen in FIG. 12, each landing gear 1220 neighbors two other landing gears 1220 at 90-degree angles with respect to each other. Additionally, each landing gear 1220 as seen in FIG. 12 is positioned below an arm 1210 that extends from central body 1205. In examples, landing gears 1220 may be translated to different areas of central body 1205. In particular, landing gears 1220 may be translated to be positioned under different arms 1210 and/or between arms 1210.

When landing gears 1220 are translated with respect to each other, the landing gears 1220 may have angles that are less than 90-degrees between them. For example, a first landing gear and a second landing gear may have less than 1-degree, 1-degree, 2-degrees, 3-degrees, 4-degrees, 5-degrees, 10-degrees, 15-degrees, 20-degrees, 25-degrees, 30-degrees, 35-degrees, 40-degrees, 45-degrees, 50-degrees, 55-degrees, 60-degrees, 65-degrees, 70-degrees, 75-degrees, 80-degrees, 85-degrees, or between 85-degrees and 90-degrees. In other examples, the landing gears 1220 may have angles that are more than 90-degrees between them. For example, a first landing gear 1220 and a second landing gear 1220 may have more than 90-degrees, 95-degrees, 100-degrees, 105-degrees, 110-degrees, 115-degrees, 120-degrees, 125-degrees, 130-degrees, 135-degrees, 140-degrees, 145-degree, 150-degrees, 155-degrees, 160-degrees, 165-degrees, 170-degrees, 175-degrees, 180-degrees, 185-degrees, 190-degrees, 195-degrees, 200-degrees, 205-degrees, 210-degrees, 215-degrees, 220-degrees, 225-degrees, 230-degrees, 235-degrees, 240-degrees, 245-degrees, 250-degrees, 255-degrees, 260-degrees, 265-degrees, 270-degrees, 275-degrees, 280-degrees, 285-degrees, 290-degrees, 295-degrees, 300-degrees, 305-degrees, 310-degrees, 315-degrees, 320-degrees, 325-degrees, 330-degrees, 335-degrees, 340-degrees, 345-degrees, 350-degrees, 355-degrees, or between 355-degrees and 360-degrees.

Figure 13:
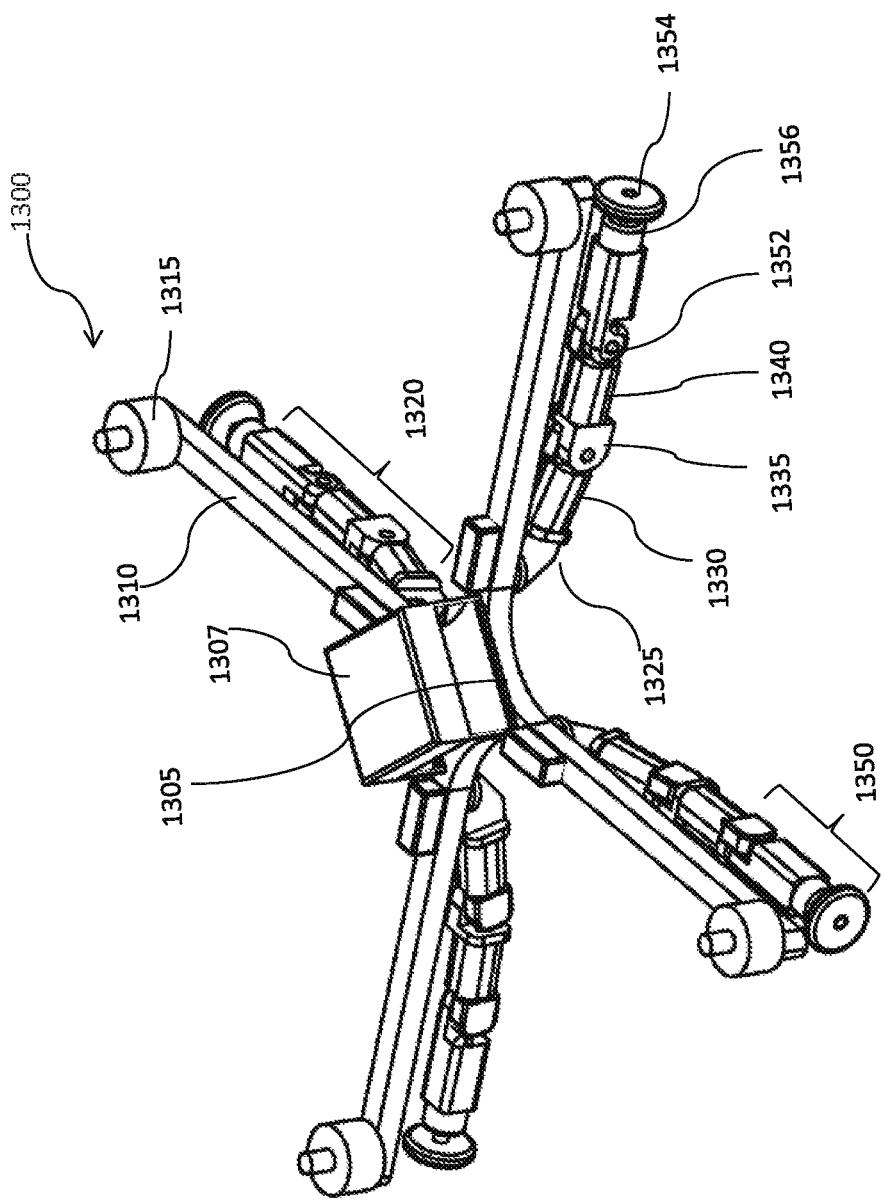
FIG. 13 illustrates a perspective view of an aerial vehicle having a walking system and a housing in a flying configuration, in accordance with embodiments.
Figure 14:
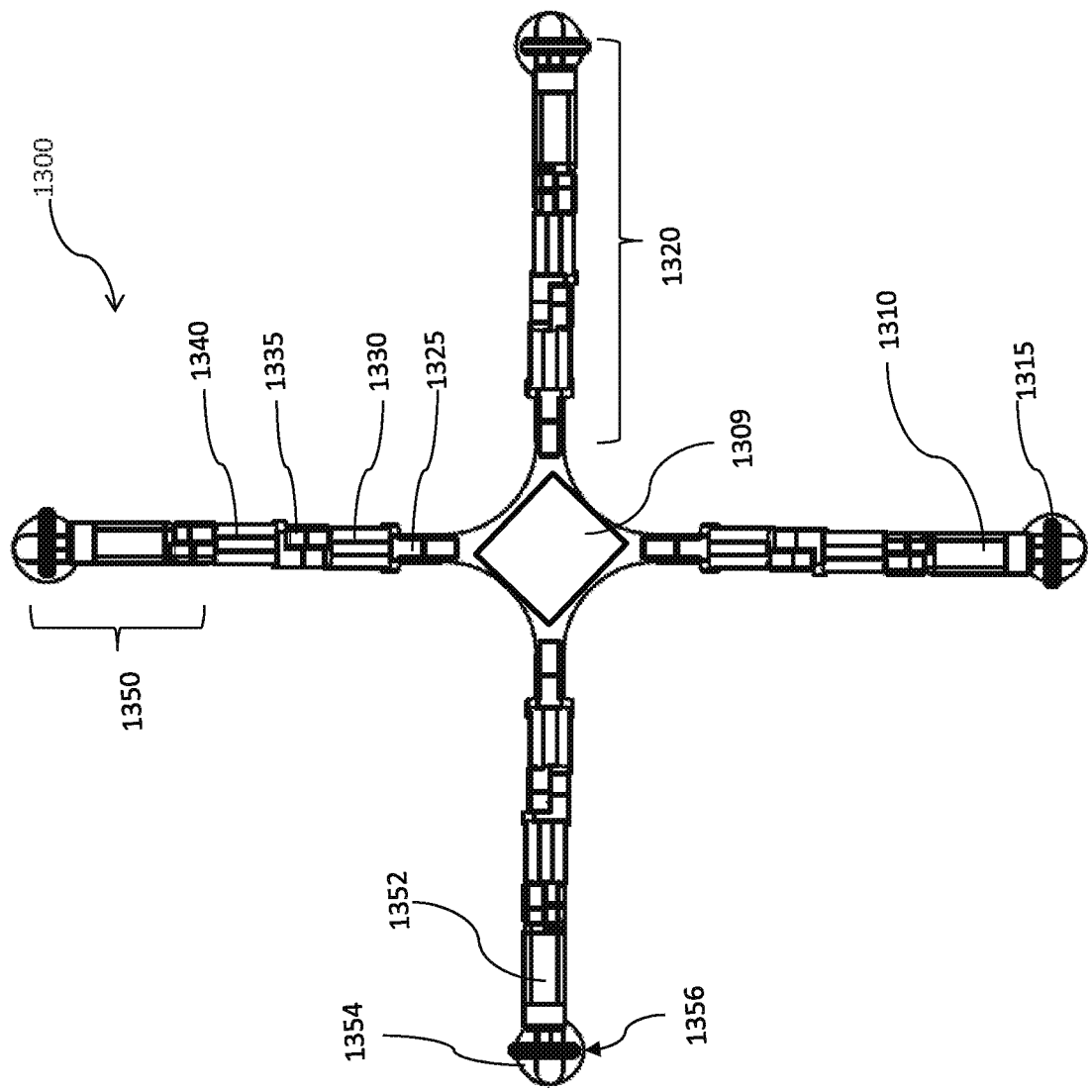
FIG. 14 illustrates an overhead view of an aerial vehicle having a walking system and a housing in a flying configuration, in accordance with embodiments.
Figure 15:
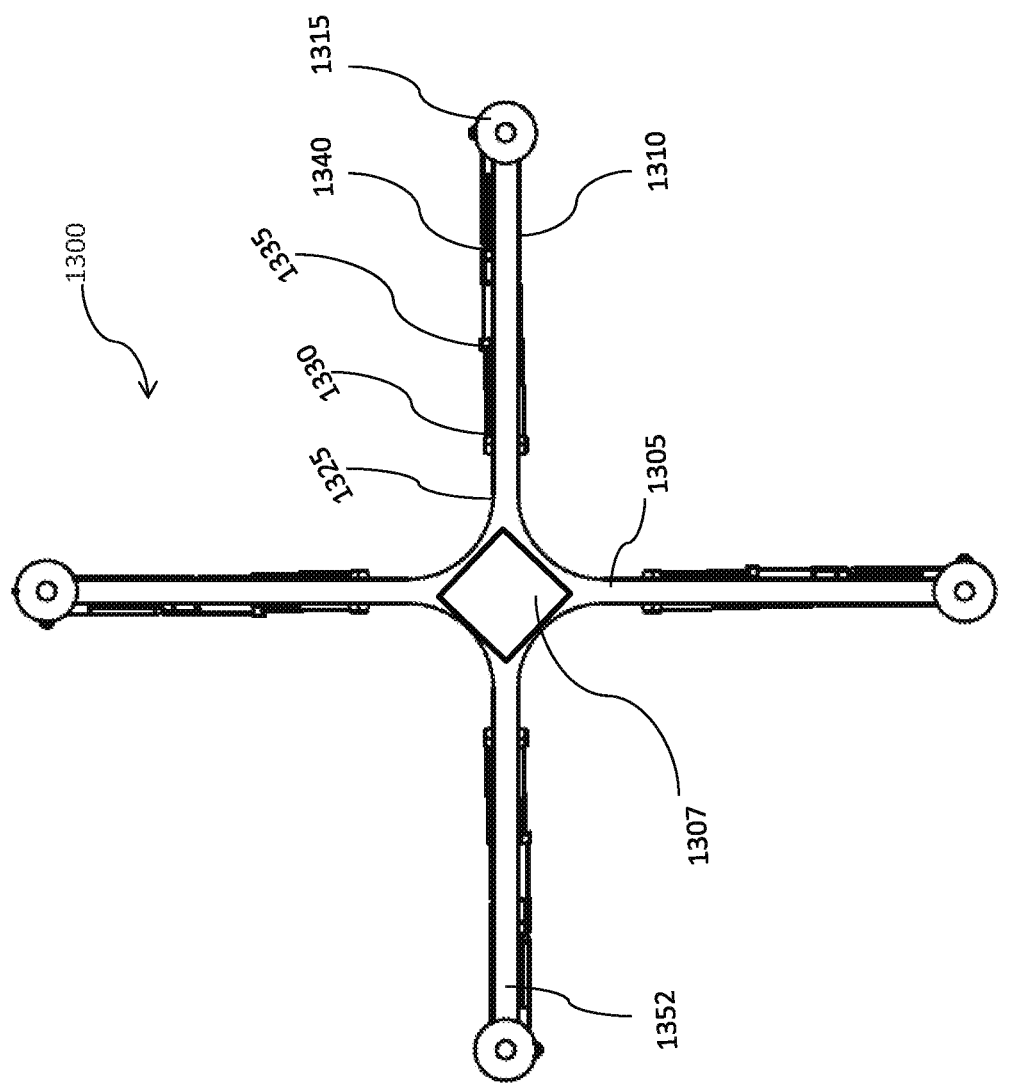
FIG. 15 illustrates a bottom view of an aerial vehicle having a walking system and a housing in a flying configuration, in accordance with embodiments.

FIGS. 13-15 illustrate the position of landing gears 1320 of an aerial vehicle having a walking system and a housing in a flying configuration. In particular, central body 1305 is attached to four landing gears 1320. Accordingly, FIG. 13 illustrates a perspective view of an aerial vehicle having a walking system and a housing 1307 in a flying configuration, in accordance with embodiments. Housing 1307 may contain different components, such as a payload described in FIGS. 8 and 9 above. In examples, housing 1307 may contain a sensor, an IMU, processors, and/or another type of payload. The walking system of UAV 1300 is similar to the walking system of 100 of FIG. 1 except the walking system of UAV 1300 has a movable track component (not shown) that allows landing gears 1320 to move with respect to one other to different positions on central body 1305. In particular, landing gears 1320 may be moved with respect to each other using controller 1307. In particular, controller 1307 may be used to control movements of landing gears 1320. Additionally, landing gears 1320 as seen in FIG. 13 are configured in a position for when a UAV 1300 is in flight. For example, when an aerial vehicle is in flight, landing gears 1320 of a UAV 1300 that is attached to and/or integrated within the aerial vehicle may be in a retracted position. In particular, landing gears 1320 may be retracted in a position so as to have landing gears 1320 positioned directly beneath arms 1310 of a central body 1305.

Landing gears 1320 comprise first portion 1330, second portion 1340, and base portion 1350. Additionally, base portion 1350 comprises omnidirectional wheel supporting base 1352, wheel 1354, and DC gear motor 1356. As seen in FIG. 13, when an aerial vehicle is in flight, UAV 1300 may be stored in a horizontal direction. In particular, the lightweight omnidirectional wheel 1354 is retracted under the propulsion unit 1315 at the end of arm 1310 that extends from central body 1305. Additionally, when landing gears 1320 is in a locked position, first portion 1330, second portion 1340, and DC gear motor 1356 may each be in a locked state. Accordingly, when first portion 1330, second portion 1340, and DC gear motor 1356 are in a locked state, UAV 1300 may have little to no shaking and/or wagging while the aerial vehicle is in flight.

As discussed above, FIG. 13 provides a perspective view of an aerial vehicle having a walking system and a housing in a flying configuration, in accordance with embodiments. Additionally, FIGS. 14 and 15 provide a bottom view and an overhead view of an aerial vehicle having a walking system and a housing in a flying configuration, respectively, in accordance with embodiments. FIGS. 14 and 15 illustrate central body 1305, arms 1310, propulsion unit 1315, and landing gears 1320. Further, FIG. 14 illustrates a movement track 1309. Landing gears 1320 may move along movement track 1309 so as to be positioned between arms 1310. By positioning between arms 1310 rather than directly beneath arms 1310, landing gears 1320 may have increased movement. In particular, the landing gears 1320 may be able to bend above the plane of central body 1305. In examples, a first portion and/or a second portion of an individual landing gear 1320 may be movable above the plane of the central body 1305.

FIGS. 14 and 15 also illustrate an alignment of landing gears 1320 with arms 1310. In particular, as seen in FIGS. 14 and 15, portions of landing gears 1320 may have a width that is as narrow as or narrower than a width of a corresponding arm 1310. In examples, arms 1310 may have a width that is less 2 cm, 2 cm, 3 cm, 4 cm, 5 cm, 6 cm, 7 cm, 8 cm, 9 cm, 10 cm, or more than 10 cm. In additional examples, landing gears 1320 may have a width that is less 2 cm, 2 cm, 3 cm, 4 cm, 5 cm, 6 cm, 7 cm, 8 cm, 9 cm, 10 cm, or more than 10 cm. In further examples, landing gears 1320 may have a width that is equal or lesser than arms 1310. In other examples, portions of landing gears 1320 may have a width that is equal or less than portions of arms 1310. Additionally, while wheel 1354 is shown as extending beyond a width of arm 1310, additional embodiments may be provided for pivoting wheel 1354 so as to be retracted directly beneath arm 1310 while the UAV 1300 is in a flying mode.

Figure 16:
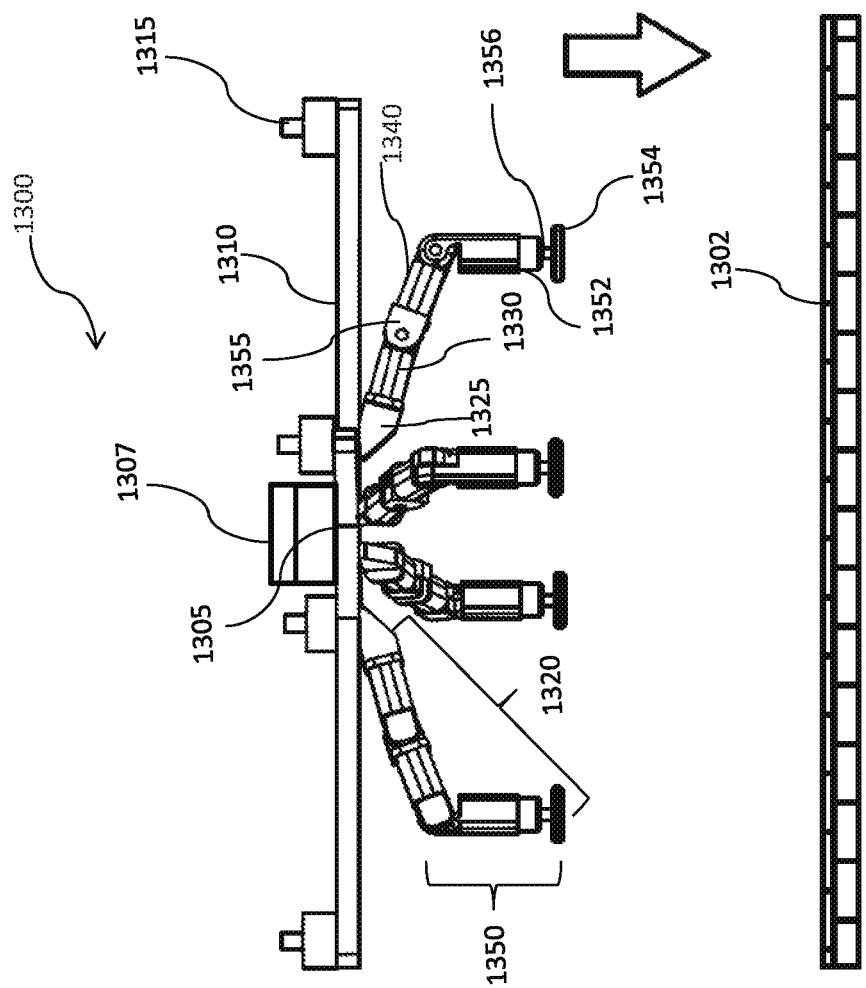
FIG. 16 illustrates a view of an aerial vehicle having a walking system and a housing in a landing configuration, in accordance with embodiments.

As discussed above, landing gears 1320 may be retracted in a horizontal position when a UAV 1300 is in flying mode. However, when the aerial vehicle is landing, landing gears 1320 may begin to descend even though the aerial vehicle is still in flight. This is shown in FIG. 16, which illustrates landing gears 1320 that are in a landing configuration. In particular, FIG. 16 illustrates a view of an aerial vehicle having a walking system and a housing in a landing configuration, in accordance with embodiments.

As seen in FIG. 16, when the aerial vehicle is landing, the UAV 1300 may have landing gears 1320 that are bending downward so as to form an attitude of a landing base. As or before the aerial vehicle is landing, the first portion 1330 and second portion 1340 of landing gears may rotate clockwise so as to cause the omnidirectional wheel supporting base 1352 of base portion 1350 to be in a vertical state. Further, DC gear motors 1356 of base portion 1350 may rotate a wheel 1354 of base portion into a locked, flat-bottomed state until the aerial vehicle completes a landing sequence on the ground.

The landing configuration of FIG. 16 illustrates positions of landing gears 1320 when the aerial vehicle is preparing to land on a smooth surface 1302. Accordingly, the landing gears 1320 of the UAV 1300 are aligned at the same vertical height. In some examples, the landing gears 1320 may be in a locked position when landing on a smooth surface. In other examples, landing gears 1320 may not be locked in position, but rather, may have movement flexibility and/or shock support for landing. Additionally, flat-bottomed wheel 1354 may be able to contact a surface at an angle. Having some flexibility in landing allows the landing gears 1320 to spread the force that occurs during landing over an increased distance. For example, in some examples, landing gears 1320 may bend slightly as the UAV connects with the ground so as to reduce stress on the landing gears 1320 and/or UAV 1300.

In additional examples, the landing configuration of a UAV may be tailored to the particular terrain associated with a landing spot. This may be beneficial when the aerial vehicle having the UAV 1300 is landing in an area with a sloped terrain. For example, in some examples, the terrain may be sloped at an angle such that a landing position of the aerial vehicle may require two landing gears 1320 to be at a slightly higher elevation than two other landing gears 1320. Additionally or alternatively, the bottom of base portion 1350 may be flat and able to be angled so as to match and meet the slope of the terrain. In order to accommodate the rocky terrain, the landing gears 1320 may be pre-positioned in a particular configuration using first portion 1330 and second portion 1340 of the particular landing gears 1320. In further examples, the landing gears 1320 may be bendable during landing such that one or more landing gears 1320 that impact a surface prior to other landing gears 1320 may bend so as to accommodate a difference in elevations.

UAV 1300 has landed on the ground, the UAV 1300 may be used to traverse a distance over the ground. The terrain that the UAV 1300 traverses may differ based on a location of the landing site. In some examples, the terrain may be smooth, rocky, icy, bumpy, stepped, or another type of terrain. As seen in FIGS. 17-20, a UAV 1300 may be used to traverse smooth terrain and stepped terrain, as well as additional terrains further described herein.

Figure 17:
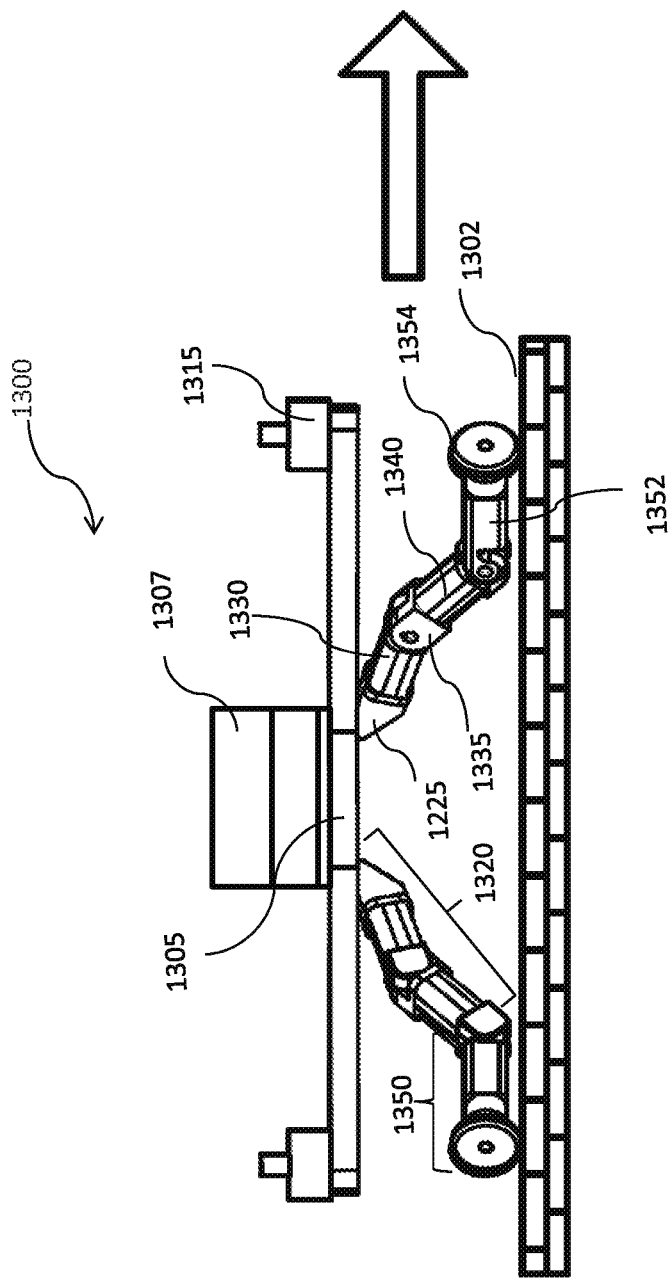
FIG. 17 provides an illustration of an aerial vehicle having a walking system in a lowered surface configuration, in accordance with embodiments.

As mentioned above, UAV 1300 may be used to traverse a smooth terrain using wheels such as wheels 1354 as provided in FIG. 17. Accordingly, FIG. 17 provides an illustration of an aerial vehicle having a walking system in a lowered surface configuration, in accordance with embodiments.

When UAV 1300 is traversing smooth terrain, the walking system of the UAV 1300 may utilize wheels 1354 that are part of landing gears 1320 so as to slide across the smooth terrain 1302. In particular, when the walking system of the UAV 1300 is traversing smooth terrain, a DC gear motor 1356 that is part of base portion 1350 of landing gear 1320 may position wheels 1354 to be curved rather than flat-bottomed so that wheels 1354 may slide. Additionally, DC gear motor 1356 may unlock wheel 1354 so that wheel 1354 may move freely. Additionally, in examples, wheel 1354 may be an omnidirectional wheel so that wheel 1354 may move freely across the smooth terrain. In further examples, wheel 1354 may be within a wheel cover that limits the directionality of movement of wheel 1354.

In some examples, wheel 1354 may have a brake component (not shown) that may be used to slow down wheel 1354, and in turn, slow down UAV 1300. The brake component may be an automatic brake that slows or maintains speed for wheel 1354 if and when wheel 1354 exceeds a threshold speed. In other examples, the DC gear motor 1356 may be used to speed up and/or slow down wheel 1354. In further examples, wheel 1354 may be switched to a flat-bottom position by DC gear motor 1356 if needed as a breaking measure or for another purpose.

In additional examples, if the smooth terrain begins to slope, a central body 1305 of UAV 1300 may maintain an appropriate height by correspondingly adjusting the three motors that are associated with each landing gear 1320. In particular, each landing gear 1320 has a motor associated with first portion 1330, second portion 1340, and base portion 1350. Accordingly, as a UAV 1300 traverses a sloped terrain, one or more DC gear motors 1356 associated with each of the four landing gears 1320 illustrated in FIG. 17 may synchronize their rotation at a certain speed and/or with a certain direction so as to move UAV 1300 forward. By using DC gear motors 1356 associated with landing gears 1320, UAV 1300 may be directed to slide laterally, curve, and/or spin as it traverses the smooth terrain.

Figure 19:
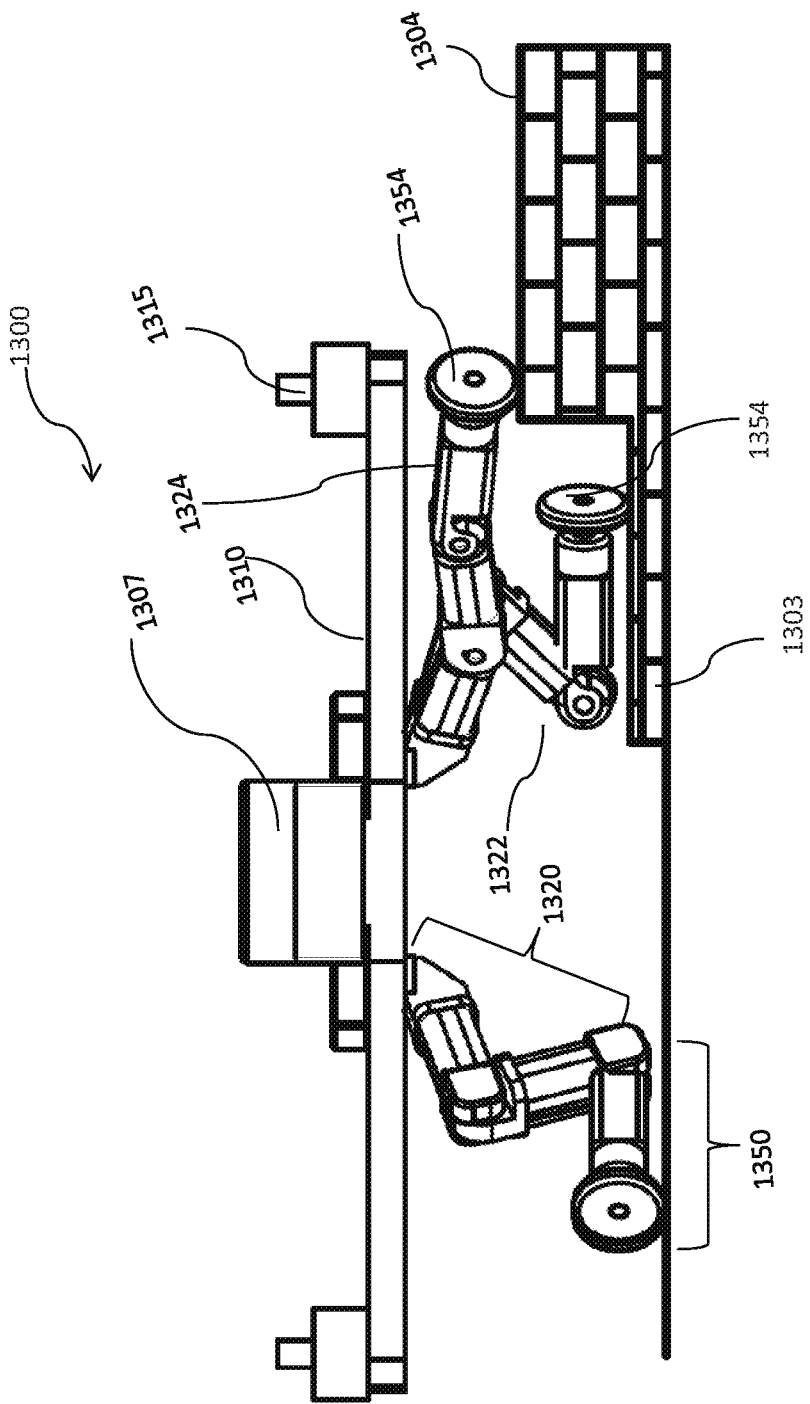
FIG. 19 provides an illustration of an aerial vehicle having a walking system in a second lowered position as it transverses stepped terrain, in accordance with embodiments.
Figure 20:
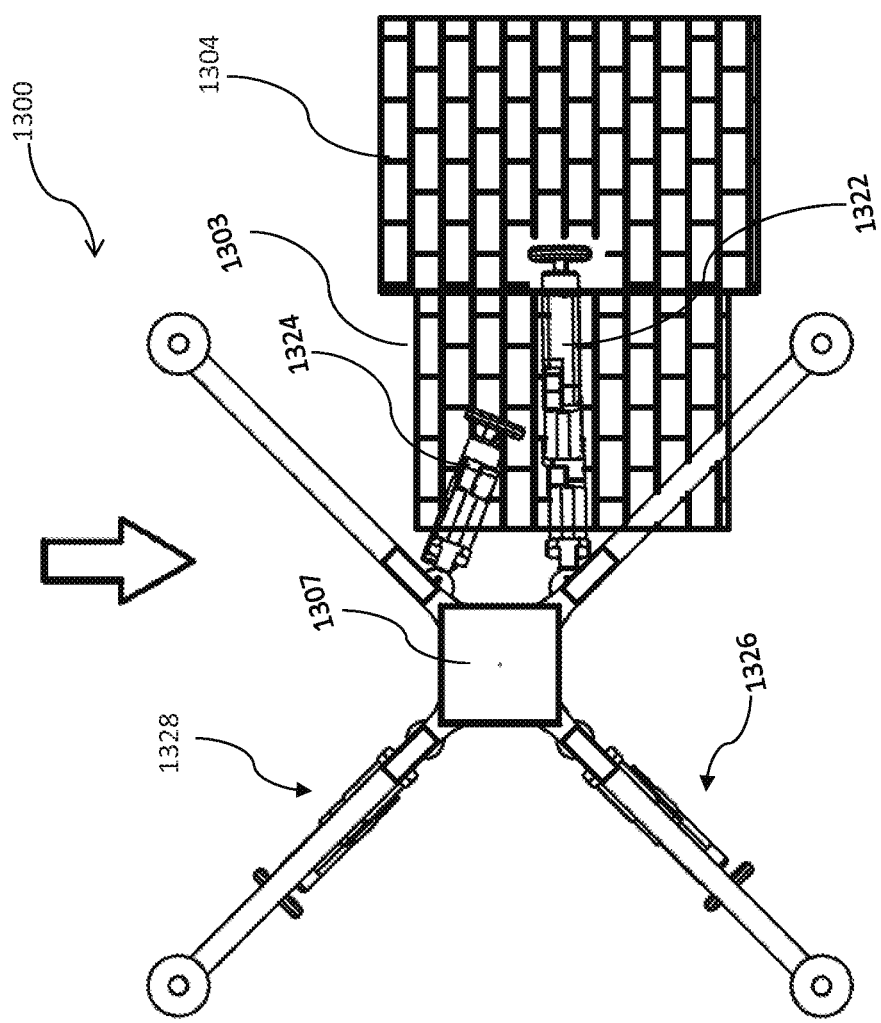
FIG. 20 provides an illustration of an aerial vehicle having a walking system in a horizontally outstretched position as it transverses stepped terrain, in accordance with embodiments.

While FIG. 17 illustrates how a UAV 1300 may traverse a smooth terrain, aerial vehicles that are used to access remote areas such as caves and earthquake relief sites may encounter non-smooth terrain, such as rough and/or stepped terrain. As such, it is beneficial for a UAV 1300 to be able to traverse other types of terrain beyond smooth terrain 1302. Accordingly, FIGS. 18-20 provide illustration of positions of a UAV 1300 as it traverses stepped terrains 1303 and 1304.

Figure 18:
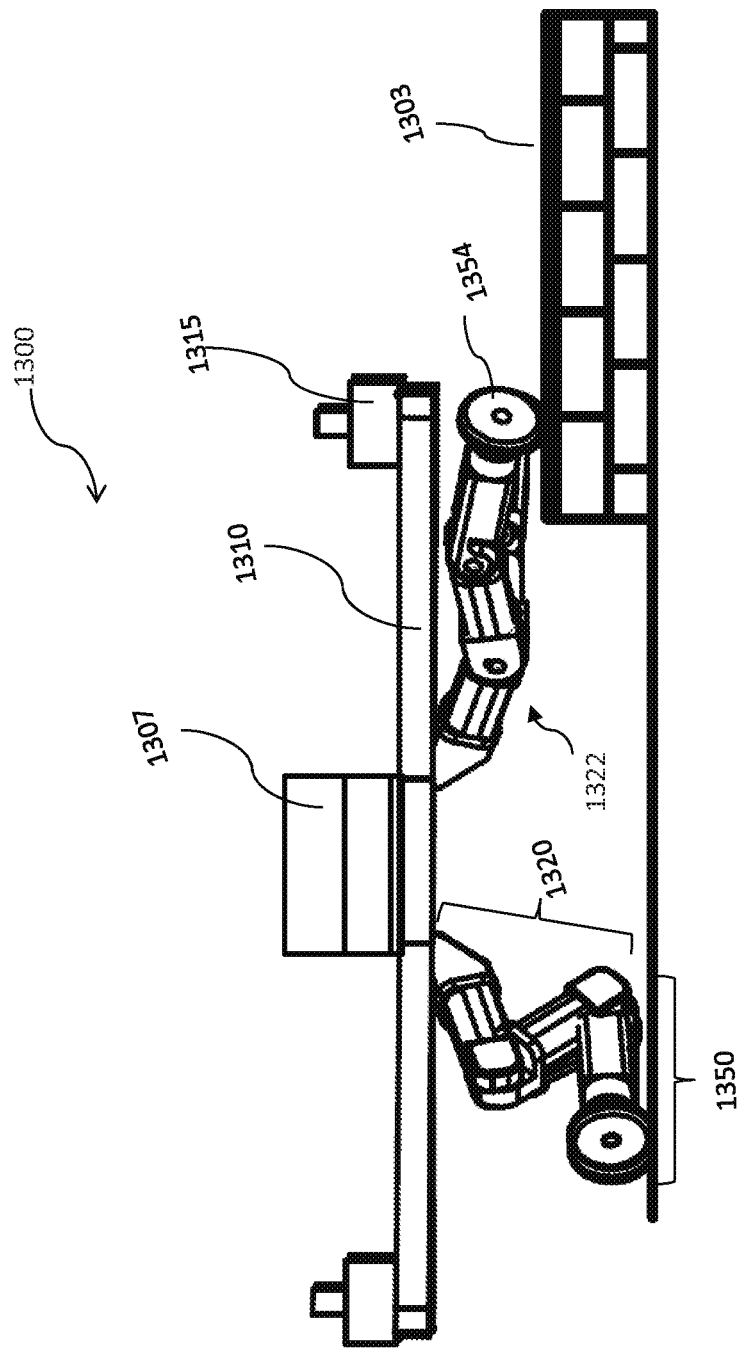
FIG. 18 provides an illustration of an aerial vehicle having a walking system in a first lowered position as it transverses stepped terrain, in accordance with embodiments.

In particular, FIG. 18 provides an illustration of an aerial vehicle having a walking system in a first lowered position as it transverses stepped terrain, in accordance with embodiments. As seen in FIG. 18, a first landing gear 1322 has bent upward so as to rest wheel 1354 on top of the stepped terrain. First landing gear 1322 is bent upwards towards an arm 1310 of central body 1305 of UAV 1300. In this position, wheel 1354 is directly beneath propulsion unit 1315. In particular, landing gear 1322 is reconfigured by using at least the large-torque worm motor that is associated with first portion of landing gear 1322. In particular, the large-torque worm motor of the first portion of landing gear 1322 may be used to raise the second portion of landing gear 1322 high enough such that wheel 1354 as connected to the small-torque worm motor through the wheel base is able to be raised high enough to rest on the step of stepped terrain 1303. In some examples, the small-torque worm motor of the second portion may be used to raise wheel 1354 by raising the wheel base connected to the second portion.

As seen in FIG. 18, however, landing gear 1322 in this position does not pass the plane as established by central body 1305. This is because, as seen in FIGS. 14 and 15 for example, landing gear 1322 is positioned directly below an arm 1310 of central body 1305. As the step of the stepped terrain 1303 is below the plane of the central body 1305, landing gear 1322 may rest wheel 1354 upon the step without altering a position of central body 1305. As such, central body 1305 as seen in FIG. 18 is level.

Additionally as seen in FIG. 18, two other landing gears 1320 are not positioned on the stepped terrain 1303. Rather, other landing gears 1320 are positioned on a portion of smooth terrain, and as such, are able to slide towards stepped terrain 1303 even as landing gear 1322 is raised in anticipation of climbing the step of stepped terrain 1303. In this way, different landing gears 1320 may be in different terrain modes at different times.

In examples, the movement of a particular landing gear 1320 may be governed by a mode of movement. In particular, and as seen in FIG. 18, one or more landing gears 1320 may be in a climbing mode while other landing gears 1320 may be in a sliding mode. The particular mode of movement that governs individual landing gears 1320 may be determined based on the terrain that each individual landing gear 1320 is contacting in a particular situation. In some examples, the landing gears 1320 may preemptively switch modes of movement when a new terrain is anticipated. For example, if a UAV 1300 is about to traverse a downhill slope, the landing gears 1320 of the UAV may preemptively move a majority of landing gears 1320 and/or all available landing gears 1320 forward so as to use each braking component of the landing gears 1320 in a uniform manner across the sloped terrain. In this way, landing gears 1320 may also be used collectively so as to efficiently navigate different terrains.

FIG. 19 provides an illustration of an aerial vehicle having a walking system in a second lowered position as it transverses stepped terrain, in accordance with embodiments. As seen in FIG. 19, a first landing gear 1322 and second landing gear 1324 are now bent upward so as to rest their wheels 1354 on top of the stepped terrain. Additionally, while first landing gear 1322 and second landing gear 1324 are both bent upwards towards arms 1310 of base unit 1305 of UAV 1300, central body 1305 is able to remain level even as the UAV is beginning to climb up the step of stepped terrain 1303, 1304. In particular, first landing gear 1322 and second landing gear 1324 are reconfigured by using at least the large-torque worm motor that is associated with first portions of first landing gear 1322 and second landing gear 1324, respectively, so as to progress up stepped terrain 1303, 1304. Similar to FIG. 18, the large-torque worm motor of the first portions of landing gears 1322 and 1324 may be used to raise the second portions of landing gears 1322 and 1324 high enough such that wheels 1354 as connected to the small-torque worm motors through wheel bases are able to be raised high enough to rest on the step of stepped terrain 1303, 1304. In some examples, the small-torque worm motor of the second portions may be used to raise wheels 1354 by raising the wheel bases connected to the second portions of landing gears 1322 and 1324.

Additionally, similar to FIG. 18, landing gears 1322 and 1324 as seen in FIG. 19 do not pass the plane as established by central body 1305 since the stepped terrain 1303, 1304 is less high than central body 1305. Accordingly, since the step of the stepped terrain 1303, 1304 is below the plane of the central body 1305, landing gears 1322 and 1324 are able to rest wheels 1354 upon the step without altering a position of central body 1305.

Additionally, as seen in FIG. 19, other landing gears 1320 are not positioned on the stepped terrain 1303, 1304. Rather, the other landing gears 1320 are positioned on a portion of smooth terrain, and as such, are able to slide towards stepped terrain 1303, 1304 even as landing gears 1322 and 1324 are raised in climbing the step of stepped terrain 1303, 1304. In this way, different landing gears 1320 may be in different terrain modes at different times.

FIG. 20 provides an illustration of an aerial vehicle having a walking system in a horizontally outstretched position as it transverses stepped terrain, in accordance with embodiments. As seen in FIG. 20, landing gears 1322 and 1324 have been repositioned with respect to central body 1305. In particular, landing gears 1322 and 1324 have been repositioned so as to be able to rise above the plane of central body 1305. As discussed above, landing gears may be limited in their vertical movement when they are positioned directly below arms 1310. However, using controller 1307, landing gears such as 1322 and 1324 may be repositioned so as to be vertically clear of portions of arms 1310.

Accordingly, when landing gears 1322 and 1324 have been repositioned, they may be able to have vertical movement that rises above the plane of central body 1305. An overhead view of this is illustrated in FIG. 20, which illustrates landing gears 1322 and 1324 traversing steps in stepped terrain 1303, 1304. As seen in FIG. 20, significant portions of landing components 1322 and 1324 are free of vertical hindrance by arms 1310. Additionally, FIG. 20 also illustrates that control of individual landing gears may be independent of each other. Controller 1307 may be used to control motion and/or position of landing gears 1322 and 1324 For example, while landing gears 1322 and 1324 have been moved by controller 1307 so as to be clear of arms 1310, landing gears 1326 and 1328 are still positioned directly beneath other arms 1310 as seen in FIG. 20.

Figure 21:
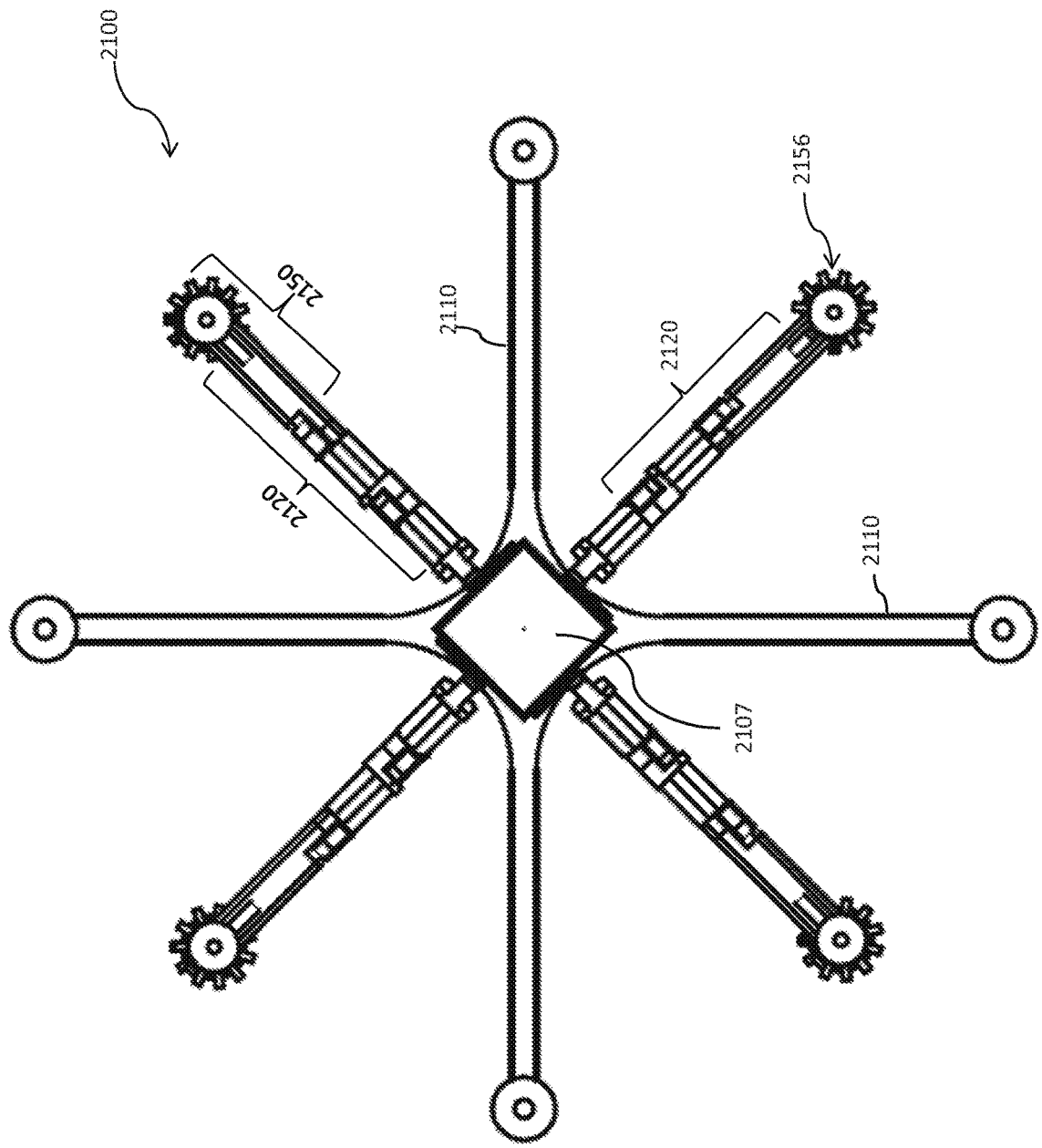
FIG. 21 illustrates an overhead view of an aerial vehicle having a walking system comprising four landing gears positioned between four arms, in accordance with embodiments of the present disclosure.

FIG. 21 illustrates an overhead view of an aerial vehicle having a walking system comprising four landing gears 2120 positioned between four arms 2110, in accordance with embodiments of the present disclosure. Additionally, FIG. 21 provides a controller 2107. Controller 2107 may be used to control the movement of landing gears 2120. As seen in FIG. 21, landing gears 2120 are equidistant from each neighboring arm 2110. In additional embodiments, landing gears 2120 may be closer to one arm than another. In particular, landing gears 2120 may be 1%, 2%, 3%, 4%, 5%, 10%, 15%, 20%, 30%, 40%, 50% or more than 50% closer to one neighboring arm 2110 than another.

As seen in FIG. 21, the placement of landing gears 2120 relative to arms 2110 allows the landing gears 2120 to move above a plane of the central body of the UAV 2100. In particular, joints of the landing gears 2120 may bend above the plane defined by the central body of the UAV 2100. Additionally, each portion of landing gears 2120 may be movable horizontally as well as vertically. In this way, a wheel 2156 at the end of base component 2150 may be movable closer or farther than a neighboring arm 2110 even when a connecting portion of the landing gears stays steady.

Figure 22:
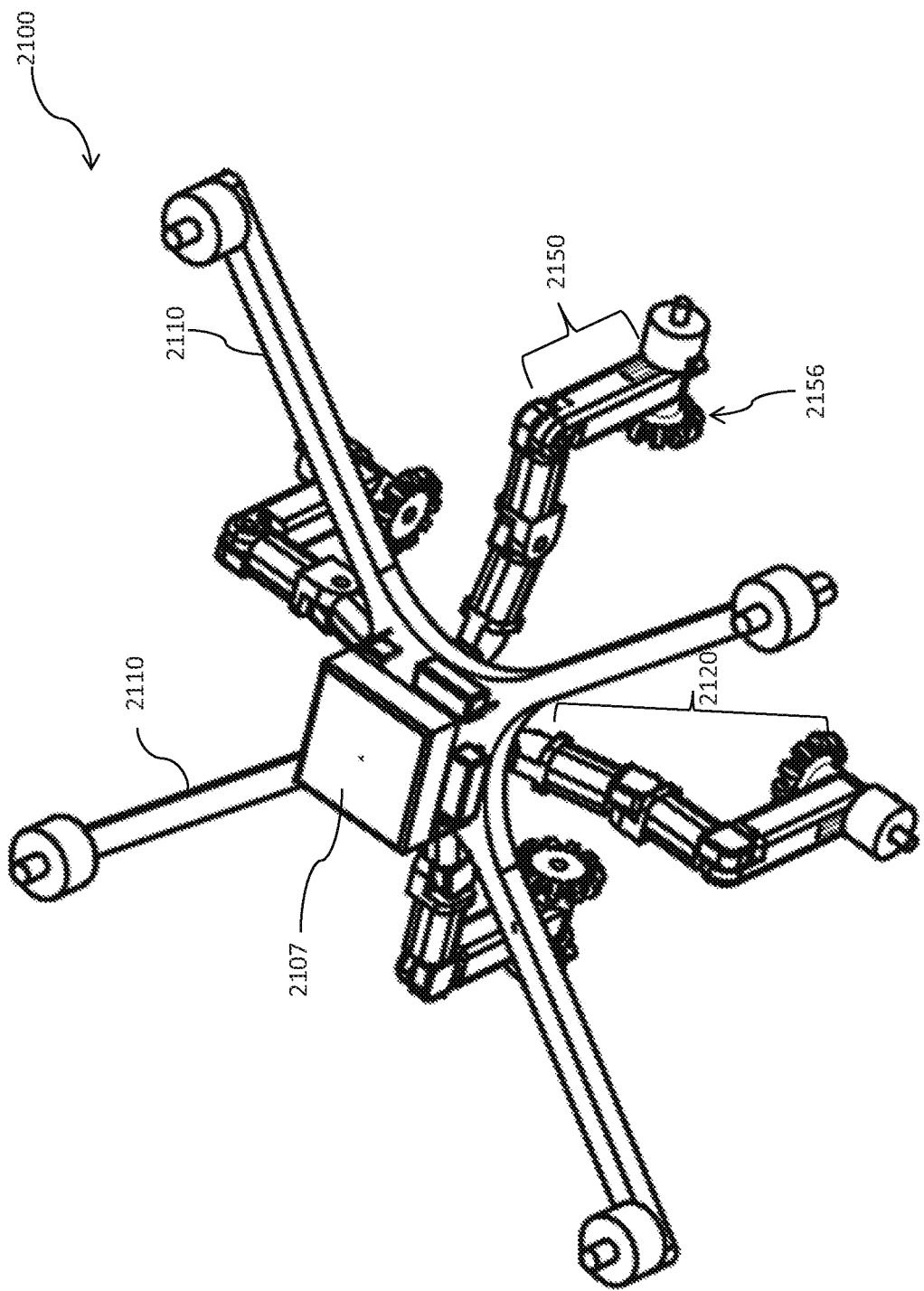
FIG. 22 illustrates a perspective view of an aerial vehicle having a walking system comprising four landing gears positioned between four arms, in accordance with embodiments of the present disclosure.

FIG. 22 illustrates a perspective view of an aerial vehicle having a walking system comprising four landing gears 2120 positioned between four arms 2110, in accordance with embodiments of the present disclosure. As seen in FIG. 22, UAV 2100 is positioned in a surface configuration. In particular, base portion 2150 of landing gear 2120 is positioned so that wheels 2156 is capable of engaging a surface. Additionally, wheels 2156 may transverse the surface. Landing gears 2120 have multiple joints that may be movable with respect to each other, thereby allowing UAV 2100 to move across different types of terrain. Once UAV 2100 has transversed terrains, the UAV 2100 may transform to a flight configuration.

Figure 23:
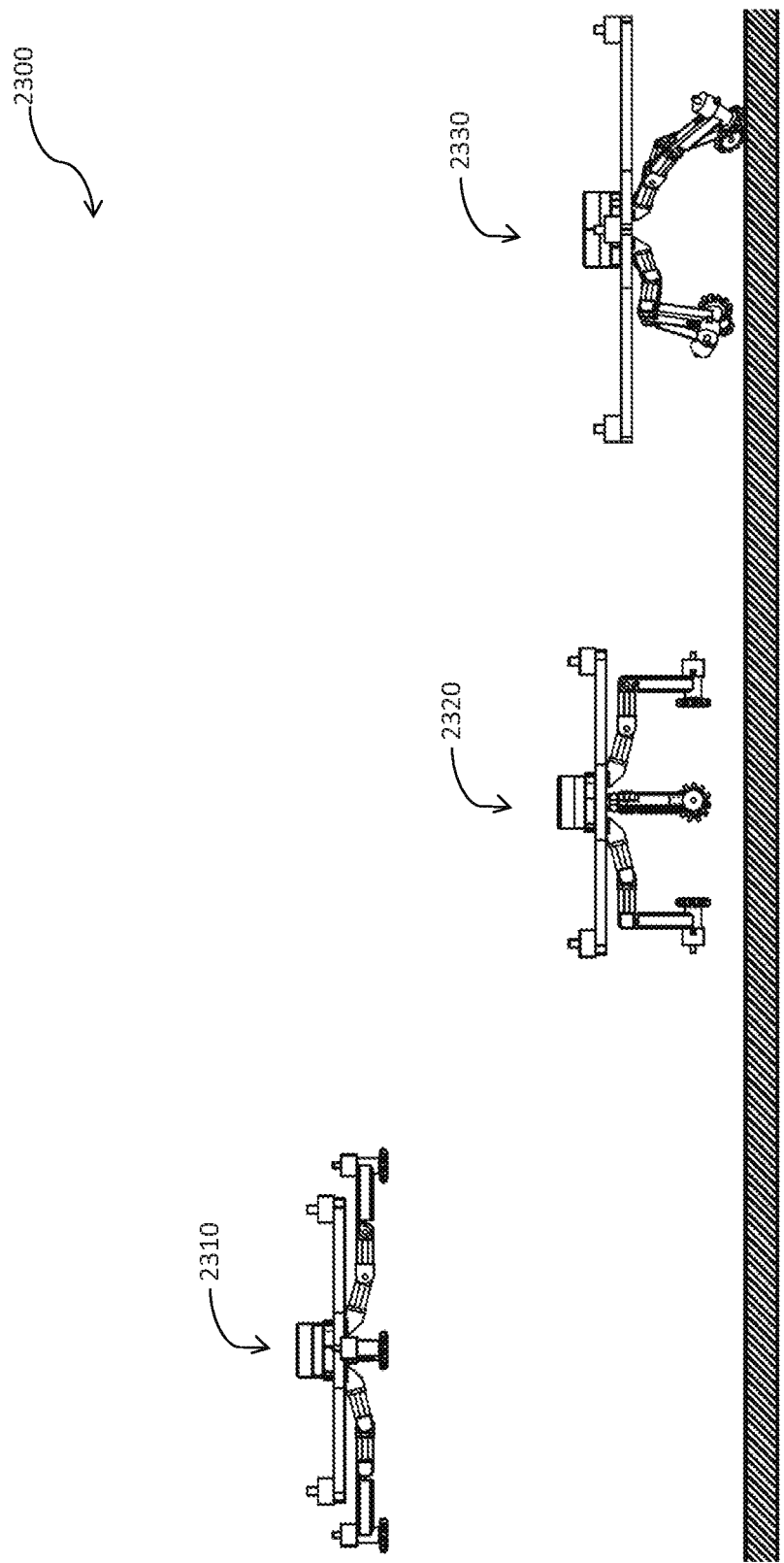
FIG. 23 illustrates a schematic profile of an aerial vehicle having a walking system comprising four landing gears positioned between four arms in a flying configuration, landing configuration, and walking configuration, in accordance with embodiments of the present disclosure.

FIG. 23 illustrates a schematic profile of an aerial vehicle having a walking system comprising four landing gears positioned between four arms in a flying configuration 2310, landing configuration 2320, and surface configuration 2330, in accordance with embodiments of the present disclosure. The flight configuration 2310 may be effected in response to a user launching the UAV from a surface configuration to a flight configuration. Once the UAV is in flight configuration 2310, landing configuration 2320 may be effected when the UAV is in flight and/or descending towards a surface. During landing configuration 2320, landing gear may be positioned so as to anticipate terrain that is at and/or near a landing site on the surface. As seen in FIG. 23, the landing gears are extended at equal lengths. As such, when the UAV lands on the flat surface in landing configuration 2320, each landing gear will engage the surface at or nearly at the same time.

When the UAV engages the surface, the UAV may be in a surface configuration. A UAV is in a surface configuration when the UAV is able to transverse the surface by moving a landing gear relative to the surface. In other examples, the UAV may transform to a surface configuration once the UAV has engaged with the surface.

The UAV may enter a transition state to change between a landing configuration and a surface configuration. For instance, when the UAV has landed on the surface, the UAV may enter a transition state from the landing state. Additionally, the UAV may enter a transition state to change between a surface configuration and a flight configuration, or from a flight configuration to a landing configuration. When the UAV is taking off, the UAV may enter a transition state from the surface state. In some embodiments, the transition state may occur fairly quickly. For instance, the UAV may be within a transition state less than 3 minutes, 2 minutes, 1 minute, 45 seconds, 30 seconds, 20 seconds, 15 seconds, 10 seconds, 7 seconds, 5 seconds, 3 seconds, or 1 second. Alternatively, the transition state may last longer than any of the times provided, or fall within a range between any two of the times provided. The amount of time may be the same whether the UAV is transitioning into a surface configuration, or into a landing configuration, or into a flight configuration, or may be different.

In some embodiments, while the UAV is in a transition state, the propulsion units supported by the arms may be operating to provide lift for the UAV and keep the UAV stable at a desired location. For instance, if the UAV is landing, the UAV may approach a surface, and then make a determination to start the transition to the landing configuration. While the UAV is transforming into the landing configuration, the propulsion units of the arm may keep the UAV substantially hovering above the surface or descending toward the surface in a controlled manner. Once the UAV has completely transitioned into the landing configuration, the UAV may be brought to rest on the underlying surface.

While the UAV is transitioning to the landing configuration, the propulsion units supported by the landing gears may decrease or stop rotation. This may permit the landing gears to fold downward. In some instances, the landing gears may fold downward with aid of gravity, which is no longer sufficiently counterbalanced by the lift generated by the propulsion units of the arms. Alternatively, one or more actuators may aid in causing the landing gears to fold downwards.

While the UAV landing gears are folding downward, the second portion of the landing gears may fold downward gradually in the transition state. The second portion may change orientation relative to the first portion. Similarly, propulsion units that may be supported by the second portion may change orientation relative to the first portion. The propulsion units may change orientation with the second portion.

If the UAV is taking off, the UAV may lift off a surface, and then make a determination to start the transition to the flight configuration. While the UAV is transforming into the flight configuration, the propulsion units of the arms may keep the UAV substantially hovering above the surface or ascending away from the surface in a controlled manner. Once the UAV has completely transitioned into the flight configuration, the UAV may continue on its flight.

While the UAV is transitioning to the flight configuration, the propulsion units supported by the arms may start or increase rotation. This may permit the landing gears to fold upward. In some instances, the landing gears may fold upwards with aid of the lift force generated by the propulsion units, which may be sufficiently great to counterbalance the effects of gravity. Alternatively, one or more actuators may aid in causing the landing gears to fold upwards and straighten out.

While the UAV landing gears are folding upward, the first portion of the landing gears may remain at the same orientation while the second portion may fold upward gradually in the transition state. The second portion may change orientation relative to the first portion. Similarly, the propulsion units supported by the second portion may change orientation relative to the first portion. The propulsion units may change orientation with the second section.

The UAV may make a determination to transforming into a landing configuration from a flight configuration, or from a landing configuration to a surface configuration, when a user provides an input for the UAV to land and/or walk, respectively. The UAV may begin the transformation to the landing configuration and/or surface configuration as soon as the user provides the input. Alternatively, the UAV may start transforming into the landing configuration and/or surface configuration after a predetermined period of time has passed. The UAV may start the transformation based on information from one or more sensors on-board the UAV. The sensors may gather information indicative of the UAV altitude relative to an underlying surface. The sensors may cause the UAV to transform to a landing configuration when the UAV is at or beneath a predetermined altitude relative to the underlying surface. The sensors may gather information indicative of UAV motion characteristics (e.g., speed, acceleration, direction). For instance, if the UAV is moving downward at a rapid velocity, the landing configuration may start sooner (or at a higher altitude) relative to if the UAV is moving downward as a lesser velocity. Environmental conditions, such as a wind conditions may be taken into account in determining when to start the transformation to the landing configuration. In some embodiments, a user instruction for the UAV to land may initiate an automated or semi-automated sequence that may cause the UAV the UAV to transform into the landing configuration based on sensor data. In some instances, the UAV may make an automated determination to land and/or walk with aid of one or more processors without requiring user input, and may automatically make the determination to transform into a landing configuration and/or surface configuration, respectively.

The UAV may make a determination to transforming into a flight configuration from a landing configuration and/or surface configuration when a user provides an input for the UAV to take off. The UAV may begin the transformation to the flight configuration as soon as the user provides the input. Alternatively, the UAV may start transforming into the flight configuration after a predetermined period of time has passed. The UAV may start the transformation based on information from one or more sensors on-board the UAV. The sensors may gather information indicative of the UAV altitude relative to an underlying surface. The sensors may cause the UAV to transform to a flight configuration when the UAV is at or above a predetermined altitude relative to the underlying surface. In some embodiments, a user instruction for the UAV to take off may initiate an automated or semi-automated sequence that may cause the UAV the UAV to transform into the flight configuration based on sensor data. In some instances, the UAV may make an automated determination to take off with aid of one or more processors without requiring user input, and may automatically make the determination to transform into a flight configuration. When a user provides an instruction for the UAV to take off a separate user instruction may or may not be required to initiate the transformation to a flight configuration.

The speed at which a UAV transforms between a flight configuration, landing configuration, and/or surface configuration may be substantially constant. Alternatively, the speed at which the UAV transforms may be variable. The speed at which the UAV transforms may be controlled depending on one or more circumstance. The circumstance may be sensed with aid of one or more sensors. For instance, if the UAV is rapidly descending, the amount of time to transform to a landing configuration may be reduced compared to if the UAV is descending slowly. In another instance, if the UAV is capturing images immediately during take-off, the amount of time to transform to a flight configuration may be reduced compared to if the UAV were not capturing images.

The UAV may change configuration with aid of one or more actuators. The actuators may be actuators for the propulsion units of the UAV. The actuators may be actuators that actively control a configuration of a joint of the UAV. The actuators may be controlled by a flight controller of the UAV. The flight controller may be supported by a central body of the UAV. The flight controller may provide a signal that may affect the one or more actuators. The signal may be generated on the flight controller. The signal may be generated in response to a command from a user terminal remote to the UAV. The signal may be generated in response to a signal from one or more sensors on-board the UAV. The signal may be generated on the flight controller without requiring user input or active user control.

Figure 24:
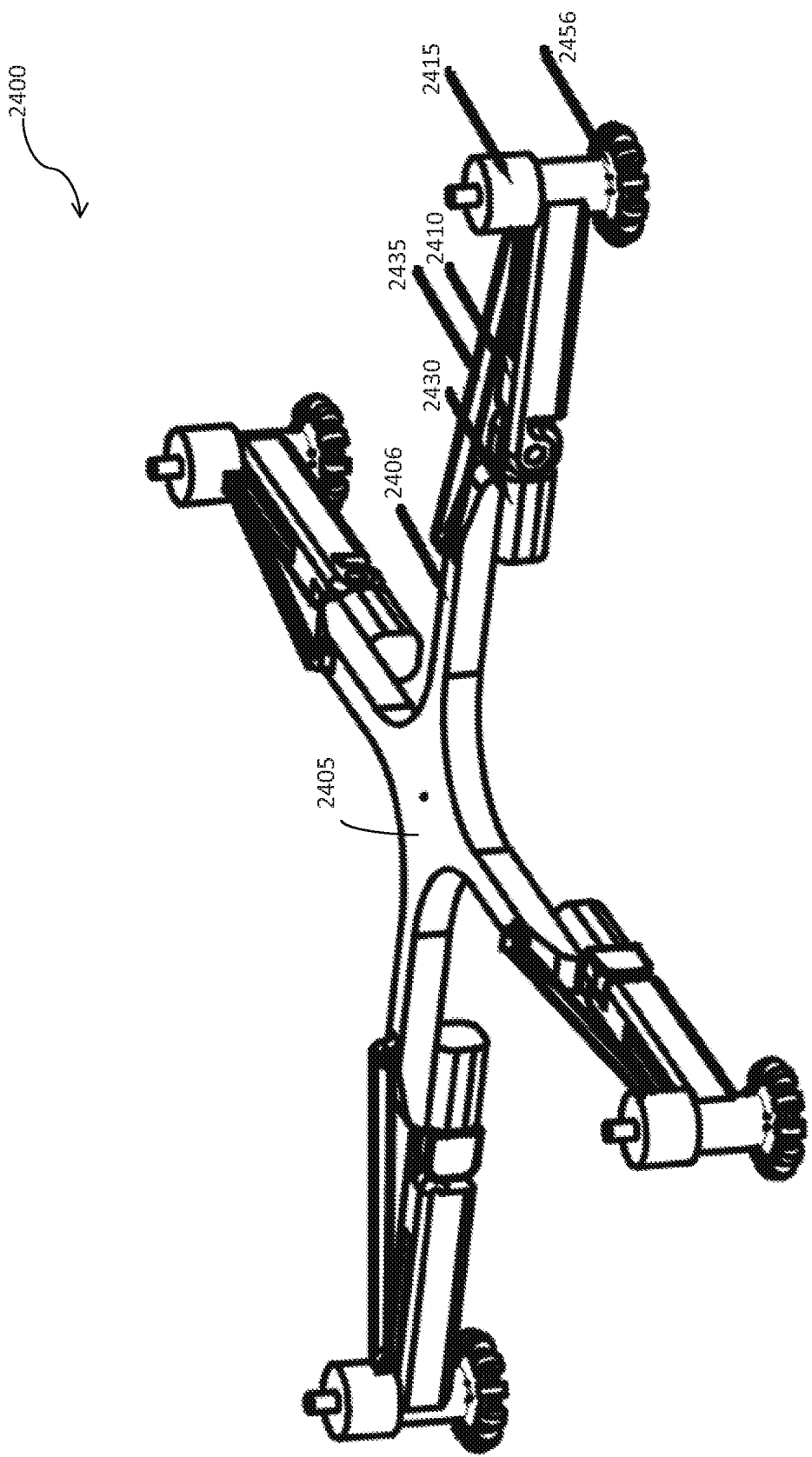
FIG. 24 provides a perspective view of an aerial vehicle having a walking system comprising four transformable arms in a flight configuration, in accordance with embodiments.

FIG. 24 provides a perspective view of an aerial vehicle having a walking system comprising four transformable arms in a flight configuration, in accordance with embodiments. In particular, FIG. 24 illustrates an unmanned aerial vehicle (UAV) 2400 having four transformable arms 2410 that extend from a central body 2405 of the UAV 2400. Each transformable arm 2410 of the four transformable arms supports a propulsion unit 2415. In examples, the transformable arms 2410 may be composed of carbon fiber.

Transformable arms 2410 may be configured to transform between a flight configuration and a surface configuration. When transformable arms 2410 are in a flight configuration, the transformable arms may extend laterally away from the central body of the UAV. When transformable arms 2410 are in the surface configuration, the transformable arms may extend towards a surface below the central body of the UAV. Additionally, when the transformable arms are in the surface configuration, the transformable arms are configured to support a weight of the central body of the UAV on the surface and transport the UAV over the surface by moving one or more transformable arms relative to the surface. Optionally, transformable arms 2410 may include a first portion, a second portion, and a joint that connects the first portion and the second portion. In particular, first portion 2406 may comprise an extension of a central body 2405 of the UAV 2400; second portion 2434 may comprise a decouplable portion; and first portion 2406 may be connected to second portion 2434 using joint 2432.

The UAV 2400 may include one or more transformable arms 2410 that extend from a central body 2405 of the UAV 2400. A center of gravity of the UAV may be within the UAV body, above a UAV body, or below a UAV body. A center of gravity of the UAV may pass through an axis extending vertically through the UAV body. The UAV body may support one or more transformable arms 2410 of the UAV. The UAV body may bear weight of the one or more transformable arms. The UAV body may directly contact one or more transformable arms. The UAV body may be integrally formed with one or more transformable arms or components of one or more transformable arms. The UAV may connect to the one or more transformable arms via one or more intermediary pieces. In examples, transformable arms 2410 may comprise a first portion 2406; a joint 2432; a second portion 2434; a deceleration motor 2430; a propulsion unit 2415; a chain 2435; and an omnidirectional wheel 2456.

The UAV may have any number of transformable arms 2410. For instance, the UAV may have one or more, two or more, three or more, four or more, five or more, six or more, seven or more, eight or more, ten or more, twelve or more, fifteen or more, twenty or more, thirty or more, forty or more, or fifty or more transformable arms. The transformable arms may optionally extend radially from a central body 2405. The transformable arms may be arranged symmetrically about a plane intersecting the central body of the UAV. Alternatively, the transformable arms may be arranged symmetrically in a radial fashion. The transformable arms may be evenly spaced apart. For instance, if N transformable arms are provided for the UAV, the number of degrees between each transformable arm may be 360/N. Alternatively, the transformable arms need not be evenly spaced apart. In some instances, none of the transformable arms are parallel to one another. Alternatively, transformable arms may be arranged so that two or more, three or more, or four or more of the transformable arms may be substantially parallel to one another. All of the transformable arms may be coplanar. Alternatively, one or more types of transformable arms may be coplanar. In some embodiments, two or more of the transformable arms may not be coplanar.

One or more of the transformable arms may support one or more propulsion units 2415 that may affect flight of the UAV. In some embodiments, each transformable arm may support one or more propulsion units. Alternatively, one or more of the transformable arms may not support a propulsion unit. In some instances, each transformable arm may support one or more, two or more, three or more, four or more, five or more, or ten or more propulsion units. Each transformable arm may support the same number of propulsion units. Alternatively, different transformable arms may support different numbers of propulsion units.

Propulsion units may be configured to generate lift for the UAV. A propulsion unit may include a rotor assembly. A rotor assembly may include one or more rotor blades that may rotate to generate lift for the UAV. In some instances, a plurality of rotor blades may be provided for a propulsion unit. The plurality of rotor blades may or may not be movable relative to one another. The rotor assembly may include an actuator driving rotation of the rotor blades. The actuator may be coupled to the one or more rotor blades with aid of a shaft. Rotation of the actuator may cause rotation of the shaft, which may in turn cause rotation of the rotor blades. Any description of a shaft may also apply to multiple shafts that may be driven by the same actuator. The actuator may be driven by electrical energy, magnetic energy, thermal energy, mechanical energy, hydraulic pressure, or pneumatic pressure. The actuator may be a motor. In some examples, the actuator may be a brushless motor. In some embodiments, examples of the actuator may include self-commutated or externally commutated motors. Motors may include mechanical-commutator motors, electronic-commutator motors, synchronous machines, and/or asynchronous machines. Electric motors may include AC or DC motors. Some examples of motors may include direct-drive motors, step-less motors, or servomotors. The motors may be configured to rotate in a single direction, or may be capable of reversing direction. The rotor blades of each of the propulsion units of the UAV may turn, such that a first subset of the propulsion units have rotor blades rotating in a first direction and a second subset of the propulsion units have rotor blades rotating in a second direction, as described in greater detail elsewhere herein. Alternatively, the rotor blades may rotate in the same direction. Propulsion units may or may not include a protective covering that may be provided around at least a portion of the rotor blades.

In some embodiments, propulsion units may be located at or near a distal end of the transformable arms. In some embodiments, transformable arms may be coupled to a central body at a proximal end, and may have a distal end extending away from the central body. One or more of the propulsion units supported by the transformable arm may be supported at a location along a length of the transformable arm within 50%, 40%, 30%, 25%, 20%, 15%, 10%, 5%, 3%, or 1% of the distal end of the transformable arm. In some embodiments, all of the propulsion units supported by the transformable arm may be supported at a location along a length of the transformable arm within 50%, 40%, 30%, 25%, 20%, 15%, 10%, 5%, 3%, or 1% of the distal end of the arm. One or more, or all, of the propulsion units supported by the transformable arm may within 30 cm, 20 cm, 15 cm, 10 cm, 7 cm, 5 cm, 4 cm, 3 cm, 2 cm, 1 cm, 5 mm, or 1 mm of the distal end of the transformable arm. Optionally, one or more of the transformable arms may have a distal portion that extends at least 50 cm, 40 cm, 30 cm, 20 cm, 15 cm, 10 cm, 7 cm, 5 cm, 4 cm, 3 cm, 2 cm, or 1 cm, beyond a length of the arm supported by the one or more propulsion units. Optionally, each transformable arm may have propulsion units located within the same percentage or distance relative to the distal end of the transformable arm. Alternatively, different transformable arms may have propulsion units located at different percentages or distances relative to the distal end of the transformable arm.

The propulsion units may be substantially located on an upper surface of the transformable arms. The upper surface of the transformable arms may be a surface of the transformable arm opposing a lower surface of the transformable arms, wherein the lower surface of the transformable arms is facing a direction of gravity. The upper surface of the transformable arms may be facing away from the direction of gravity. Alternatively, the propulsion units may be substantially located on a lower surface of the transformable arms, on both the upper and lower surface of the transformable arms, within a transformable arm, or any combination thereof. In one example, one or more rotor blades of a propulsion unit may be located above an upper surface of a transformable arm. Alternatively, one or more rotor blades of a propulsion unit may be located below a lower surface of the transformable arm. In some instances, at least one rotor blade of a propulsion unit may be located above an upper surface of a transformable arm while at least one rotor blade of the propulsion unit may be located below a lower surface of the transformable arm. In some instances, an actuator of a propulsion unit may be located above an upper surface of a transformable arm, below a lower surface of a transformable arm, or within a transformable arm. For instance, an actuator may be at least partially located within a cavity of the transformable arm. The actuator may or may not partially extend above an upper surface of a transformable arm and/or below a lower surface of the transformable arm.

The propulsion units supported by the one or more transformable arms may have the same configurations and/or dimensions. Alternatively, they may have different configurations and/or dimensions. In some instances, some of the propulsion units may have larger rotor blades than other propulsion units. The rotor blades may have the same shape or different shapes. The rotor blades of the propulsion units may rotate at the same rate, or may rotate at differing rates.

Transformable arms 2410 may be configured to bear the weight of the UAV when the UAV is landed on a surface. The transformable arms may be configured to contact an underlying surface when the UAV is not in flight. Additionally, transformable arms 2410 may be configured to transport the UAV over the surface by moving one or more transformable arms relative to the surface. Optionally, the transformable arms may include a first portion 2406 and a second portion 2434 which may be movable relative to each other. The first portion may be a section of the transformable arm proximal to a UAV body. The second portion may be a section of the transformable arm distal to the UAV body. The first portion may be closer to the central body than the second portion.

The first portion may or may not directly contact the UAV body. The first portion may be integrally formed with the UAV body. The first portion may be affixed or attached to the UAV body. The first portion may or may not be removable relative to the UAV body. The first portion may have a fixed position (e.g., orientation, spatial location) relative to the UAV body. Alternatively, the first section may be movable relative to the UAV body.

The second portion may not directly contact the UAV body. The weight of the second portion may be borne by the first portion. The first portion may support the second portion. The second portion may or may not be removable relative to the first portion. The second portion may have a variable position (e.g., orientation, spatial location) relative to the UAV body. For instance, an orientation of the second portion may change relative to the UAV body. The second portion may have a variable position relative to the first section. For instance, an orientation of the second portion may change relative to an orientation of the first section. Any orientation of the second portion may change (e.g., relative to an inertial reference frame, the UAV body, the first section) by any number of degrees, such as at least 1 degree, 3 degrees, 5 degrees, 10 degrees, 15 degrees, 20 degrees, 30 degrees, 45 degrees, 60 degrees, 75 degrees, 85 degrees, 90 degrees, 95 degrees, 105 degrees, 120 degrees, 135 degrees, 150 degrees, or 165 degrees. The change in orientation of the second portion may be less than any of the values described or may fall within a range between any two of the values described. The change in orientation may be about a vertical angle. The change in orientation may include a vertical component. The change in orientation may include a component that is in a direction parallel to the direction of gravity. The change in orientation may be unlimited. Alternatively, one or more limiting structures may limit the change in orientation (e.g., in an upwards direction and/or a downwards direction).

Transformable arms 2410 may be attached to central body 2405 of the UAV 2400. In examples, transformable arms 2410 may be coupled to central body 2405. In some examples, transformable arms 2410 may be releasably coupled to central body 2405. In some examples, transformable arms 2410 may be integrally coupled to central body 2405. In some examples, a first portion 2406 of transformable arm 2410 is an extension of central body 2405. Additionally, a first portion 2406 of transformable arm 2410 is connected to a second portion 2434 of transformable arm 2410 via a joint 2432. The joint may permit the first portion and/or the second portion to move relative to one another. The joint may allow the first portion and the second portion to be operably coupled to one another while the first and second portion may move relative to one another. The joint may allow the first portion to directly contact the second portion. Alternatively, the joint may include one or more intermediary pieces that may connect the first portion and the second portion. The joint may provide one or more pivots that may allow a second portion to move relative to a first portion about an axis of rotation. In some instances, the second portion may move relative to the first portion about a single axis of rotation, two axes of rotation, or three axes of rotation. The joint may or may not include a limiting structure that may limit a degree of rotation in a single direction or multiple directions.

Second portion 2434 may move with respect to first portion 2406 via joint 2432. In particular, motor 2430 may be used to move second portion 2434 with respect to first portion 2406. Additionally or alternatively, chain 2435 may be connected to second portion 2434 and may move second portion 2434 with respect to first portion 2406 when chain 2435 is activated by motor 2430. Additionally, transformable arms 2410 may comprise an omnidirectional wheel 2456.

Additionally, joint 2432 is used to connect second portion 2434 and the output axis of first portion 2406. Second portion 2434 may provide an additional degree of freedom of the transformable arm 2410. In particular, as seen in FIG. 24, the output of second portion 2434 may be fixed to a base portion 2450. In particular, the output axis of a second portion may be a wheel supporting base that houses omnidirectional wheel 2454. As such, second portion 2434 may be used to drive the omnidirectional wheel 2454 so as to pivot the base portion 2450 around the output axis of second portion 2434.

Omnidirectional wheel supporting base of base portion 2450 may be used to support wheel 2454. The omnidirectional wheel supporting base of base portion 2450 may also be used to fix a gear motor, such as direct current gear motor. Additionally, wheel 2454 may be configured to move through a bearing. In particular, DC gear motor may drive a wheel 2454 to rotate, such as through a bearing. Further, DC gear motor may lock the rotation of wheel 2454 by a circuit such that the wheel 2454 remains locked in some working environments.

Wheel 2454 is an end actuating element of walking system of UAV 2400. Additionally, wheel 2454 may be used for omnidirectional rotation on the ground. Further, wheel 2454 may be auto-locked by DC gear motor so as to become a ground stationary-supporting point of a transformable arm 2410.

As seen in FIG. 24, UAV 2400 comprises four identical transformable arms 2410. In particular, each transformable arm 2410 neighbors two other transformable arms 2410 at 90-degree angles with respect to each other. Examples of cross-sectional shapes of the transformable arms may include circles, ellipses, ovals, squares, rectangles, trapezoids, parallelograms, pentagons, hexagons, octagons, crescents, "I" shapes, "H" shapes, "X" shapes, "T" shapes, "Y" shapes, "D" shapes, or any other regular or irregular polygonal shape. The transformable arms may be hollow or solid. In some instances, the transformable arms may form a substantially tubular shape.

The configuration of first portion 2406 with respect to second 2434 may allow transformable arms 2410 to move freely in a vertical plane. Additionally, wheel 2454 of base portion 2450 as connected to second portion 2434 may allow landing gear to move along quickly across a smooth terrain. Further, when a terrain is bumpy, the landing gear may be able to walk by locking wheel 2454 through the use of DC gear motor and then using first portion 2406 and second portion 2434 to move transformable arms 2410 along a terrain.

Figure 25:
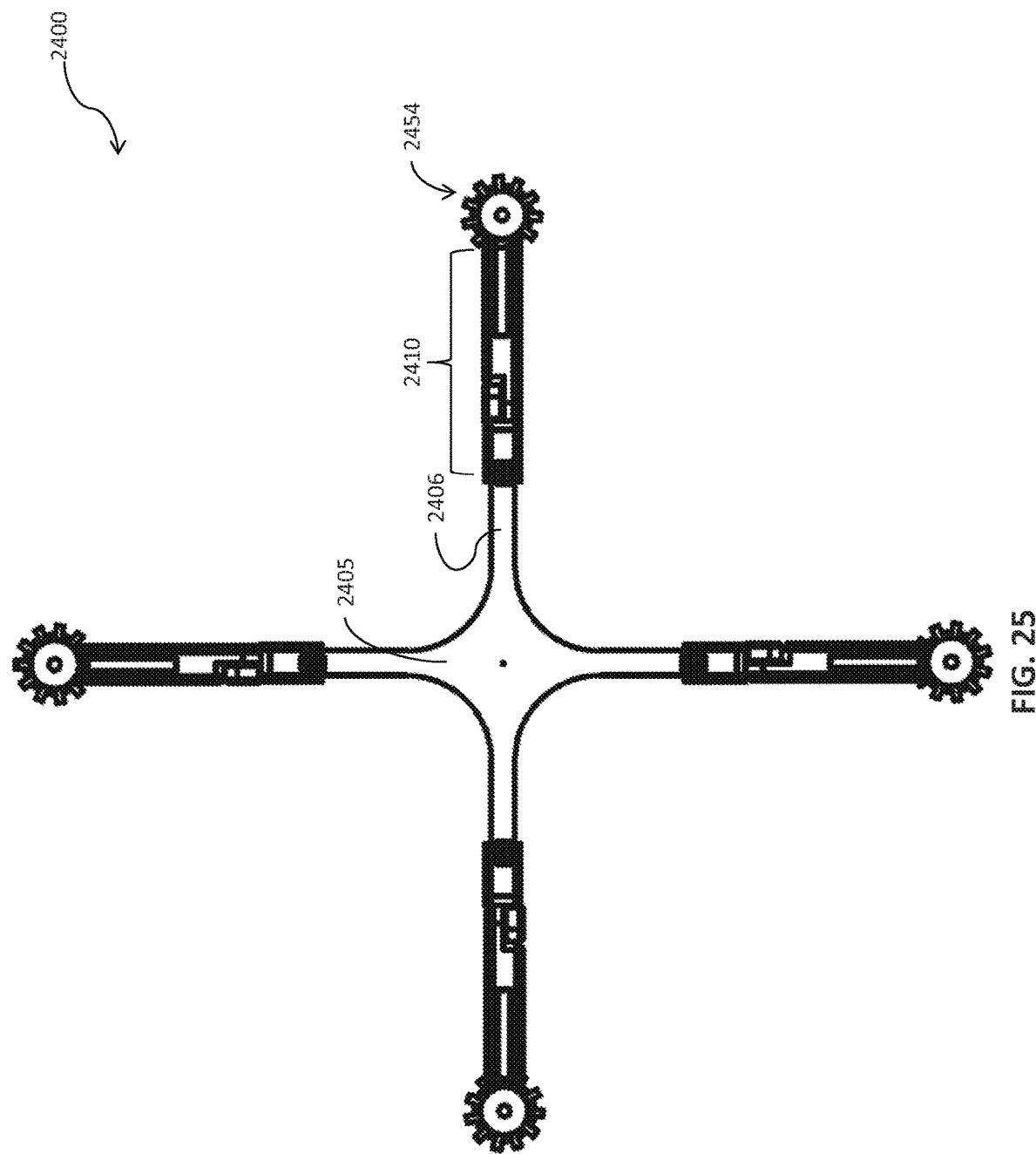
FIG. 25 illustrates a bottom view of an aerial vehicle having a walking system comprising four transformable arms in a flight configuration, in accordance with embodiments.

The position of transformable arms 2410 with respect to a base central body 2405 may differ based on whether the UAV 2400 is in flight. For example, when the UAV is in flight, transformable arms 2410 of the UAV 2400 that is attached to and/or integrated within the UAV 2400 may be in a retracted position. In particular, transformable arms 2410 may be in a retracted position so as to have transformable arms 2410 positioned in a flat, co-planar extension from central body 2405. This is illustrated in FIGS. 24-25.

As discussed above, FIG. 24 provides a perspective view of an aerial vehicle having a walking system comprising four transformable arms in a flight configuration, in accordance with embodiments, in accordance with embodiments. Additionally, FIG. 25 provides an overhead view of an aerial vehicle having a walking system in a flight configuration, in accordance with embodiments. FIG. 25 illustrates central body 2405, transformable arms 2410, propulsion unit 2415, and DC gear motor 2456. In particular, FIG. 25 illustrates a bottom view of an aerial vehicle having a walking system comprising four transformable arms in a flight configuration, in accordance with embodiments of the present disclosure. As seen in FIGS. 24 and 25, when an aerial vehicle is in flight, transformable arms 2410 may be stored in a horizontal direction. Additionally, when a transformable arm 2410 is in a locked position, first portion 2406, second portion 2434, and DC gear motor 2456 may each be in a locked state. Accordingly, when first portion 2406, second portion 2434, and DC gear motor 2456 are in a locked state, the UAV 2400 may have little to no shaking and/or wagging while the aerial vehicle is in flight.

Figure 26:
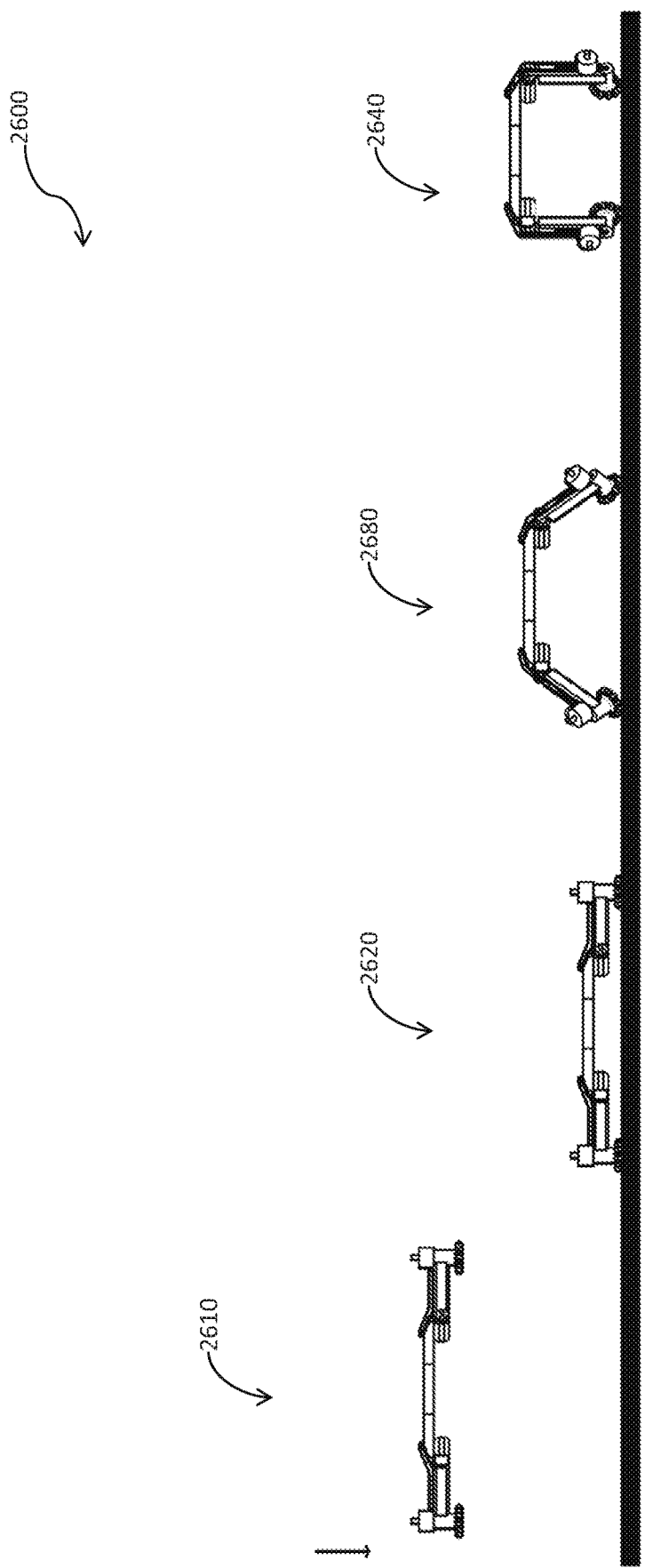
FIG. 26 illustrates a schematic profile of an aerial vehicle having a walking system comprising four transformable arms in a first landing configuration, a second landing configuration, a first surface configuration, and a second surface configuration, in accordance with embodiments.

As discussed above, transformable arms 2410 may be stored in a flat, horizontal position when a UAV 2400 is in flying mode. However, when the aerial vehicle is landing, transformable arms 2410 may begin to descend even though the aerial vehicle is still in flight. This is shown in FIG. 26, which illustrates transformable arms 2410 that are in different configurations, including a landing configuration. In particular, FIG. 26 illustrates a schematic profile of an aerial vehicle having a walking system comprising four transformable arms in a first landing configuration 2610, a second landing configuration 2620, a first surface configuration 2630, and a second surface configuration 2640, in accordance with embodiments. The UAV may include a UAV body that may support one or more transformable arms. The transformable arms may support one or more propulsion units.

The UAV may be capable of transforming between a first landing configuration 2610, a second landing configuration 2620, a first surface configuration 2630, and a second surface configuration 2640. The first landing configuration may be effected while the UAV in flight and descending towards a surface. A second landing configuration may comprise a landing configuration that is in contact with a surface. The second landing configuration may be effected when the UAV is no longer in flight. For instance, the second landing configuration may be effected when the UAV is resting on an underlying surface. The second landing configuration may be effected when the UAV is powered off. Although configurations 2610-2640 illustrate a process of landing a UAV and transforming the UAV to a surface configuration, the process of transitioning from a surface configuration to a flight configuration may be represented as a surface configuration 2630, 2640 transitioning to a flight configuration similar to configuration 2610.

The UAV may enter a transition state to change between a landing configuration and a surface configuration. For instance, when the UAV has landed on the surface, the UAV may enter a transition state from the landing state. Additionally, the UAV may enter a transition state to change between a surface configuration and a flight configuration. When the UAV is taking off, the UAV may enter a transition state from the surface state. In some embodiments, the transition state may occur fairly quickly. For instance, the UAV may be within a transition state less than 3 minutes, 2 minutes, 1 minute, 45 seconds, 30 seconds, 20 seconds, 15 seconds, 10 seconds, 7 seconds, 5 seconds, 3 seconds, or 1 second. Alternatively, the transition state may last longer than any of the times provided, or fall within a range between any two of the times provided. The amount of time may be the same whether the UAV is transitioning into a surface configuration, or into a landing configuration, or into a flight configuration, or may be different.

In some embodiments, while the UAV is in a transition state, the propulsion units supported by the transformable arms may be operating to provide lift for the UAV and keep the UAV stable at a desired location. For instance, if the UAV is landing, the UAV may approach a surface, and then make a determination to start the transition to the landing configuration. While the UAV is transforming into the landing configuration, the propulsion units of the transformable arm may keep the UAV substantially hovering above the surface or descending toward the surface in a controlled manner. Once the UAV has completely transitioned into the landing configuration, the UAV may be brought to rest on the underlying surface.

While the UAV is transitioning to the landing configuration, the propulsion units supported by the transformable arms may decrease or stop rotation. This may permit the transformable arms to fold downward. In some instances, the transformable arms may fold downward with aid of gravity, which is no longer sufficiently counterbalanced by the lift generated by the propulsion units of the transformable arms. Alternatively, one or more actuators may aid in causing the transformable arms to fold downwards.

While the UAV transformable arms are folding downward, the second portion of the transformable arms may fold downward gradually in the transition state. The second portion may change orientation relative to the first portion. Similarly, the propulsion units supported by the second portion may change orientation relative to the first portion. The propulsion units may change orientation with the second portion.

If the UAV is taking off, the UAV may lift off a surface, and then make a determination to start the transition to the flight configuration. While the UAV is transforming into the flight configuration, the propulsion units of the transformable arms may keep the UAV substantially hovering above the surface or ascending away from the surface in a controlled manner. Once the UAV has completely transitioned into the flight configuration, the UAV may continue on its flight.

While the UAV is transitioning to the flight configuration, the propulsion units supported by the transformable arms may start or increase rotation. This may permit the transformable arms to fold upward. In some instances, the transformable arms may fold upwards with aid of the lift force generated by the propulsion units, which may be sufficiently great to counterbalance the effects of gravity. Alternatively, one or more actuators may aid in causing the transformable arms to fold upwards and straighten out.

While the UAV transformable arms are folding upward, the first portion of the transformable arms may remain at the same orientation while the second portion may fold upward gradually in the transition state. The second portion may change orientation relative to the first portion. Similarly, the propulsion units supported by the second portion may change orientation relative to the first portion. The propulsion units may change orientation with the second section.

The UAV may make a determination to transforming into a landing configuration from a flight configuration, or from a landing configuration to a surface configuration, when a user provides an input for the UAV to land and/or walk, respectively. The UAV may begin the transformation to the landing configuration and/or surface configuration as soon as the user provides the input. Alternatively, the UAV may start transforming into the landing configuration and/or surface configuration after a predetermined period of time has passed. The UAV may start the transformation based on information from one or more sensors on-board the UAV. The sensors may gather information indicative of the UAV altitude relative to an underlying surface. The sensors may cause the UAV to transform to a landing configuration when the UAV is at or beneath a predetermined altitude relative to the underlying surface. The sensors may gather information indicative of UAV motion characteristics (e.g., speed, acceleration, direction). For instance, if the UAV is moving downward at a rapid velocity, the landing configuration may start sooner (or at a higher altitude) relative to if the UAV is moving downward as a lesser velocity. Environmental conditions, such as a wind conditions may be taken into account in determining when to start the transformation to the landing configuration. In some embodiments, a user instruction for the UAV to land may initiate an automated or semi-automated sequence that may cause the UAV the UAV to transform into the landing configuration based on sensor data. In some instances, the UAV may make an automated determination to land and/or walk with aid of one or more processors without requiring user input, and may automatically make the determination to transform into a landing configuration and/or surface configuration, respectively.

The UAV may make a determination to transforming into a flight configuration from a landing configuration and/or surface configuration when a user provides an input for the UAV to take off. The UAV may begin the transformation to the flight configuration as soon as the user provides the input. Alternatively, the UAV may start transforming into the flight configuration after a predetermined period of time has passed. The UAV may start the transformation based on information from one or more sensors on-board the UAV. The sensors may gather information indicative of the UAV altitude relative to an underlying surface. The sensors may cause the UAV to transform to a flight configuration when the UAV is at or above a predetermined altitude relative to the underlying surface. In some embodiments, a user instruction for the UAV to take off may initiate an automated or semi-automated sequence that may cause the UAV the UAV to transform into the flight configuration based on sensor data. In some instances, the UAV may make an automated determination to take off with aid of one or more processors without requiring user input, and may automatically make the determination to transform into a flight configuration. When a user provides an instruction for the UAV to take off a separate user instruction may or may not be required to initiate the transformation to a flight configuration.

The speed at which a UAV transforms between a flight configuration, landing configuration, and/or surface configuration may be substantially constant. Alternatively, the speed at which the UAV transforms may be variable. The speed at which the UAV transforms may be controlled depending on one or more circumstance. The circumstance may be sensed with aid of one or more sensors. For instance, if the UAV is rapidly descending, the amount of time to transform to a landing configuration may be reduced compared to if the UAV is descending slowly. In another instance, if the UAV is capturing images immediately during take-off, the amount of time to transform to a flight configuration may be reduced compared to if the UAV were not capturing images.

The UAV may change configuration with aid of one or more actuators. The actuators may be actuators for the propulsion units of the UAV. The actuators may be actuators that actively control a configuration of a joint of the UAV. The actuators may be controlled by a flight controller of the UAV. The flight controller may be supported by a central body of the UAV. The flight controller may provide a signal that may affect the one or more actuators. The signal may be generated on the flight controller. The signal may be generated in response to a command from a user terminal remote to the UAV. The signal may be generated in response to a signal from one or more sensors on-board the UAV. The signal may be generated on the flight controller without requiring user input or active user control.

Figure 27:
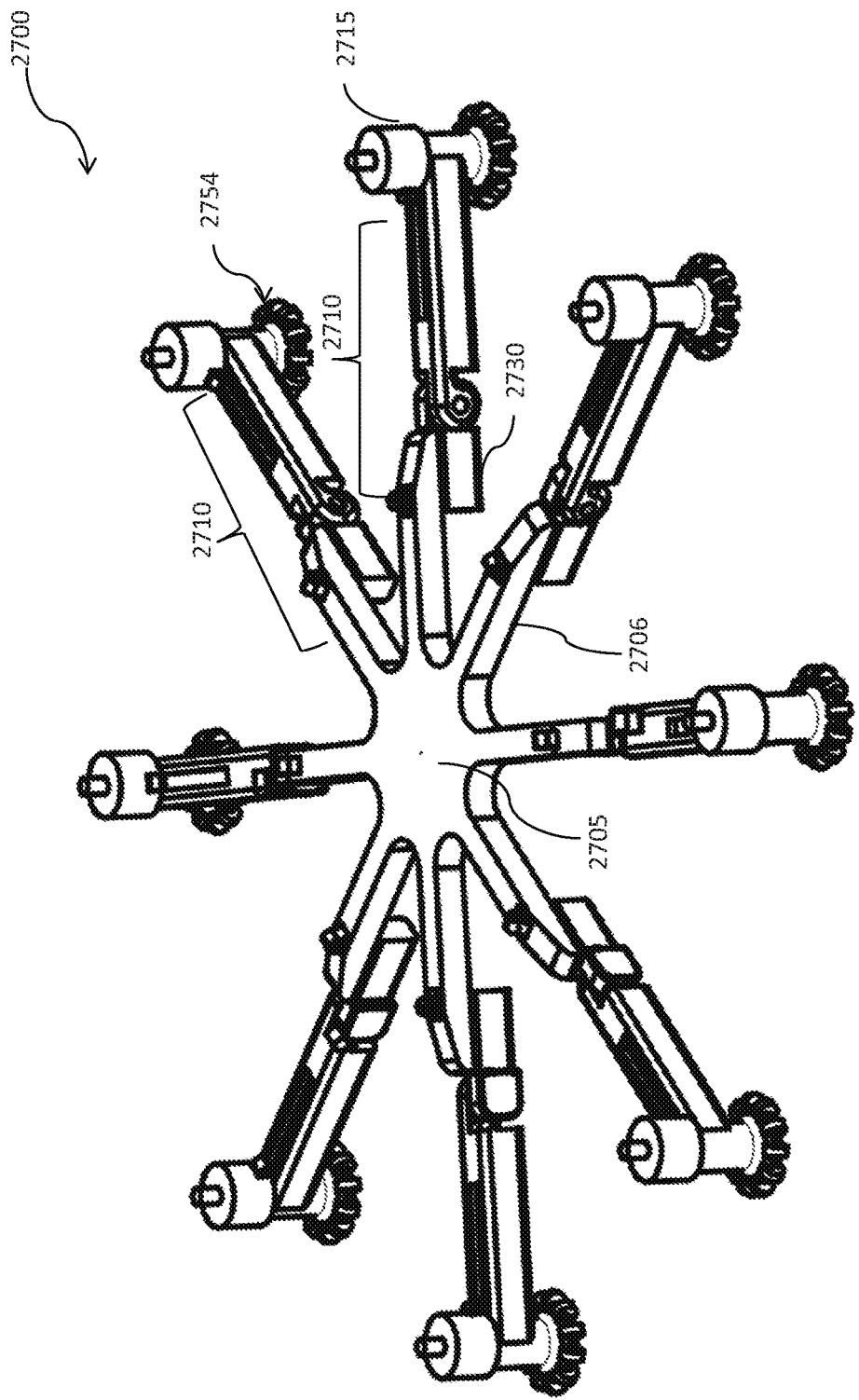
FIG. 27 provides a perspective view of an aerial vehicle having a walking system comprising eight transformable arms in a flight configuration, in accordance with embodiments.

FIG. 27 provides a perspective view of an aerial vehicle having a walking system comprising eight transformable arms 2710 in a flight configuration, in accordance with embodiments. In particular, transformable arms 2710 extend from a central body 2705 of a UAV. As seen in FIG. 27, transformable arms 2710 comprise a first a second portion, where the first portion 2706 is an extension from the central body 2705. At the distal end of each transformable arm 2710 is a propulsion unit 2715 and a wheel 2754. Additionally, each transformable arm 2710 includes a deceleration motor 2730.

Figure 28:
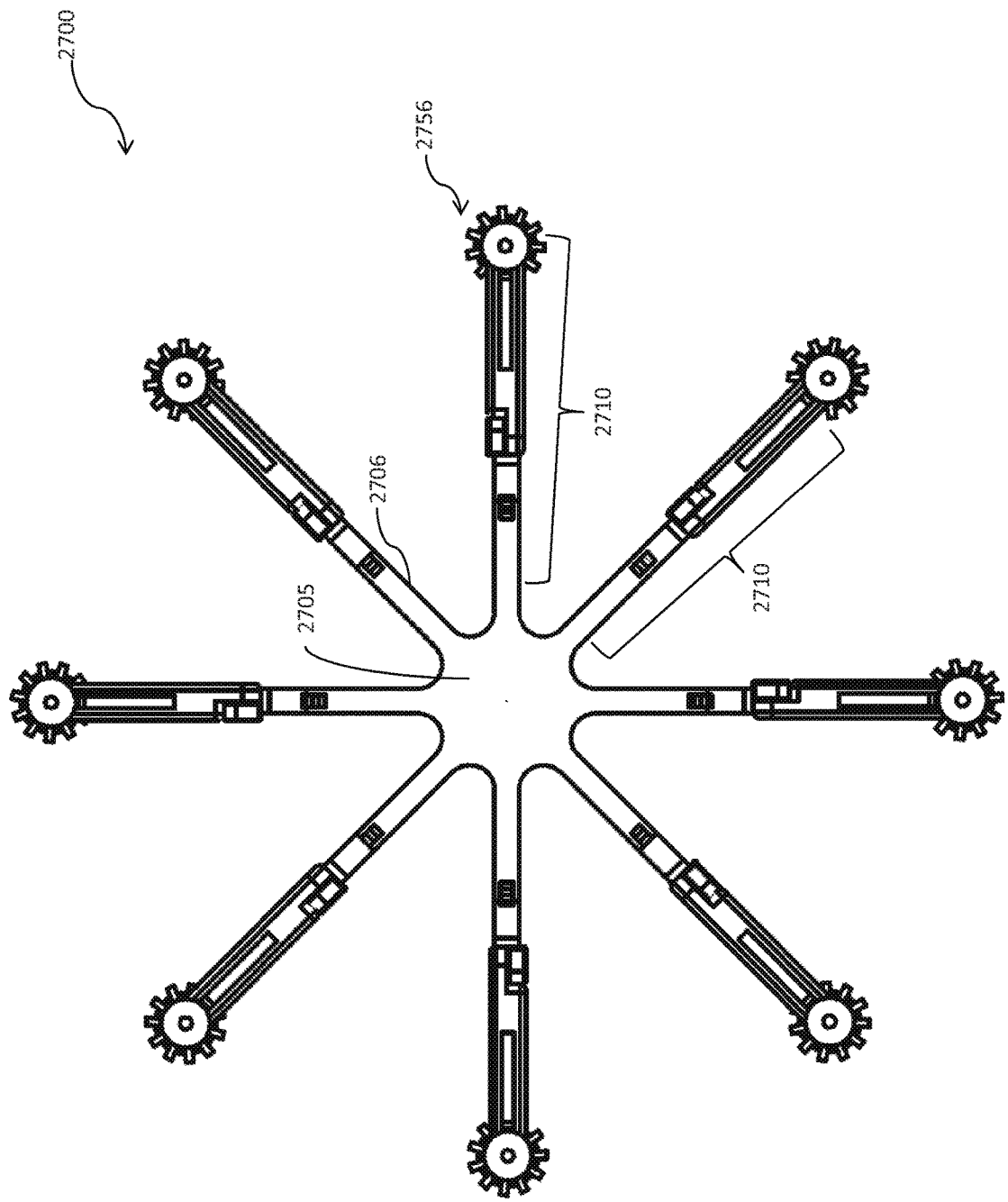
FIG. 28 illustrates a bottom view of an aerial vehicle having a walking system comprising eight transformable arms in a flight configuration, in accordance with embodiments.

Transformable arms 2710 are spaced apart at 45-degree angle with respect to one another. This is also seen in FIG. 28, which illustrates a bottom view of an aerial vehicle having a walking system comprising eight transformable arms in a flight configuration, in accordance with embodiments. In additional embodiments, transformable arms 2710 may be spaced closer together in some areas and farther apart in other areas of extension from the central body 2705. Additionally, while transformable arms 2710 are in a flat plane, in further embodiments transformable arms 2710 may be on different planes from at least one other transformable arm 2710.

Figure 29:
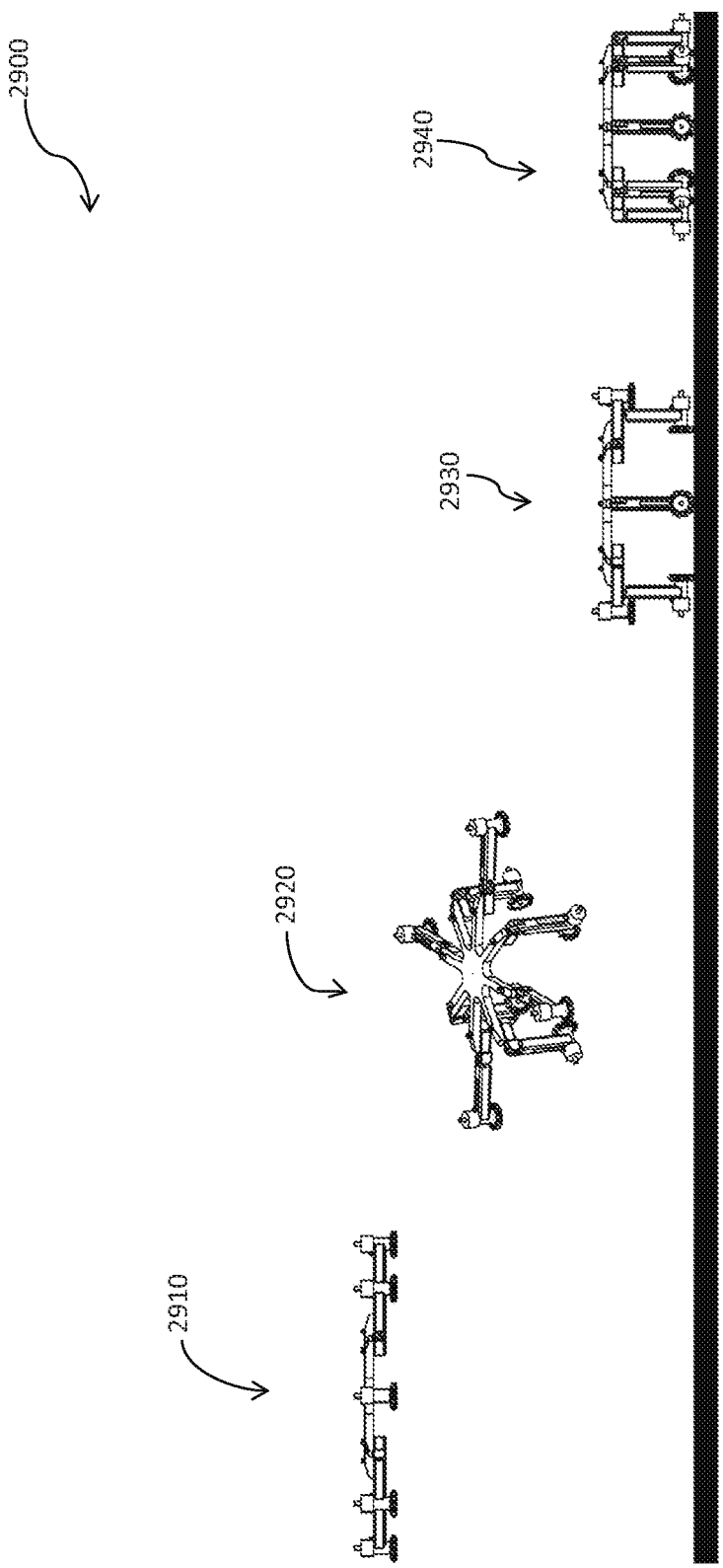
FIG. 29 illustrates a schematic profile of an aerial vehicle having a walking system comprising eight transformable arms in a flying configuration, landing configuration, landed configuration, and walking configuration, in accordance with embodiments.

FIG. 29 illustrates a schematic profile of an aerial vehicle having a walking system comprising eight transformable arms in a flying configuration, landing configuration, landed configuration, and walking configuration, in accordance with embodiments. The UAV may be capable of transforming between a flight configuration 2910, a landing configuration 2920, a first surface configuration 2930, and a second surface configuration 2940. The landing configuration 2920 may be effected while the UAV in flight and descending towards a surface. A first surface configuration 2930 may comprise a landing configuration that is in contact with a surface, where the UAV may be configured to transverse the surface. The second surface configuration 2940 may be configured to transverse the surface more quickly than the first surface configuration, as the second surface configuration has more transformable arms engaging with the surface than the first surface configuration. In particular, the first surface configuration has four transformable arms contacting the surface, whereas the second surface configuration has eight transformable arms contacting the surface. Additionally, the first surface configuration and the second surface configuration may be effected when the UAV is no longer in flight. For instance, the second landing configuration may be effected when the UAV is resting on an underlying surface. The second landing configuration may be effected when the UAV is powered off. Although configurations 2910-2940 illustrate a process of landing a UAV and transforming the UAV to a surface configuration, the process of transitioning from a surface configuration to a flight configuration may be represented as a surface configuration 2930, 2940 transitioning to a flight configuration similar to configuration 2910.

The UAV may enter a transition state to change between a landing configuration and a surface configuration. For instance, when the UAV has landed on the surface, the UAV may enter a transition state from the landing state. Additionally, the UAV may enter a transition state to change between a surface configuration and a flight configuration, or from a flight configuration to a landing configuration. When the UAV is taking off, the UAV may enter a transition state from the surface state. In some embodiments, the transition state may occur fairly quickly. For instance, the UAV may be within a transition state less than 3 minutes, 2 minutes, 1 minute, 45 seconds, 30 seconds, 20 seconds, 15 seconds, 10 seconds, 7 seconds, 5 seconds, 3 seconds, or 1 second. Alternatively, the transition state may last longer than any of the times provided, or fall within a range between any two of the times provided. The amount of time may be the same whether the UAV is transitioning into a surface configuration, or into a landing configuration, or into a flight configuration, or may be different.

In some embodiments, while the UAV is in a transition state, the propulsion units supported by the transformable arms may be operating to provide lift for the UAV and keep the UAV stable at a desired location. For instance, if the UAV is landing, the UAV may approach a surface, and then make a determination to start the transition to the landing configuration. While the UAV is transforming into the landing configuration, the propulsion units of the transformable arm may keep the UAV substantially hovering above the surface or descending toward the surface in a controlled manner. Once the UAV has completely transitioned into the landing configuration, the UAV may be brought to rest on the underlying surface.

While the UAV is transitioning to the landing configuration, the propulsion units supported by the transformable arms may decrease or stop rotation. This may permit the transformable arms to fold downward. In some instances, the transformable arms may fold downward with aid of gravity, which is no longer sufficiently counterbalanced by the lift generated by the propulsion units of the transformable arms. Alternatively, one or more actuators may aid in causing the transformable arms to fold downwards.

While the UAV transformable arms are folding downward, the second portion of the transformable arms may fold downward gradually in the transition state. The second portion may change orientation relative to the first portion.

Similarly, the propulsion units supported by the second portion may change orientation relative to the first portion. The propulsion units may change orientation with the second portion.

If the UAV is taking off, the UAV may lift off a surface, and then make a determination to start the transition to the flight configuration. While the UAV is transforming into the flight configuration, the propulsion units of the transformable arms may keep the UAV substantially hovering above the surface or ascending away from the surface in a controlled manner. Once the UAV has completely transitioned into the flight configuration, the UAV may continue on its flight.

While the UAV is transitioning to the flight configuration, the propulsion units supported by the transformable arms may start or increase rotation. This may permit the transformable arms to fold upward. In some instances, the transformable arms may fold upwards with aid of the lift force generated by the propulsion units, which may be sufficiently great to counterbalance the effects of gravity. Alternatively, one or more actuators may aid in causing the transformable arms to fold upwards and straighten out.

While the UAV transformable arms are folding upward, the first portion of the transformable arms may remain at the same orientation while the second portion may fold upward gradually in the transition state. The second portion may change orientation relative to the first portion. Similarly, the propulsion units supported by the second portion may change orientation relative to the first portion. The propulsion units may change orientation with the second section.

The UAV may make a determination to transforming into a landing configuration from a flight configuration, or from a landing configuration to a surface configuration, when a user provides an input for the UAV to land and/or walk, respectively. The UAV may begin the transformation to the landing configuration and/or surface configuration as soon as the user provides the input. Alternatively, the UAV may start transforming into the landing configuration and/or surface configuration after a predetermined period of time has passed. The UAV may start the transformation based on information from one or more sensors on-board the UAV. The sensors may gather information indicative of the UAV altitude relative to an underlying surface. The sensors may cause the UAV to transform to a landing configuration when the UAV is at or beneath a predetermined altitude relative to the underlying surface. The sensors may gather information indicative of UAV motion characteristics (e.g., speed, acceleration, direction). For instance, if the UAV is moving downward at a rapid velocity, the landing configuration may start sooner (or at a higher altitude) relative to if the UAV is moving downward as a lesser velocity. Environmental conditions, such as a wind conditions may be taken into account in determining when to start the transformation to the landing configuration. In some embodiments, a user instruction for the UAV to land may initiate an automated or semi-automated sequence that may cause the UAV the UAV to transform into the landing configuration based on sensor data. In some instances, the UAV may make an automated determination to land and/or walk with aid of one or more processors without requiring user input, and may automatically make the determination to transform into a landing configuration and/or surface configuration, respectively.

The UAV may make a determination to transforming into a flight configuration from a landing configuration and/or surface configuration when a user provides an input for the UAV to take off. The UAV may begin the transformation to the flight configuration as soon as the user provides the input. Alternatively, the UAV may start transforming into the flight configuration after a predetermined period of time has passed. The UAV may start the transformation based on information from one or more sensors on-board the UAV. The sensors may gather information indicative of the UAV altitude relative to an underlying surface. The sensors may cause the UAV to transform to a flight configuration when the UAV is at or above a predetermined altitude relative to the underlying surface. In some embodiments, a user instruction for the UAV to take off may initiate an automated or semi-automated sequence that may cause the UAV the UAV to transform into the flight configuration based on sensor data. In some instances, the UAV may make an automated determination to take off with aid of one or more processors without requiring user input, and may automatically make the determination to transform into a flight configuration. When a user provides an instruction for the UAV to take off a separate user instruction may or may not be required to initiate the transformation to a flight configuration.

The speed at which a UAV transforms between a flight configuration, landing configuration, and/or surface configuration may be substantially constant. Alternatively, the speed at which the UAV transforms may be variable. The speed at which the UAV transforms may be controlled depending on one or more circumstance. The circumstance may be sensed with aid of one or more sensors. For instance, if the UAV is rapidly descending, the amount of time to transform to a landing configuration may be reduced compared to if the UAV is descending slowly. In another instance, if the UAV is capturing images immediately during take-off, the amount of time to transform to a flight configuration may be reduced compared to if the UAV were not capturing images.

The systems, devices, and methods described herein can be applied to a wide variety of movable objects. As previously mentioned, any description herein of a UAV may apply to and be used for any movable object. Any description herein of a UAV may apply to any aerial vehicle. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm3, 2 cm3, 5 cm3, 10 cm3, 20 cm3, 30 cm3, 40 cm3, 50 cm3, 60 cm3, 70 cm3, 80 cm3, 90 cm3, 100 cm3, 150 cm3, 200 cm3, 300 cm3, 500 cm3, 750 cm3, 1000 cm3, 5000 cm3, 10,000 cm3, 100,000 cm3, 1 m3, or 10 m3. Conversely, the total volume of the movable object may be greater than or equal to about: 1 cm3, 2 cm3, 5 cm3, 10 cm3, 20 cm3, 30 cm3, 40 cm3, 50 cm3, 60 cm3, 70 cm3, 80 cm3, 90 cm3, 100 cm3, 150 cm3, 200 cm3, 300 cm3, 500 cm3, 750 cm3, 1000 cm3, 5000 cm3, 10,000 cm3, 100,000 cm3, 1 m3, or 10 m3.

In some embodiments, the movable object may have a footprint (which may refer to the lateral cross-sectional area encompassed by the movable object) less than or equal to about: 32,000 cm2, 20,000 cm2, 10,000 cm2, 1,000 cm2, 500 cm2, 100 cm2, 50 cm2, 10 cm2, or 5 cm2. Conversely, the footprint may be greater than or equal to about: 32,000 cm2, 20,000 cm2, 10,000 cm2, 1,000 cm2, 500 cm2, 100 cm2, 50 cm2, 10 cm2, or 5 cm2.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 30:
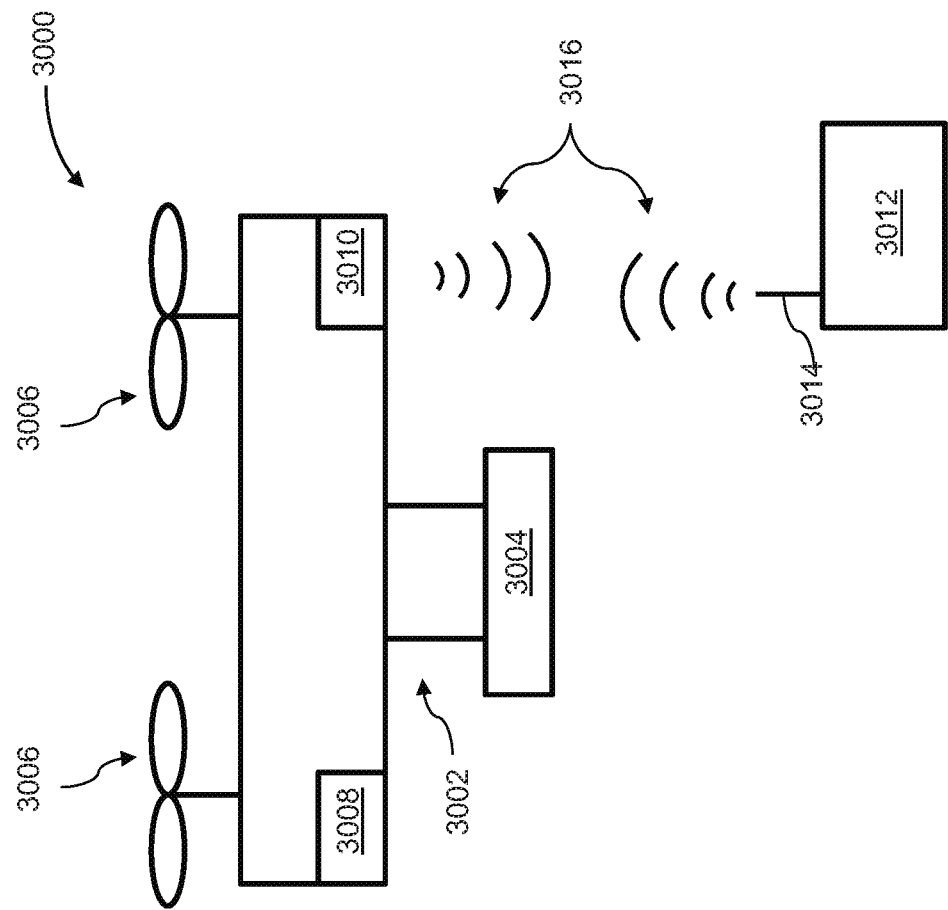
FIG. 30 illustrates a movable object including a carrier and a payload, in accordance with embodiments.

FIG. 30 illustrates a movable object 3000 including a carrier 3002 and a payload 3004, in accordance with embodiments. Although the movable object 3000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 3004 may be provided on the movable object 3000 without requiring the carrier 3002. The movable object 3000 may include propulsion mechanisms 3006, a sensing system 3008, and a communication system 3010.

The propulsion mechanisms 3006 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 3006 can be mounted on the movable object 3000 using any suitable means, such as a support element (e.g., a drive shaft) as described elsewhere herein. The propulsion mechanisms 3006 can be mounted on any suitable portion of the movable object 3000, such on the top, bottom, front, back, sides, or suitable combinations thereof.

In some embodiments, the propulsion mechanisms 3006 can enable the movable object 3000 to take off vertically from a surface or land vertically on a surface without requiring any horizontal movement of the movable object 3000 (e.g., without traveling down a runway). Optionally, the propulsion mechanisms 3006 can be operable to permit the movable object 3000 to hover in the air at a specified position and/or orientation. One or more of the propulsion mechanisms 3000 may be controlled independently of the other propulsion mechanisms. Alternatively, the propulsion mechanisms 3000 can be configured to be controlled simultaneously. For example, the movable object 3000 can have multiple horizontally oriented rotors that can provide lift and/or thrust to the movable object. The multiple horizontally oriented rotors can be actuated to provide vertical takeoff, vertical landing, and hovering capabilities to the movable object 3000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 3000 (e.g., with respect to up to three degrees of translation and up to three degrees of rotation).

The sensing system 3008 can include one or more sensors that may sense the spatial disposition, velocity, and/or acceleration of the movable object 3000 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 3008 can be used to control the spatial disposition, velocity, and/or orientation of the movable object 3000 (e.g., using a suitable processing unit and/or control module, as described below). Alternatively, the sensing system 3008 can be used to provide data regarding the environment surrounding the movable object, such as weather conditions, proximity to potential obstacles, location of geographical features, location of manmade structures, and the like.

The communication system 3010 enables communication with terminal 3012 having a communication system 3014 via wireless signals 3016. The communication systems 3010, 3014 may include any number of transmitters, receivers, and/or transceivers suitable for wireless communication. The communication may be one-way communication, such that data can be transmitted in only one direction. For example, one-way communication may involve only the movable object 3000 transmitting data to the terminal 3012, or vice-versa. The data may be transmitted from one or more transmitters of the communication system 3010 to one or more receivers of the communication system 3012, or vice-versa. Alternatively, the communication may be two-way communication, such that data can be transmitted in both directions between the movable object 3000 and the terminal 3012. The two-way communication can involve transmitting data from one or more transmitters of the communication system 3010 to one or more receivers of the communication system 3014, and vice-versa.

In some embodiments, the terminal 3012 can provide control data to one or more of the movable object 3000, carrier 3002, and payload 3004 and receive information from one or more of the movable object 3000, carrier 3002, and payload 3004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 3006), or a movement of the payload with respect to the movable object (e.g., via control of the carrier 3002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 3008 or of the payload 3004). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 3012 can be configured to control a state of one or more of the movable object 3000, carrier 3002, or payload 3004. Alternatively or in combination, the carrier 3002 and payload 3004 can also each include a communication module configured to communicate with terminal 3012, such that the terminal can communicate with and control each of the movable object 3000, carrier 3002, and payload 3004 independently.

In some embodiments, the movable object 3000 can be configured to communicate with another remote device in addition to the terminal 3012, or instead of the terminal 3012. The terminal 3012 may also be configured to communicate with another remote device as well as the movable object 3000. For example, the movable object 3000 and/or terminal 3012 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 3000, receive data from the movable object 3000, transmit data to the terminal 3012, and/or receive data from the terminal 3012. Optionally, the remote device can be connected to the Internet or other telecommunications network, such that data received from the movable object 3000 and/or terminal 3012 can be uploaded to a website or server.

Figure 31:
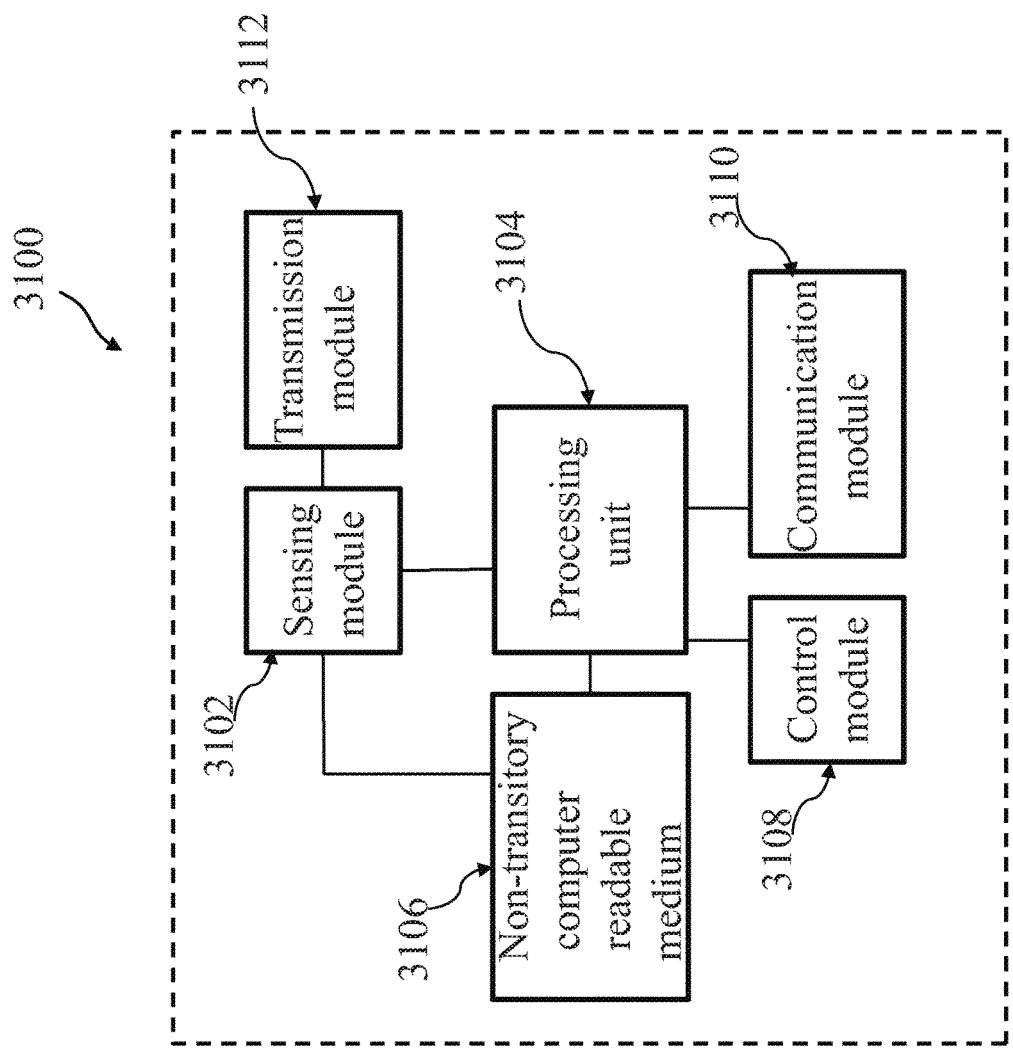
FIG. 31 is a schematic illustration by way of block diagram of a system for controlling a movable object, in accordance with embodiments.

FIG. 31 is a schematic illustration by way of block diagram of a system 3100 for controlling a movable object, in accordance with embodiments. The system 3100 can be used in combination with any suitable embodiment of the systems, devices, and methods disclosed herein. The system 3100 can include a sensing module 3102, processing unit 3104, non-transitory computer readable medium 3106, control module 3108, and communication module 3110.

The sensing module 3102 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 3102 can be operatively coupled to a processing unit 3104 having a plurality of processors. In some embodiments, the sensing module can be operatively coupled to a transmission module 3112 (e.g., a Wi-Fi image transmission module) configured to directly transmit sensing data to a suitable external device or system. For example, the transmission module 3112 can be used to transmit images captured by a camera of the sensing module 3102 to a remote terminal.

The processing unit 3104 can have one or more processors, such as a programmable processor (e.g., a central processing unit (CPU)). The processing unit 3104 can be operatively coupled to a non-transitory computer readable medium 3106. The non-transitory computer readable medium 3106 can store logic, code, and/or program instructions executable by the processing unit 3104 for performing one or more steps. The non-transitory computer readable medium can include one or more memory units (e.g., removable media or external storage such as an SD card or random access memory (RAM)). In some embodiments, data from the sensing module 3102 can be directly conveyed to and stored within the memory units of the non-transitory computer readable medium 3106. The memory units of the non-transitory computer readable medium 3106 can store logic, code and/or program instructions executable by the processing unit 3104 to perform any suitable embodiment of the methods described herein. For example, the processing unit 3104 can be configured to execute instructions causing one or more processors of the processing unit 3104 to analyze sensing data produced by the sensing module. The memory units can store sensing data from the sensing module to be processed by the processing unit 3104. In some embodiments, the memory units of the non-transitory computer readable medium 3106 can be used to store the processing results produced by the processing unit 3104.

In some embodiments, the processing unit 3104 can be operatively coupled to a control module 3108 configured to control a state of the movable object. For example, the control module 3108 can be configured to control the propulsion mechanisms of the movable object to adjust the spatial disposition, velocity, and/or acceleration of the movable object with respect to six degrees of freedom. Alternatively or in combination, the control module 3108 can control one or more of a state of a carrier, payload, or sensing module.

The processing unit 3104 can be operatively coupled to a communication module 3110 configured to transmit and/or receive data from one or more external devices (e.g., a terminal, display device, or other remote controller). Any suitable means of communication can be used, such as wired communication or wireless communication. For example, the communication module 3110 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 3110 can transmit and/or receive one or more of sensing data from the sensing module 3102, processing results produced by the processing unit 3104, predetermined control data, user commands from a terminal or remote controller, and the like.

The components of the system 3100 can be arranged in any suitable configuration. For example, one or more of the components of the system 3100 can be located on the movable object, carrier, payload, terminal, sensing system, or an additional external device in communication with one or more of the above. Additionally, although FIG. 31 depicts a single processing unit 3104 and a single non-transitory computer readable medium 3106, one of skill in the art would appreciate that this is not intended to be limiting, and that the system 3100 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 3100 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. An unmanned aerial vehicle (UAV), comprising:
a central body;
a plurality of landing gears that are extendable from and movable relative to the central body, each of the landing gears including a proximal portion coupled to the central body and a base portion coupled to the proximal portion and being movable relative to the proximal portion, the base portion being further away from the central body than the proximal portion and having a distal end further away from the central body, and the plurality of landing gears being configured to transform between:
a flight configuration in which the base portion of the landing gear is extending laterally away from the central body and not in contact with a surface below the central body, and
a surface configuration in which the base portion of the landing gear is extending towards the surface below the central body; and
a plurality of propulsion units and a plurality of wheels, each of the plurality of propulsion units and a corresponding one of the wheels being arranged at opposite sides of the distal end of the base portion of one of the landing gears;
wherein when the landing gears are in the surface configuration, the landing gears are configured to support a weight of the central body on the surface with the base portions of the landing gears contacting the surface and transport the UAV over the surface by moving one or more of the landing gears relative to the surface.

2. The UAV of claim 1, wherein when the UAV is in the flight configuration, flight of the UAV is effected at least via the plurality of propulsion units.

3. The UAV of claim 1,
wherein the plurality of propulsion units are a plurality of first propulsion units;
the UAV further comprising:
   a plurality of arms extending away from the central body; and
   one or more second propulsion units each supported on one of the arms.

4. The UAV of claim 3, wherein:
each of the arms has a proximal end closer to the central body and a distal end further away from the central body, and
wherein each of the one or more second propulsion units is supported on the distal end of one of the arms.

5. The UAV of claim 1, wherein each of the plurality of landing gears further comprises a joint coupling the proximal portion and the base portion together to allow the the proximal portion and the base portion to be movable with respect to each other.

6. The UAV of claim 1, wherein each of the plurality of landing gears is operably coupled to the central body by a joint that allows the each of the plurality of landing gears to be extendable from and movable relative to the central body.

7. The UAV of claim 1, wherein the plurality of landing gears are further configured to transform between:
   a transforming configuration wherein:
      a first set of landing gears from the plurality of landing gears are extending laterally away from the central body, and
      a second set of landing gears from the plurality of landing gears are extending towards the surface below the central body, and
   the flight configuration wherein both the first set and the second set of landing gears are extending laterally away from the central body.

8. The UAV of claim 7, wherein when the landing gears are in the transforming configuration, the second set of landing gears are configured to support the weight of the central body on the surface and transport the UAV over the surface by moving one or more landing gears from the second set of landing gears relative to the surface.

9. The UAV of claim 8, wherein each landing gear from the first set of landing gears supports one of the plurality of propulsion units to effect flight of the UAV.

10. The UAV of claim 8, wherein each landing gear from the second set of landing gears supports one of the plurality of propulsion units to effect flight of the UAV.

11. The UAV of claim 8, wherein each landing gear from the first and second sets of landing gears supports one of the plurality of propulsion units to effect flight of the UAV.

12. A method for transformation of an unmanned aerial vehicle (UAV), the method comprising:
providing a UAV including:
   a central body;
   a plurality of landing gears that are extendable from and movable relative to the central body, each of the landing gears including a proximal portion coupled to the central body and a base portion coupled to the proximal portion and being movable relative to the proximal portion, the base portion being further away from the central body than the proximal portion and having a distal end further away from the central body, and the plurality of landing gears being configured to transform between:
      a flight configuration in which the base portion of the landing gear is extending laterally away from the central body and not in contact with a surface below the central body, and
      a surface configuration in which the base portion of the landing gear is extending towards the surface below the central body; and
   a plurality of propulsion units and a plurality of wheels, each of the plurality of propulsion units and a corresponding one of the wheels being arranged at opposite sides of the distal end of the base portion of one of the landing gears;
   wherein when the landing gears are in the surface configuration, the landing gears are configured to support a weight of the central body on the surface with the base portions of the landing gears contacting the surface and transport the UAV over the surface by moving one or more of the landing gears relative to the surface; and
operating the UAV such that the UAV adopts the flight configuration or the surface configuration.

13. The method of claim 12, wherein the plurality of landing gears are further configured to transform between:
   a transforming configuration wherein:
      a first set of landing gears from the plurality of landing gears are extending laterally away from the central body, and
      a second set of landing gears from the plurality of landing gears are extending towards the surface below the central body, and
   the flight configuration wherein both the first set and the second set of landing gears are extending laterally away from the central body.

14. The method of claim 13, wherein when the landing gears are in the transforming configuration, the second set of landing gears are configured to support the weight of the central body on the surface and transport the UAV over the surface by moving one or more landing gears from the second set of landing gears relative to the surface.

15. A method of assembling an unmanned aerial vehicle (UAV) comprising:
attaching to a central body a plurality of landing gears that are extendable from and movable relative to the central body when attached to the central body, each of the landing gears including a proximal portion coupled to the central body and a base portion coupled to the proximal portion and being movable relative to the proximal portion, the base portion being further away from the central body than the proximal portion and having a distal end further away from the central body, and
the plurality of landing gears being configured to transform between:
   a flight configuration in which the base portion of the landing gear is extending laterally away from the central body and not in contact with a surface below the central body, and
   a surface configuration in which the base portion of the landing gear is extending towards the surface below the central body; and
attaching to the plurality of landing gears a plurality of propulsion units and a plurality of wheels, each of the plurality of propulsion units and a corresponding one of the wheels being arranged at opposite sides of the distal end of the base portion of one of the landing gears;

wherein when the landing gears are in the surface configuration, the landing gears are configured to support a weight of the central body on the surface with the base portions of the landing gears contacting the surface and transport the UAV over the surface by moving one or more landing gears relative to the surface.

16. The method of claim 15, wherein the plurality of landing gears are further configured to transform between:
a transforming configuration wherein:
   a first set of landing gears from the plurality of landing gears are extending laterally away from the central body and
   a second set of landing gears from the plurality of landing gears are extending towards the surface below the central body, and
the flight configuration wherein both the first set and the second set of landing gears are extending laterally away from the central body.

17. The method of claim 16, wherein when the landing gears are in the transforming configuration, the second set of landing gears are configured to support the weight of the central body on the surface and transport the UAV over the surface by moving one or more landing gears from the second set of landing gears relative to the surface.

\* \* \* \* \*